(12) United States Patent
Yoshimune et al.

(10) Patent No.: US 6,438,233 B1
(45) Date of Patent: Aug. 20, 2002

(54) BOOK DATA SERVICE SYSTEM WITH DATA DELIVERY BY BROADCASTING

(75) Inventors: Toshiya Yoshimune; Yoko Asano; Kaori Ueno; Masayoshi Minei, all of Kanagawaken; Syuichi Kato, Tokyo; Sadami Kurihara, Kanagawaken; Katsuhiko Ogawa, Kanagawaken; Kenichi Hanabe, Kanagawaken, all of (JP)

(73) Assignee: Nippon Telegraph and Telephone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,655

(22) Filed: Aug. 4, 1997

Related U.S. Application Data

(63) Continuation of application No. 08/270,030, filed on Jul. 1, 1994, now abandoned.

(30) Foreign Application Priority Data

| Jul. 2, 1993 | (JP) | ............................................. 5-164804 |
| Jul. 21, 1993 | (JP) | ............................................. 5-179578 |
| Jul. 21, 1993 | (JP) | ............................................. 5-179580 |
| Jul. 21, 1993 | (JP) | ............................................. 5-180438 |
| Aug. 25, 1993 | (JP) | ............................................. 5-210720 |

(51) Int. Cl.$^7$ ............................ H04N 7/167; H04L 9/00
(52) U.S. Cl. ......................... 380/241; 380/278; 707/10; 705/14; 705/51
(58) Field of Search ................................ 709/217, 219; 707/7, 10, 100, 104, 201; 340/825.3, 825.35; 705/26, 27, 51

(56) References Cited

U.S. PATENT DOCUMENTS

| 3,771,126 | A | * | 11/1973 | Apple, Jr. ................. 340/146.1 |
| 4,999,806 | A | * | 3/1991 | Chernow et al. ........... 364/900 |
| 5,093,718 | A | * | 3/1992 | Hoarty et al. ................. 358/84 |

(List continued on next page.)

OTHER PUBLICATIONS

E. Berry, "Prepare for the Future with Updating Systems" Journal of Systems Management vol. 33 No. 2, pp. 28–31 (1982).*

(List continued on next page.)

*Primary Examiner*—Gilberto Barron, Jr.
*Assistant Examiner*—James Seal
(74) *Attorney, Agent, or Firm*—Banner & Witcoff, Ltd.

(57) ABSTRACT

A book data service system in which the book data can be delivered by the broadcasting such that the book data can be delivered to any user located at any place promptly and economically, without causing the waste of the resources. A book data service system if formed by at least one data center including: a data center computer for storing and managing book data; and a broadcasting facility for broadcasting the book data stored and managed by the data center computer according to a prescribed communication protocol using a synchronization control and an error correction scheme suitable for data delivery by broadcasting without confirmation from a receiving side; and a plurality of user terminals, each user terminal including: a receiver for receiving the book data broadcasted from the broadcasting facility of the data center; a user terminal computer for storing and managing the book data received by the receiver; and a display for displaying the book data stored and managed by the user terminal computer.

2 Claims, 42 Drawing Sheets

U.S. PATENT DOCUMENTS

| | | | | |
|---|---|---|---|---|
| 5,239,665 A | * | 8/1993 | Tsuchiya | 395/800 |
| 5,319,705 A | * | 6/1994 | Halter et al. | 380/4 |
| 5,367,621 A | * | 11/1994 | Cohen et al. | 380/501 |
| 5,388,211 A | * | 2/1995 | Hornbuckle | 395/200 |
| 5,400,403 A | * | 3/1995 | Fahn et al. | 380/21 |
| 5,457,746 A | * | 10/1995 | Dolphin | 380/4 |
| 5,506,902 A | * | 4/1996 | Kubota | 380/9 |
| 5,528,490 A | * | 6/1996 | Hill | 364/403 |
| 5,532,920 A | * | 7/1996 | Hartrick et al. | 364/419.1 |

OTHER PUBLICATIONS

D.F. Dixon, "Life Before the Chips; Simulating Digital Video Interactive Technology" Communications of the ACM v32, No. 7, p. 824 (Jul., 1989).*

"Bowker Introduces New Generation of Intelligent Databases", Worldwide Videotex Update, vol. 12, No. 4 (Apr. 1993).*

* cited by examiner (a) ◁ FRONT COVER (b) ▷| BACK COVER (c) ▷ ONE PAGE FORWARD (d) ◁ ONE PAGE BACKWARD (e) ▷▷ CONTINUOUSLY FORWARD (f) ◁◁ CONTINUOUSLY BACKWARD (g) L LABEL (h) > UNDO (i) E END

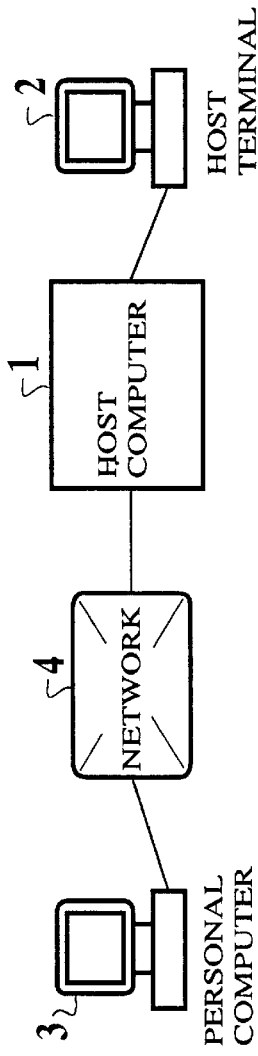
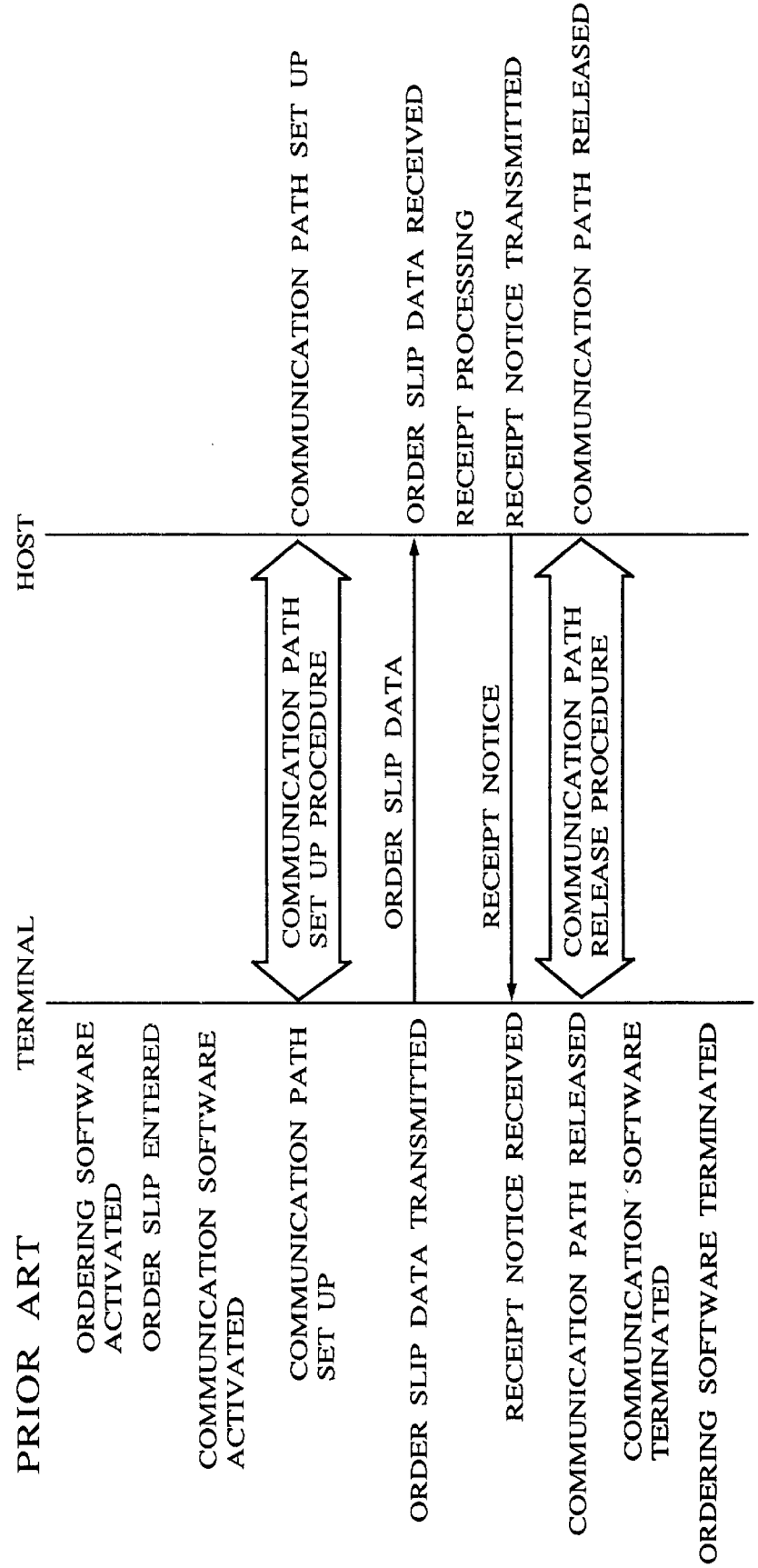
FIG.3A PRIOR ART
FIG.3B PRIOR ART

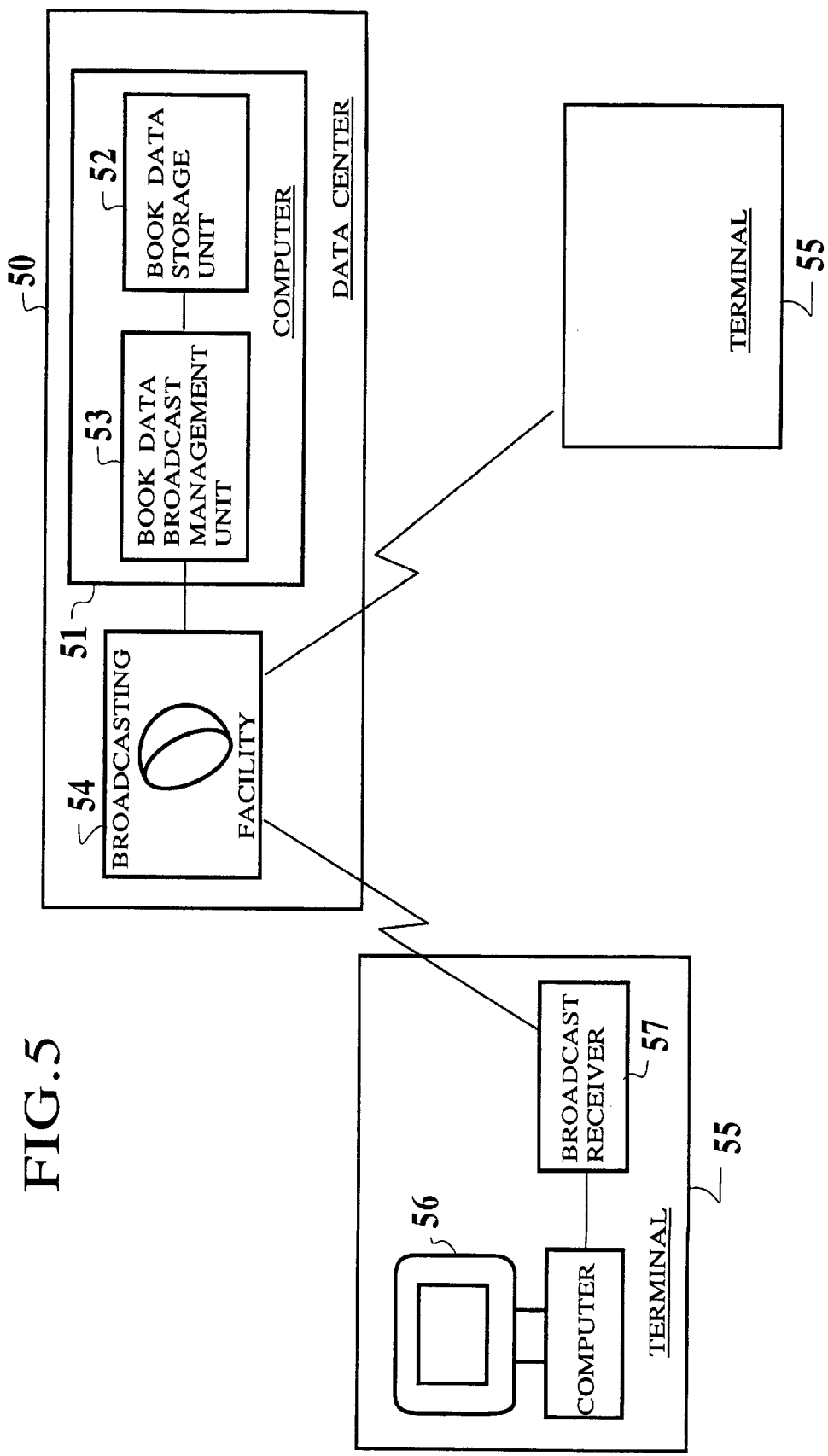

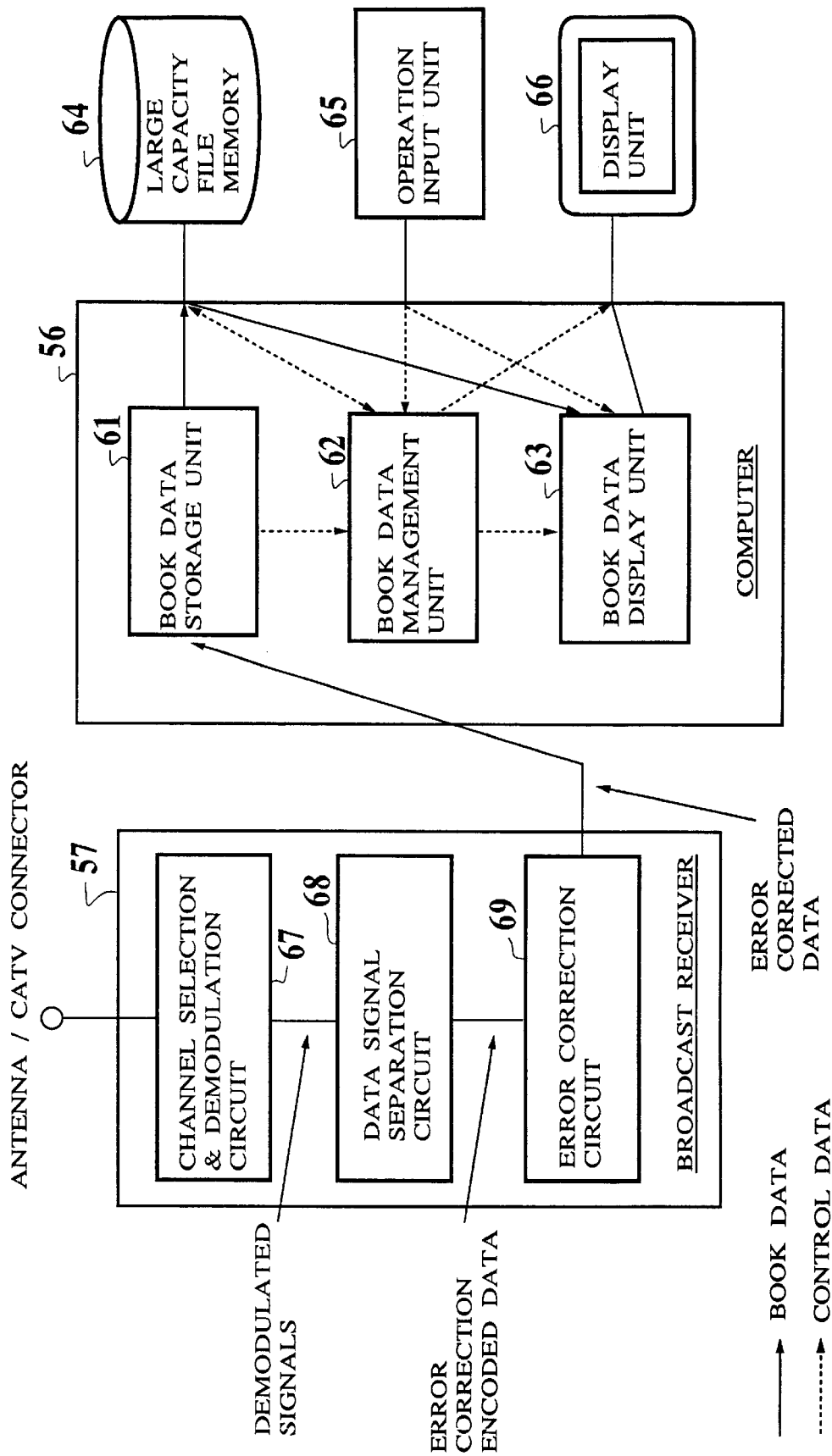

CONTENTS

CHAPTER 1

1A METHOD FOR STORING DATABASE DATA
    1B METHOD OF DISTRIBUTION PROCESSING ON DATABASE DATA
    1C METHOD OF DATABASE DATA COMMUNICATION

CHAPTER 2

2A METHOD FOR MANAGING DATABASE UTILIZATION
    2B METHOD FOR OPERATING DATABASE UTILIZATION DATA

CHAPTER 3

3A METHOD FOR ENCIPHERING DATA
    3B METHOD OF DECIPHERING KEY DELIVERY
    3C METHOD FOR DECIPHERING DATA

CHAPTER 4

4A METHOD OF DATA DISPLAY
    4B METHOD OF DATA ACCESS

3 : BQAZTOVFE
..%CLVYWP! #

4 : N
. $ MQCCDGS !! RNU

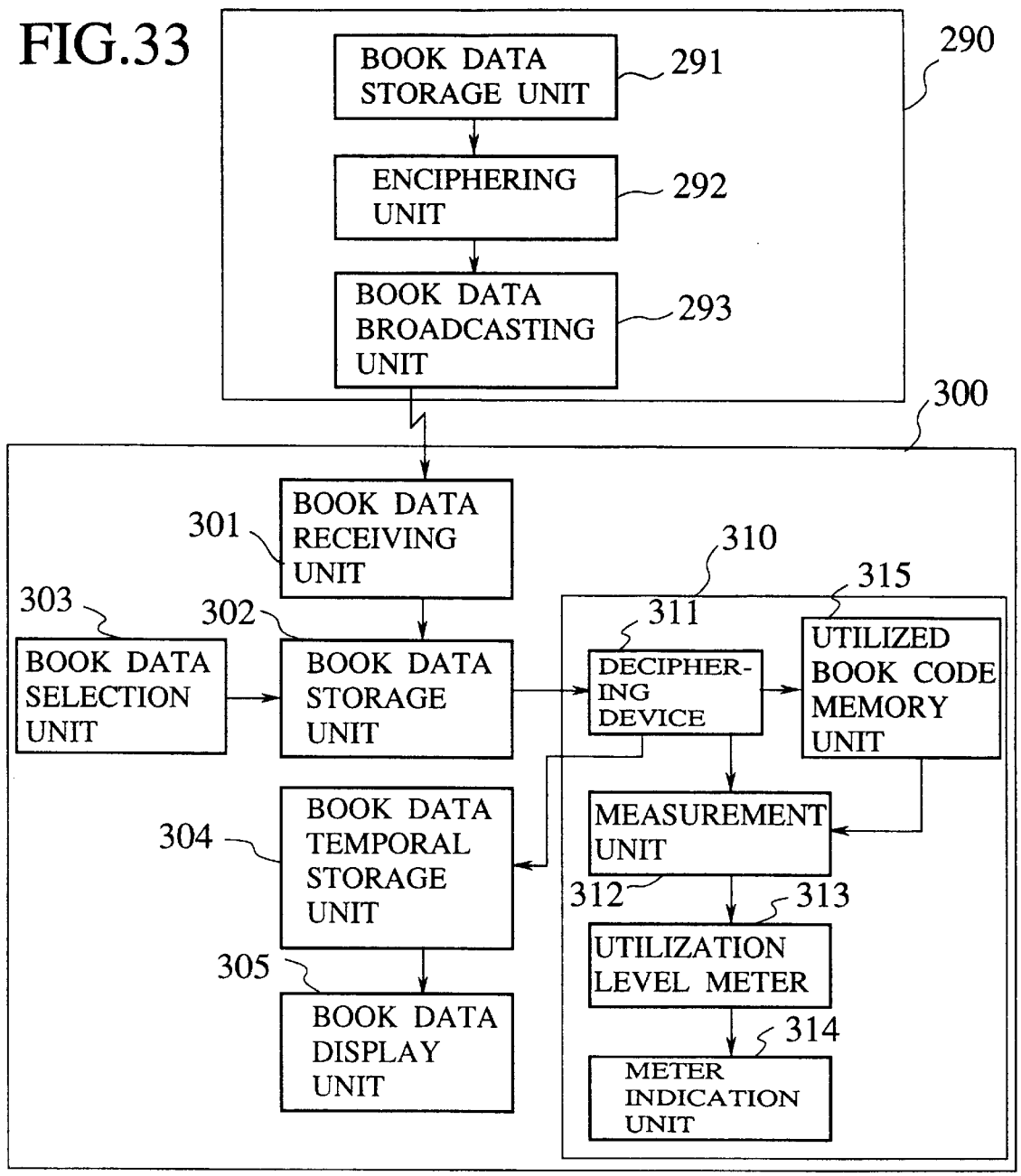

FIG.38

MAY 5   9:10～9:20

| BOOK CODE | BOOK TITLE | PUBLISHER | AUTHOR | PUBLISHED DATE | CATEGORY | CLASSIFICATION | TYPE |
|---|---|---|---|---|---|---|---|
| 3A4005672 | COLLECTED WORKS OF K. MIYAZAWA | ○○BOOKS | K. MIYAZAWA | 95.01.10 | LITERATURE | NOVELS | FAIRY TALES |
| 3A4005673 | | | | 95.01.10 | | | |
| 3A4005674 | | | | 95.01.10 | | | |
| 3A4005675 | | | | 95.01.10 | | | |
| 3A4005676 | | | | 95.01.10 | | | |
| 3A4005677 | | | | 95.01.10 | | | |
| z6F004768 | | | | 95.05.08 | | | |
| s6F004535 | | | | 95.05.07 | | | |
| s6F004536 | | | | 95.05.07 | | | |
| s6F004537 | | | | 95.05.07 | | | |
| s6F004538 | | | | 95.05.07 | | | |
| s6F004539 | | | | 95.05.07 | | | |
| G76000748 | | | | 95.04.20 | | | |
| G76000754 | | | | 95.04.25 | | | |
| G79000865 | | | | 95.05.25 | | | |

```
1 0 0 0 0 A
3 4 3 4 5 B
5 3 5 3 4 D
9 8 3 4 2 J
4 3 5 2 5 K
5 7 9 3 8 Y
```

ADVERTISEMENT ENTRY CODE

"TITLE, BOOK CODE, CONTENTS DATA, TEXT DATA, INDEX DATA"

"ADVERTISEMENT ENTRY CODE, TITLE, BOOK CODE, CONTENTS DATA, TEXT DATA, INDEX DATA"

FIG.46

| DATE | CHANNEL | START TIME | END TIME | BOOK CODE | TITLE | PUBLISHER | AUTHOR |
|---|---|---|---|---|---|---|---|
| 95.1.1 | ALL | 0:00 | 1:00 | A00001 | SCHEDULE | | |
| 95.1.1 | ○○○ | 4:00 | 5:30 | A12222 | J-E DICTIONARY | TTT | H.SUZUKI |
| 95.1.1 | ○○○ | 5:30 | 7:00 | A12346 | E-J DICTIONARY | TTT | H.SUZUKI |
| 95.1.2 | XXX | 1:00 | 2:30 | B11111 | INTRODUC-TION TO ×× | abc BOOKS | T.TANAKA |
| 95.1.3 | ABC | 3:00 | 4:00 | T54321 | WEEKLY NOVELS | CCC | H.YAMADA |

BOOK DATA SERVICE SYSTEM WITH DATA DELIVERY BY BROADCASTING

This is a continuation of Ser. No. 08/270,030 filed Jul. 1, 1994 now abandonded. The parent application is assigned to the Assignee of this application.

BACKGROUND OF THE INVENTION

1. Field of the Invention

The present invention relates to a system for presenting data in an image of a book, and more particularly, to a book data service system in which the book data can be delivered by the broadcasting, only the necessary book data can be selectively stored, the service can be charged according to the accesses to the book data actually made, and the feedback from the user to a data center can be supported.

2. Description of the Background Art

In conjunction with the wide spread use of computers, various schemes for making it easier for a user to utilize the computer have been developed, including the so called Book-Metaphor which is an example of a system generally called electronic book in which the data are presented in an image of a book. The Book-Metaphor is a scheme for displaying the data on a computer in an image imitating a visual appearance of a usual book, in which various operation functions associated with the usual book such as jumping from the table of contents to a desired page, turning pages one by one, etc. are also supported. The software for this Book-Metaphor comprises book data produced in accordance with the prescribed format, and a program for the display of the book data along with the operation functions of a book.

An exemplary book data display image in the Book-Metaphor is shown in FIG. 1, which incorporates a number of navigation buttons for selectively activating the operation functions of a book supported in the Book-Metaphor arranged below the image of the book. Here, as summarized in FIG. 2, the navigation buttons include (a) a button for commanding a display of the front cover, (b) a button for commanding a display of the back cover, (c) a button for commanding a display of a next page (one page forward shift), (d) a button for commanding the display of a previous page (one page backward shift), (e) a button for commanding a continuously forward shift, (f) a button for commanding a continuously backward shift, (g) a button for commanding an attaching/removing of a slip, (h) a button for commanding a rest or ing of an original state be fore the previous operation (undo), and (i) a button for commanding an end of the use of the Book-Metaphor. It is noted that the types and shapes of the navigation buttons are not necessarily limited to those shown in FIGS. 1 and 2 and described here, but the buttons for shifting one page forward and backward are indispensable. In addition, the Book-Metaphor also incorporates a basic function for displaying a page having a table of contents on which any desired chapter or section can be specified, and displaying a page corresponding to the desired chapter or section specified.

In the exemplary display shown in FIG. 1, the image of the book incorporates a number of tags attached on a side edge of the book, which are shifted when the pages are shifted, and a number of slips attached on an upper edge of the book which can be attached or removed by the navigation button (g) mentioned above. When any of these tags or slips is specified, the page at which the specified tag or slip is attached is opened immediately.

Using this Book-Metaphor as described, it becomes possible for a user to read a series of data quickly in a manner similar to that of reading a usual book, in addition to the ordinary manners of utilizing the computer such as the processing of the entered data, the retrieval of a desired data from the database, etc. In particular, as the size and weight of the computer are progressively reduced, it is feasible for this Book-Metaphor to replace the conventional books in the future. In addition, in this Book-Metaphor, the manner of data access is so intuitive that practically anyone can understand it immediately, so that it is particularly suitable for a case requiring a continuous access to a series of very large data, in contrast to the conventional data access scheme in which it is necessary to narrow down the range of data to be displayed minutely by interactive operations, which is not necessarily intuitive for anyone.

Conventionally, the available means for entering the book data in such a Book-Metaphor system included the exchangeable memory medium such as floppy disks, CD-ROMs, and IC memory cards. Namely, the data provider must outputs the produced book data to the exchangeable medium once and then offers the exchangeable medium to the user, while the user must use the book data by displaying the stored book data using a book data display program, either directly from the exchangeable medium or by copying them to a large capacity file memory.

In such a conventional scheme using the exchangeable medium for entering the book data into the system, the medium storing the book data must be sold just as the books or video tapes are sold today. However, except for a case of buying the widely distributed materials such as magazines, the user still have to suffer from the tedious inconvenience of finding an appropriate bookstore first, and then finding a desired book in the bookstore. Also, the data provider may also suffer from the problems of the excessive returned copies or the shortage of the stock copies unless the sales of the book is properly judged beforehand. Moreover, as a physical medium for carrying the data is required for each copy, there is also a problem concerning the waste of resources.

As for the management of the electronic books, as the medium storing the data of the electronic book has conventionally been sold at the bookstore in a manner similar to the usual book, a large number of such media must be managed by the user in a manner similar to the usual books. In addition, even when the user terminal is equipped with a large capacity files capable of storing a plurality of electronic books, it has been difficult to manage a number of independently acquired book data efficiently. Thus, in the conventional electronic books, only the manner of data access and display on the computer have been changed, without changing the manner of providing data and managing data.

Also, when the book data of the electronic book contain the questionnaire or the advertisement for the mail-order, the feedback from the user has been relying on the mail or the telephone just as in a case of the usual books.

As such, compared with the conventional book in paper, the electronic book has advantages related to the possibility of multi-media expression, the powerful data retrieval operation, and the data storage requiring less storage area, but it is still unable to come even close to the conventional book in terms of the beauty of the visual appearance and the easiness of the visual comprehension. Consequently, in order to expect the full-scale spread of the electronic books, it appears necessary to take more advantages of their electronic nature in the aspects related to the manners of providing data, managing data, and supporting the user feedback.

On the other hand, there has been a system in which the database can be remotely inspected from a data center interactively, or a system which broadcasts the mainly text data repeatedly in short cycles, such that the user at the user terminal can selectively acquire and display the broadcasted data as if the user has interactively communicated with the data center. However, it has been impossible to make accesses to a variety of data freely in such a conventional system because of the severe conditions required for the communication cost and the amount of data that can be delivered within one cycle of the broadcast. In particular, it has been impossible in such a conventional data access scheme to make a continuous access to the very lengthy data without minutely specifying the range of the desired data, as required in dealing with the contents of the books.

As for the method of access to the data stored in the database, the conventionally available methods included a method using the command or the keyword entered by the user, and a method for selecting from a menu. However, in the method using the user's command input, there is a need for the user to remember the special command, whereas in the method using the user's keyword input, there is a problem that the user must enter the keyword as registered in the database itself. On the other hand, in the method for selecting from a menu, especially when the database is of a very large scale, the database has a complicated data structure which requires many hierarchical levels in menu such that the selection of a desired data becomes difficult, especially when the classification made used in the database differs from the classification made by the user. Moreover, in this method for selecting from a menu, the operation of the system is difficult such that a considerable amount of time is required in acquiring sufficient system operation skills.

As a solution for these problems, the aforementioned Book-Metaphor is also effective, because in the Book-Metaphor, in addition to the data retrieval based on the index or the list display, it is also possible to realize the data retrieval by browsing through the data content of the database in a manner of turning pages one by one, so that it becomes easier to comprehend the data structure and the operation method from the viewpoint of the data retrieval. In other words, it becomes possible to make a necessary access to the data even without knowing the specific keyword for each data.

Now, in conjunction with the development of the communication technology, the utilization of the database data through the communication network has become fairly common, and it is expected that the utilization of the database data is going to play an even more important role in our society in future. As the data plays an increasingly more important role, there arises a problem concerning the security of the data. Also, there is a need for a system which provides the data only to the selected users having specific rights assigned, in which the users making access to the data must be charged for the use of the database data. Conventionally, the charging for the utilization of the database data has been realized by carrying out the charging processing on the host computer side at the time of transmitting the data content of the requested data from the database.

Moreover, as a method for protecting the security of the data, several digital enciphering methods have been developed, and a conventional scheme for protecting the security of the data has been the uniform enciphering of all the data to be transmitted to the user side according a certain enciphering algorithm. However, in such a conventional scheme, because no clue for recognizing the data contents has been provided, in a case of the retrieval and display of the book data, there arises the problem that the selection of the necessary data cannot be made. For this reason, there has been proposed a scheme for deciphering only a part of the data content so as to provide a clue for the retrieval of the data contents.

However, when the deciphering of the enciphered data at the user terminal side is allowed freely, there arises the problem that the accurate charging processing for the utilization of the data becomes impossible. Moreover, when the enciphered data are transmitted for the purpose of the data retrieval, the data content to be accessed must be enciphered and transmitted once again at the host computer side after the selection of the desired data was made, so that the security of the data cannot be maintained and the amount of communication can also be increased as it is necessary to transmit the same data content twice.

Also, in a case of measuring the utilization state of the data delivered by the broadcasting, the conventionally employed method has been that in which a recording device given to a specific data user in advance is connected to a receiver device and the utilization state of this specific user is recorded. However, the data user can utilize the broadcasting even when the recording device is disconnected from the receiver device so that there is a possibility for the specific data user to disconnect the recording device, and therefore it has been impossible to make the accurate measurement of the utilization states of all the data users.

Also, in a case of utilizing the enciphered data delivered by the broadcasting, as the data cannot be utilized unless the data are deciphered, it has been necessary for the data user to connect a decoder for deciphering the enciphered data to the receiver device. However, conventionally, the decoder without the measurement function has been used for this purpose, so that at a time of charging the fee for utilization of the data to the data user, a particular data utilization fee independent of the amount of data utilization has been charged. From a point of view of the user, this implies that the same fee is charged even when the amount of data utilization is small so that the user may very well consider it as unfair, and this has been a reason for may potential users to refrain from subscribing to the use of the data delivered by the broadcasting.

On the other hand, conventionally, there has been a discussion of a data communication system for carrying out exchanges of the book data among a plurality of systems connected through a network, so as to make it possible for a variety of people to obtain various book data easily. In addition, there has also been a discussion of a manner of displaying the obtained book data to be as easily readable as possible.

However, as a huge number of data become obtainable by such a data communication system, it rather becomes difficult for each user to smoothly select and store the data which are actually required according to each user's need.

Now, the usual book in paper often contains a questionnaire, a quiz, or a solicitation for the reader's opinions or impressions, which requires the feedback from the user, and in such a case, the feedback from the reader to the publisher is normally made via mail or facsimile.

However, in a case of making the feedback to the publisher via mail or facsimile, the reader is required to carry out the work of mailing or facsimile transmitting, which has a qualitatively quite different nature from that of the work of reading, so that it can interrupt the flow of the reading work. Also, because of the reluctance to take the trouble of carrying out the work of qualitatively quite different nature on the user side, the sufficient amount of feedbacks cannot be collected from the users in many cases. From the point of view of the publisher, in a case of computer processing the information obtained from the user feedback, it requires a considerable time and labor to read the contents of the mail or facsimile and entering necessary information into a computer, and it in turn requires a considerable cost and time for this human labor.

On the other hand, there is the book in a form of a catalogue according to which the user can make an order for items or a reservation for an event. From the point of view of the publisher of this catalogue, there is the work of receiving the orders from the readers, and for the automation of such a work, there has been an order receiving system or a reservation accepting system in which the order data or the reservation data produced by an order slip production tool provided on a personal computer can be transmitted via a personal computer communication network to a center for receiving orders. Also, in the so called videotex, there is provided an order entry system in which the order data, reservation data, or answer data for questionnaire can be entered in a manner of interactive dialogue with the center.

FIG. 3A shows an example of an order receiving system using a personal computer, which comprises a host computer 1 equipped with a host terminal 2 located at a data center, which is connected with a user terminal provided by a personal computer 3 through a communication network 4. Here, the communication network 4 can be a transparent network such as the telephone network or ISDN, or a value added network. In a case of the value added network, it can either be a network in which the end-to-end dialogue is supported by the protocol conversion that can be carried out in real time at the network, or a network in which the data transmission and reception can be executed for the users by the network which has long time storage function.

FIG. 3B shows an operation sequence in a case of using either a transparent network or a value added network supporting the dialogue type communication. From the point of view of the dialogue between the terminals, there is no difference among these networks. In the operation sequence of FIG. 3B, in a case the user makes an order, the ordering software is activated at the user terminal personal computer 3, and the order slip is produced by the dialogue between the user and the personal computer 3. Then, the communication software is activated from the ordering software, and the communication path is set up with respect to the host computer 1 through the communication network 4. Here, the host computer 1 is in a state of waiting for communication all the times, and the communication path is set up in response to the call from the user terminal. When the communication path is set up, the order slip data are transmitted collectively, and the host computer 1 which receives the order slip data then carries out the admission processing while returning the admission notice to the user terminal. When there are other order slip data to be transmitted, the user terminal repeats the similar operations for the other order slip data. After the admission notices for all the order slip data are received, the communication path is leased and the communication software and the ordering software are terminated.

In this operation sequence, the contents of the admission processing and the admission notice depend on the required conditions of the system. For instance, it is possible to have a case of immediately making an inventory check and a notification, a case of making an inventory check later on and a notification is made later on by the transmission from the data center side, or a case in which the notification based on the inventory check is omitted as the stock is large enough to eliminate any possibility for the shortage of the stock. In a case of involving the lot drawing as in a case of the ticket reservation, the winners are going to be notified afterwards.

FIG. 4A shows an example of the order entry system in the videotex, in which the videotex terminal 5 replaces the personal computer 4 in FIG. 3A as the user terminal. The similar remarks as mentioned above for the network 4 in FIG. 3A also apply in this case. In the videotex of FIG. 4A, unlike the order receiving system of FIG. 3A, all the screen displays at the videotex terminal 5 are transmitted from the data center in response to the requests made from the videotex terminal 5. Therefore, the production of the order slip is also carried out by the dialogue with the data center.

FIG. 4B shows an operation sequence in this videotex of FIG. 4A, in which the videotex terminal 5 is activated first, and then the communication path is set up with respect to the host computer 1. In response, the initial display is transmitted from the host computer 1, and then using the ordering display transmitted from the host computer 1 in response to the ordering display retrieval request, the order data are entered and the accordingly updated ordering display is transmitted from the host computer 1. Then, the host computer 1 which receives the order data then carries out the admission processing while transmitting the admission notice. After the admission notice is received, the communication path is leased and the videotex terminal 5 is terminated.

By comparing these cases of FIG. 3B and FIG. 4B, the ordering software is required on the user terminal side in a case of FIG. 3B, but the appropriate ordering software may be different according to the conditions of the data center side for receiving the orders, so that the burden on the user can be heavy in a case of dealing with many order receivers. In addition, there is a need to modify the software at the user terminal side in a case of changing the ordering item or the ordering number. In contrast, in a case of FIG. 4B, the function required on the user terminal side is a simple screen display alone, so that the number of order receivers is of no concern as long as a standard protocol is used.

However, in this case, the communication path is maintained even during the production of the order slip, so that when the use of the communication network 4 costs the communication fee, the fee can be higher. Moreover, in a case of using the packet communication network, it can be inconvenient to have such a large amount of data transmission from the data center.

SUMMARY OF THE INVENTION

It is therefore an object of the present invention to provide a book data service system in which the book data can be delivered by the broadcasting and managed by a centralized management, only the necessary book data can be selectively stored at each user terminal, the service can be charged according to the accesses to the book data actually made, and the feedback from the user to a data center can be made by simply entering the feedback content into the displayed book data.

More specifically, it is an object of the present invention to provide a book data service system in which the book data can be delivered to any user located at any place promptly and economically, without causing the waste of resources.

It is another object of the present invention to provide a book data service system in which the accurate charging for the use of the book data can be made without requiring the transmission of the same data content twice.

It is another object of the present invention to provide a book data service system capable of measuring the amount of utilization of the data delivered by the broadcasting by each user.

It is another object of the present invention to provide a book data service system in which the user is allowed to make a selection of a desired data efficiently according to the advertisement for the book data, so as to improve the ease in handling of the system using the data delivery by the broadcasting.

It is another object of the present invention to provide a book data service system in which the feedback to the data center side can be made without interrupting the book data reading operation of the user, the computer input operation for the collected feedback content is unnecessary at the data center side, and the flexible data input from the user terminal to the data center can be realized by requiring only a low communication cost to each user.

According to one aspect of the present invention there is provided a book data service system, comprising: at least one data center including: a data center computer for storing and managing book data; and broadcasting means for broadcasting the book data stored and managed by the data center computer according to a prescribed communication protocol using a synchronization control and an error correction scheme suitable for data delivery by broadcasting without confirmation from a receiving side; and a plurality of user terminals, each user terminal including: receiver means for receiving the book data broadcasted from the broadcasting means of the data center; user terminal computer for storing and managing the book data received by the receiver means; and display means for displaying the book data stored and managed by the user terminal computer.

According to another aspect of the present invention there is provided a method for providing a book data service, comprising the steps of: storing and managing book data on a data center side by a data center computer of a data center; broadcasting the book data stored and managed by the data center computer according to a prescribed communication protocol using a synchronization control and an error correction scheme suitable for data delivery by broadcasting without confirmation from a receiving side; receiving the book data broadcasted from the data center at each user terminal; storing and managing the book data on a user terminal side by a user terminal computer of the user terminal; and displaying the book data stored and managed by the user terminal computer on a display in an image of a book.

Other features and advantages of the present invention will become apparent from the following description taken in conjunction with the accompanying drawings.

BRIEF DESCRIPTION OF THE DRAWINGS

FIGS. 3A and 3B are diagrams of a system configuration and an operation sequence in a conventional order receiving system using a personal computer.

FIG. 5 is a schematic block diagram of a system configuration for the first embodiment of a book data service system according to the present invention.

FIG. 6 is a detailed block diagram of a configuration of the user terminal in the book data service system of FIG. 5.

FIG. 16 is an illustration of a correspondence table used in the key storage unit in the specific configuration of FIG. 13.

FIG. 17 is an illustration of an exemplary data for the table of contents used in the specific configuration of FIG. 13.

FIG. 33 is a detailed block diagram of a modified configuration for the third embodiment of a book data service system according to the present invention.

FIG. 34 is a diagram of the utilization level data used in the modified specific configuration of FIG. 33.

FIG. 38 is an illustration of an exemplary broadcast schedule table used in the user terminal of the book data service system of FIG. 36.

FIG. 46 is an illustration of an exemplary broadcast schedule table used in the user terminal of the specific configuration of FIG. 41.

DETAILED DESCRIPTION OF THE PREFERRED EMBODIMENTS

First, the main features of the book data service system according to the present invention will be summarized briefly.

In the book data service system according to the present invention, the book data are presented in an image of a book, and delivered to each user terminal by the broadcasting. Here, the user terminal is permanently equipped with means for managing the book data and means for displaying the book data which are common to all the user terminals, and only the book data produced according to the prescribed rules are delivered. In this manner, it becomes possible to reduce the amount of data to be delivered, while the display mode and the operation scheme are standardized from the point of view of a user such that the handling of the system becomes easier for the user.

Figure 1:
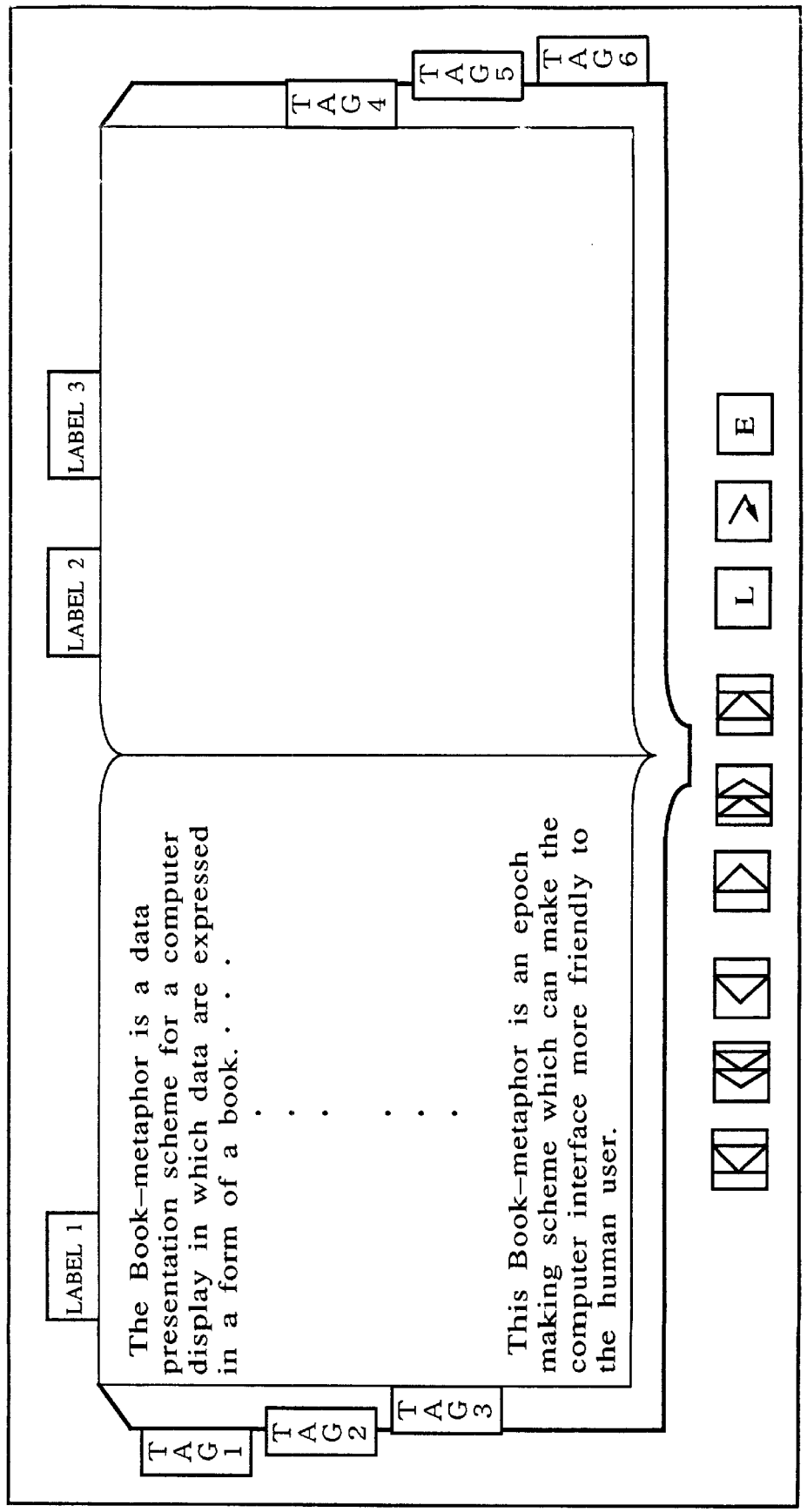
FIG. 1 is an illustration of an exemplary display in the Book-Metaphor system.

Of course, the degrees of freedom for the manner of expression and the manner of operation depending on the type of the book should be retained, but the identical display and operations are to be used for the same purpose. For example, it is normally preferable to use the expression in an image of a double sided book as shown in FIG. 1, but the expression in an image of a single sided book may also be required in a case involving many wide figures and tables. These different types of expressions are to be controlled by the same program for the same operations to realize the functions such as the page turning and the index search.

Also, all the books including those which utilize only the basic function of still image display, as well as those which contain the speeches or dynamic images are handled by the same program, with the only difference concerning whether or not to provide call up buttons for the speeches or dynamic images on the book data display, such that the functions common to various books, such as the page turning and the index search, can be realized by the same operations. In addition, the management data format and menu configuration for enabling the search and selection of the book data are set to be uniform.

The protocol for the book data broadcasting is that which is capable of automatic pull in at the terminal side and using the error correction codes, as it is impossible to make a response or a re-transmission request from the terminal side. Also, in order to explicitly indicate the start and end of each book data, identifiers for indicating the top, middle, and bottom of the book data are provided at prescribed positions among the synchronization codes. In addition, the book codes or field codes, the book title, the author name, the publisher name, etc. which are necessary for the management of the book data are also provided at prescribed positions in the book data.

As the goal of the present invention is to make a large amount of book data freely accessible to the user, the book data broadcasting from the data center is not repeated in a short period of time, and the re-broadcasting is limited to those which are absolutely necessary as the measure against the uncorrectable burst errors, and those of the popular book data after some period of time since the initial broadcasting, while the terminal is equipped with a large capacity file memory such that a large number of book data can be stored and managed. Here, it is preferable to make at least one re-broadcasting of each book data, but any further re-broadcasting is to be carried out according to the aerial state at a time of the broadcasting or a number of requests from the users.

In conjunction with the deliver of book data by the broadcasting, the following two problems arise. One is a problem of how to charge the user, which is relevant in a case of providing the book data in exchange for a fee. The other is a problem that the shortage of the file memory capacity can be caused easily if all the broadcasted book data are to be stored, as an enormous amount of book data are to be delivered day and night.

As a solution to the problem of charging, it is possible to consider the scheme for charging a uniform fee per month from all the subscribers regardless of the amount of accesses actually made, but the charging according to the amount of accesses actually made is more reasonable for the users as well as more rewarding for the author. As a scheme for charging an access to the book data delivered by the broadcasting, there is a scheme in which the book data are enciphered and a deciphering key request is transmitted automatically from the terminal to the data center whenever the user calls up the book data in response to which the deciphering key is returned while charging the fee, and a scheme in which the record of the deciphering operations carried out is inspected by the regular inspection by an inspection worker or the remote inspection from the data center. Here, in a case of providing means for communicating feedbacks from the users to the data center as will be described below, the end-to-end communication through a public communication network between each terminal and the data center is necessary, and such communication means can also be utilized for the supply of the deciphering key or the remote inspection described above, so that the investment required for the purpose of the charging can be reduced.

As a solution to the problem of the book data amount, there is a scheme for selectively storing only those book data whose storing has been reserved by the user in accordance with the broadcast schedule delivered in advance. Here, unlike the reservation by specifying time as in the conventional VTR recording reservation, the reservation is to be made by specifying a book code assigned to each book data such that those book data having the book codes coinciding with reserved book codes are stored.

This reservation scheme is adopted because the reservation by time is less reliable in view of its accuracy as the book data of a normal size can be broadcast in a very short period of time when one TV broadcasting channel is exclusively used for the transmission of the book data, for example, and because the book code is necessary even when the reservation by time is adopted as it is necessary to store the book data with some margins before and after the significant portion and take out the significant portion from the stored data afterwards.

In addition, the reservation by the book code has an advantage in that it is possible to deal with the change of the broadcasting time due to the aerial state or the convenience of the data center. It is also useful in preventing the redundant storage of the already stored book data in a case of the re-broadcasting. Of course, it is also possible to limit the reception time range along with the reservation by the book code from a point of view of saving the power. It is to be noted here that there is no need for the user to be conscious about the book code itself, and the reservation by the book code is made automatically as the user specifies the desired books on the broadcast schedule delivered to the user.

Furthermore, the book data service system according to the present invention also provides means for communicating feedbacks from the user terminal to the data center. More specifically, the user entry spaces or the choice indicating columns are provided in the book data, and the data entered or selected by the user at these user entry spaces or the choice indicating columns are automatically edited in the prescribed format and transmitted to the data center as soon as the data transmission is specified by the user after the entry or the selection of the data. Here, more than one data center may be involved, so that the subscribed network type or number of the data center to which the feedback is to be transmitted is registered in the book data by the prescribed format, and the connection of the data center and the user terminal is automatically made according to the registered information. In response to the feedback received, the data center at least returns the receipt notice immediately, such that the receipt result can be displayed at the user terminal side. In a case of returning the result of the processing at the data center, it is returned along with the receipt notice immediately if possible, or it is returned separately by the call initiated by the data center as in a case of the ticket reservation involving the drawing in which it is impossible to return it immediately, Among these features of the book data service system according to the present invention, the book data delivery using the broadcasting is a feature common to all the embodiments described below, while the features concerning the charging, the storing reservation, and the feedback communication are mutually compatible with each other, so that it is possible to construct the system incorporating all of these features simultaneously.

Now, the first embodiment of the book data service system according to the present invention will be described in detail.

In this first embodiment, the book data service system has a system configuration as shown in FIG. 5, which comprises: a data center 50 equipped with a computer 51 containing a book data storage unit 52 for storing the book data and a book data broadcast management unit 53 for managing the mroadcasting of the book data, and a broadcasting facility 54 for executing the broadcasting of the book data; and a plurality of user terminals 55, each containing a computer 56 for manipulating the book data and a broadcast recevier 57 for receiving the broadcast from the data center 50. Here, it is also possible to provide more than one data center 50 in which case the broadcast receiver 57 of the user terminal 55 is required to have a function for selecting the frequency or other characteristic of the broadcasting radio waves from each data center 50. Also, the broadcasting is not necessarily limited to the radio broadcasting, and can be a wire broadcasting in a manner of the cable TV.

The user terminal 55 has a detailed configuration as shown in FIG. 6, where the broadcast receiver 57 includes a channel selection and demodulation circuit 67 connected with an antenna or a CATV connector for removing a broadcasting carrier from the received signals to obtain demodulated signals, a data signal separation circuit 68 for separating the error correction encoded data from the demodulated signals, and an error correction circuit 69 for applying an error correction to the error correction encoded data to obtain the error corrected data representing the received book data. On the other hand, the computer 56 includes a book data storage unit 61, a book data management unit 62, and a book data display unit 63, while the computer 56 is also equipped with peripheral devices such as a large capacity file memory 64, an operation input unit 65, and a display unit 66, which are utilized in storing and displaying the book data.

Here, the large capacity file memory 64 is usually realized by a hard disk device, but it can be realized by the other memory device as long as sufficient memory capacity and memory access performance can be provided. The operation input unit 65 usually incorporates a keyboard and a mouse, but it may also incorporate the other input device such as a pen input device, or a touch panel display to be provided integrally with the display unit 66. It is also noted that these peripheral devices can be provided within the main body of the computer 56 if desired.

This system shown in FIG. 5 and FIG. 6 operates as follows. First, the data delivery from the data center 50 is achieved by supplying the book data stored in the book data storage unit 52 of the computer 51 to the broadcasting facility 54 in accordance with the broadcast schedule registered in advance in the book data broadcast management unit 53, and then sequentially boradcasting the supplied book data from the broadcasting facility 54. At this point, the broadcasted signals are those in which the digital data are divided into appropriate sizes, the error correction codes and the synchronization codes are added, and then superposed onto the broadcast carrier, as in a case of the multi-channel character broadcasting.

At the user terminal 55, the broadcasted signals are received by the broadcast receiver 57, and the error corrected data are supplied to the computer 56 as described above. In the computer 56, the main body of the book data is taken out from the received data by separating the management data, and stored into the large capacity file memory 64 by the book data storage unit 61, while at the same time, the management data such as the book title, author name, field name, etc. are taken out and and supplied to the book data management unit 62 along with a file name of the stored book data, in response to which the book data management unit 62 updates the book management data. The book management data are also stored in the large capacity file memory 64.

The presentation of the stored book data is made in such a manner that, in response to an access to the book data management unit 62 made by the user by using the operation input unit 65, the book data management unit 62 reads out the book management data from the large capacity file memory 64, and then produces and displays the book menu on the display unit 66. In this display of the book menu, the selection of the book data can be made easier by narrowing the books listed on the menu by specifying the author name, the field of the book, etc. as the key data. Then, as the desired book is selected by the user on the book menu, the book data management unit 62 supplies the file name of the selected book data to the book data display unit 63, and the book-data display unit 63 reads out the corresponding book data from the large capacity file memory 64 and displays the front cover of the read out book data on the display unit 66. Thereafter, the display of the book data in accordance with the usual operations and display functions of the Book-Metaphor is going to be carried out.

Here, the broadcasting facility 54 of the data center 50 broadcasts the book data according to the prescribed communication protocol suitable for the data delivery by the broadcasting, in which the synchroinization control and the error correction can be made without the confirmation signal from the user terminal 55, by adding the control data and the error correction codes, and appropriately modulating the book data. In correspondence, the broadcast receiver 57 of the user terminal 55 receives the broadcasting signals of the radio broadcasting or the wire broadcasting, and extracts the data to be supplied to the computer 56 according to the prescribed communication protocol. In a case of the radio broadcasting, the communication protocol has a sufficient redundancy level such as that of the multi-channel character broadcasting as mentioned above.

It is also to be noted that the book data storage unit 52 of the computer 51 may not necessarily be provided in the same building as the broadcasting facility 54, but the book data broadcast management unit 53 should be provided in a vicinity of the broadcasting facility 54, and the book data storage unit 52 and the book data broadcast management unit 53 can be connected either by the communication line or by transportation of the data storing medium.

Figures 2, 7:
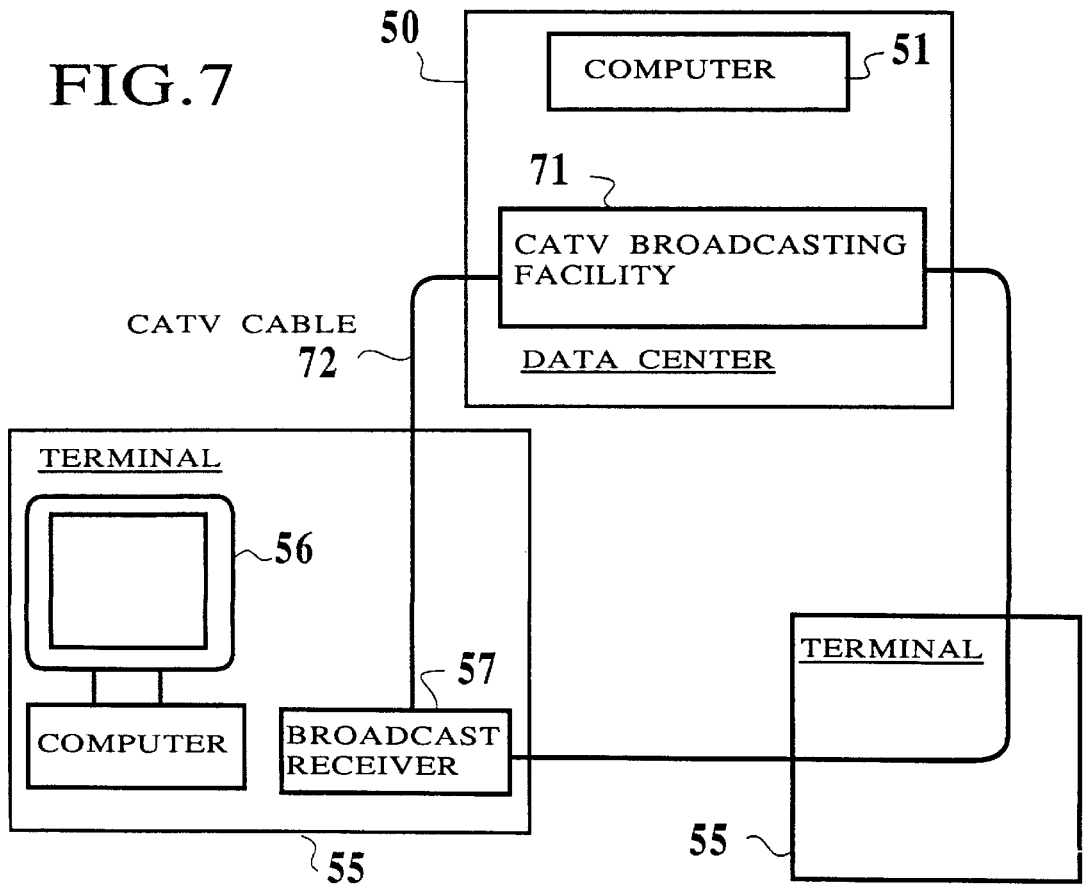
FIG. 2 is a list of navigation buttons provided in the display of FIG. 1.
FIG. 7 is a schematic block diagram of a modified system configuration for the first embodiment of a book data service system according to the present invention.
Figure 4A:
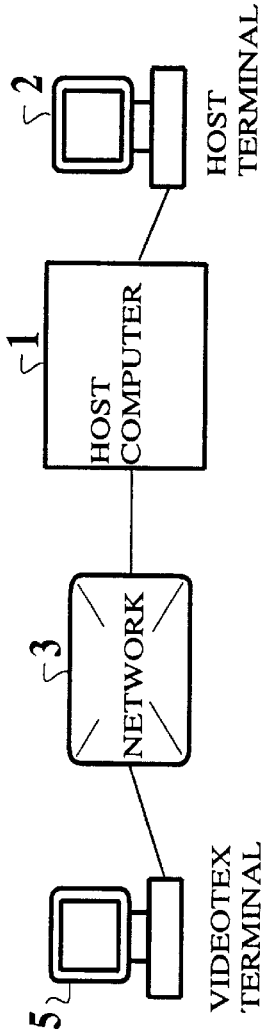
FIGS. 4A and 4B are diagrams of a system configuration and an operation sequence in a conventional order entry system in the videotex.
Figure 4B:
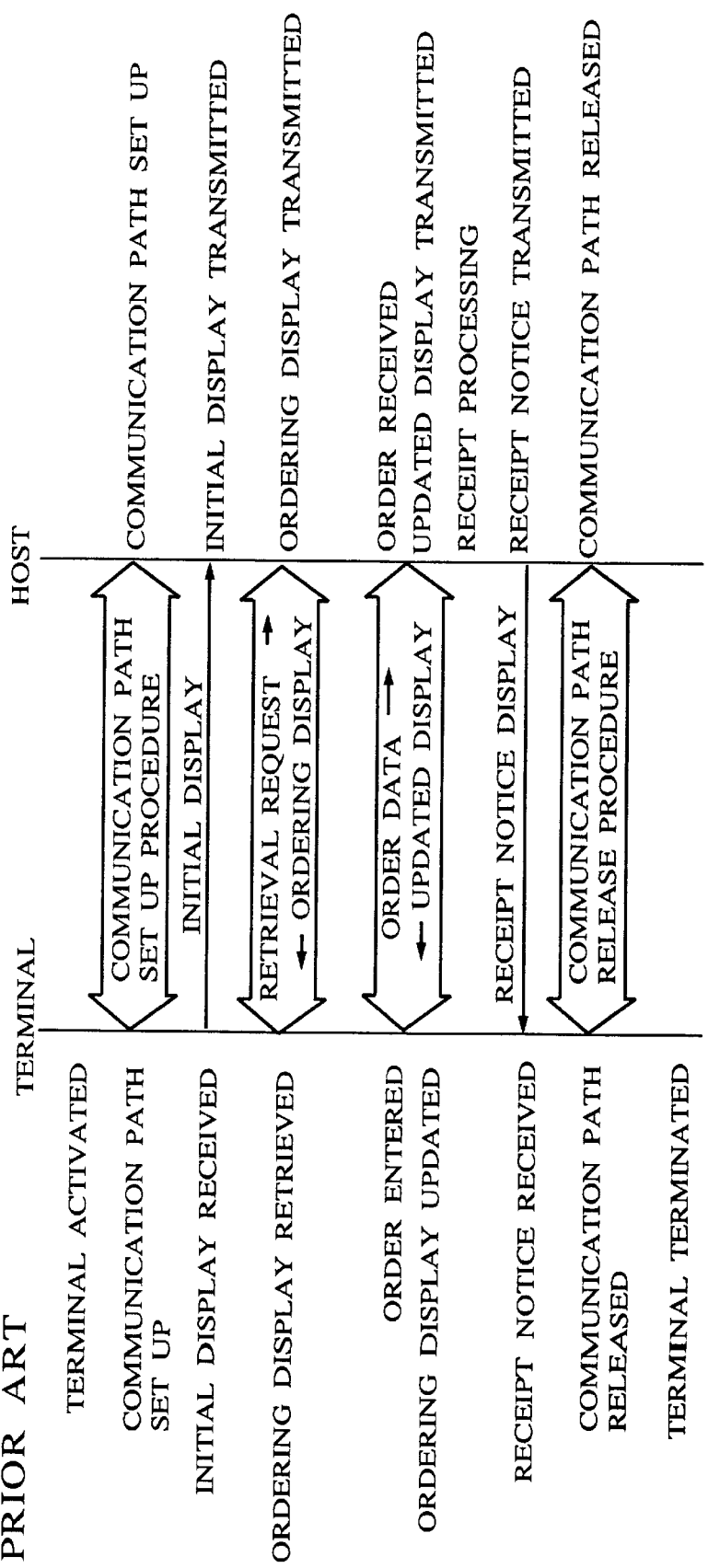

FIG. 7 shows an alternative system configuration for this first embodiment, in which the CATV is utilized for the delivery of the book data. In this case, the data center is equipped with a CATV broadcasting facility 71 connected with the broadcast receiver 57 of each user terminal 55 through a CATV cable 72. The rest is similar to the system configuration of FIG. 5. In this case, the communication protocol of the multi-channel character broadcasting is also suitable because of the affinity with the CATV broadcasting mechanism. However, in this case, the reliability of the data transmission is high because of the wire broadcasting, so that the more efficient communication protocol with the lower redundancy level may be used if desired.

Here, as a communication scheme similar to the wire broadcasting, the off-talk communication utilizing the subscriber lines of the telephone or ISDN may also be used, in which case the book data can be transmitted instead of the usual facsimile data within the communication protocol of the off-talk facsimile communication. Also, by using the digital off-talk communication, it becomes possible to make the data transmission at a higher speed. It is to be noted however that, by using the telephone subscriber lines or the digital subscriber lines of 64 kb/s, the transmission of the book data for one book can take as long as several minutes to several tens of minutes, so that the use of these transmission lines may be limited for the special purposes until the higher speed ISDN becomes widely available.

Figure 8:
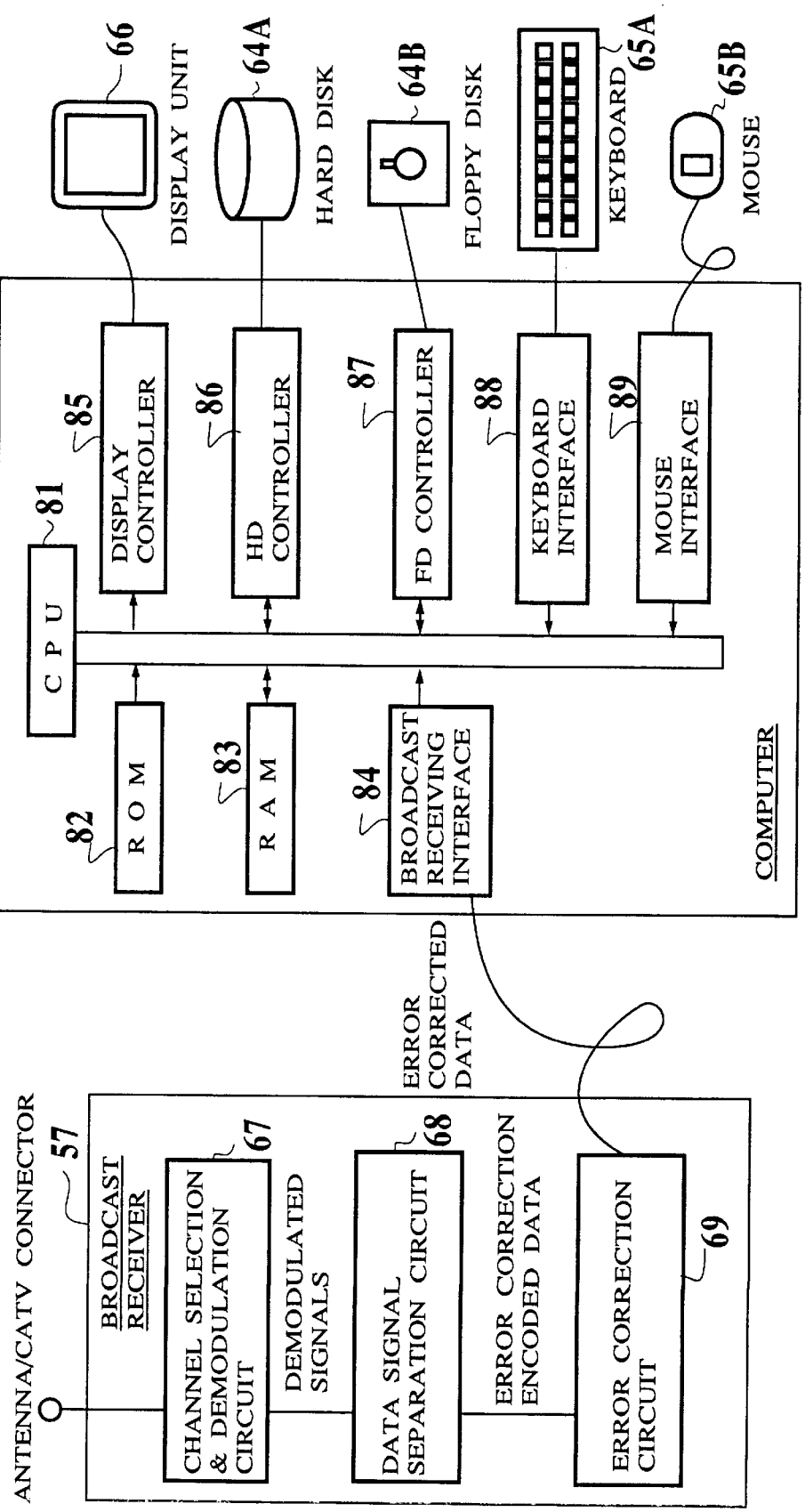
FIG. 8 is a detailed block diagram of an exemplary specific configuration of the user terminal in the book data service system of FIG. 5.

The user terminal 55 shown in FIG. 6 can have a more specific configuration as shown in FIG. 8, in which the radio antenna or the CATV wire connector is not explicitly shown. In the broadcast receiver 57, the channel selection and demodulation circuit 67 selects and demodulates the channel such as that of the multi-channel character broadcasting for example, and the data signal separation circuit 68 extracts the significant data. In a case of the multi-channel character broadcasting, the character signals can be separated from the signal waveform of the vertical interval signals. Then, the error correction circuit 69 carries out the error correction using the error correction codes of the received data, and the obtained data are supplied to the computer 56.

The computer 56 comprises a processor (CPU) 81, a ROM 82 and a RAM 83 for storing programs, etc., a broadcast receiving interface 84 for receiving received data from the broadcast receiver 57, a display controller 85 for controlling the display on the display unit 66, a hard disk (HD) controller 86 for controlling data input/output of the hard disk device 64A, a floppy disk (FD) controller 87 for controlling data input/output of the floppy disk device 64B, a keyboard interface 88 for controlling input from the keyboard 65A, and a mouse interface 89 for controlling input from the mouse 65B.

When the book data receiving function of the book data display program for realizing the operation of the book data display unit 63 of FIG. 6 is active on the computer 56, the book code of the received data is checked, and the received data are written into the hard disk device 64A if the received data are new data, while updating the list of the books accordingly. When the book data reception becomes abnormal in the middle of operation, the received data are discarded and the incoming data are ignored until the next new book data arrive.

Here, the book with a large data amount has a higher chance of encountering the radio obstruction in a the middle of operation, so that it is possible to carry out the storing in units of chapters or pages, such that the normally received chapters or pages can be stored even after the book data reception is interrupted in the middle of operation as parts of the incompletely received book, and the missing parts can be supplemented afterwards by the book data reception of the re-broadcasting. In this case, it is necessary to define in advance the data structure in which the storing units such as chapters or pages can be re-arranged on the memory.

Figure 9:
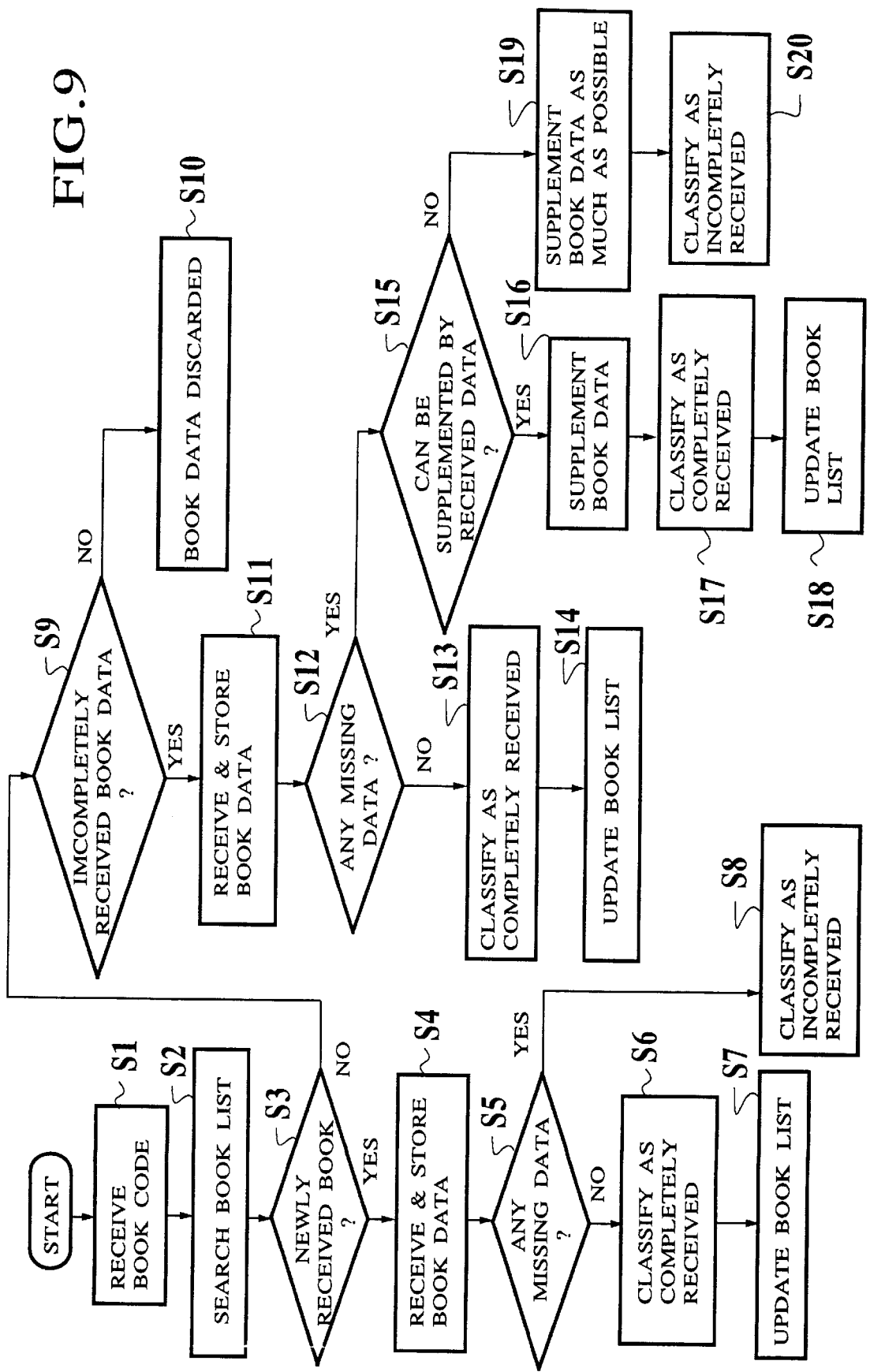
FIG. 9 is a flow chart for the book data reception processing at the user terminal in the book data service system of FIG. 5.

In this case, the book data reception processing at the computer 56 including the data supplementing can be carried out according to the flow chart of FIG. 9 as follows.

Namely, the book code is received (step S1), and the list of the already received books is searched through (step S2) to judge whether the received book data is the newly received book or not (step S3). In a case of the newly received book, the book data is received and stored (step S4), while judging if there is any missing data or not (step S5). If there is no missing data, the received book data is classified as the completely received book data (step S6), and the book list is updated to add the entry for this book data (step S7). If there is some missing data, the received book data is classified as the incompletely received book data (step S8), and then the re-broadcasting is awaited as an opportunity for supplementing the book data.

When the received book data is not the newly received book, whether it is the already received book which is classified as the incompletely received or not is judged (step S9). If it is not the incompletely received book data, it implies that it is the already received book, so that the received book data is discarded (step S10). If it is the incompletely received book data, the book data is received and stored (step S11), while judging if there is any missing data or not (step S12). If there is no missing data, the received book data is classified as the completely received book data (step S13), and the book list is updated to add the entry for this book data (step S14).

If there is some missing data, whether it is possible to supplement the missing data from the already received data or not is judged (step S15). If it is possible, the missing data of the book data is suppledmented by the already received data (step S16), and the received book data is classified as the completely received book data (step S17) while the book list is updated to add the entry for this book data (step S18). If it is not possible, the missing data of the book data is suppledmented as much as possible by the already received data (step S19), and the received book data is classified as the incompletely received book data (step S20), and then the re-broadcasting is awaited as an opportunity for supplementing the missing data.

As a simpler alternative scheme, the book can be formed in number of volumes, and the storing and discarding of the book data can be allowed only in units of volumes, so as to eliminate the intermediate state such as the incompletely received state.

Figure 10:
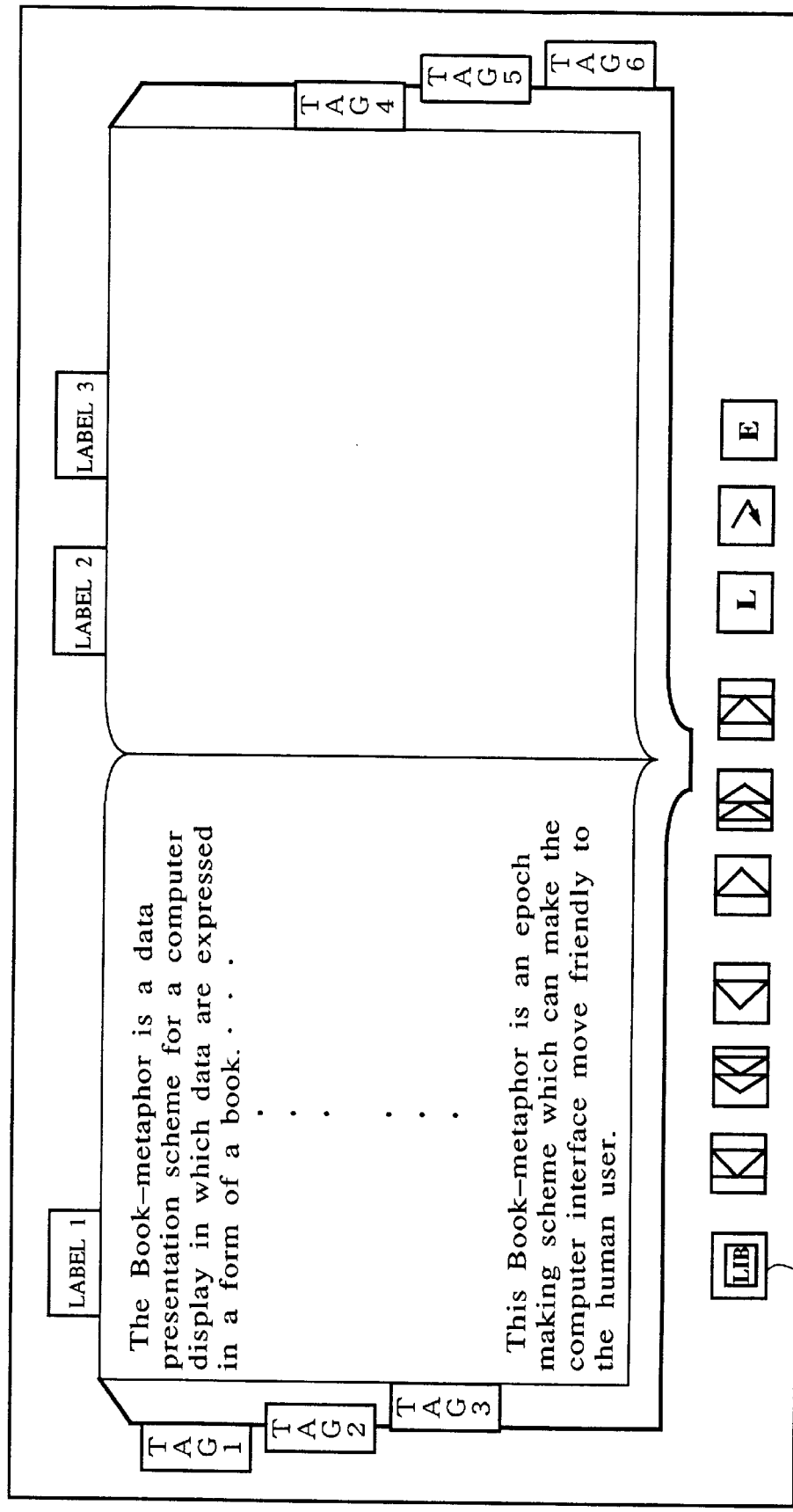
FIG. 10 is an illustration of an exemplary display the user terminal in the book data service system of FIG. 5.

When the user reads the book, the book data display program is called up as a front task. In this book data service system, the library function to manage the books is indispensable as a large number of books are to be stored. To this end, as shown in FIG. 10, the book data display can incorporate a library button 100 as one of the navigation buttons. In the reading operation, when this library button 100 is specified by the mouse 65B, the list of the books stored in the file memory such as the hard disk device 64A is displayed. Then, when one book title on the list is specified by the mouse 65B, the corresponding book data is read out from the file memory and displayed, starting from the front cover. Thereafter, the user can read any desired page of this book by specifying an appropriate one of the navigation buttons, the table of contents, tags, and labels by the mouse 65B to control the display appropriately.

It is more convenient to provide the user terminal of this book data service system in a portable type, using a portable computer for the computer 56. In this case, it is naturally preferable to utilize the compact and easy to operate portable computer suitable for the purpose of reading the book. Even in a case of the desk top type user terminal, in a case of the frequency use, the integral installation of the broadcast receiver 57 or the simplification of the keyboard or pointing device may be beneficial.

As described, according to this first embodiment, the book data are delivered by the broadcasting, so that the book data can be obtained by any user lcated at any place, quickly and cheaply, and as no memory medium is required for the purpose of selling the book data, it is advantageous in saving the resources and the space.

In this book data service system, the data center possesses a number of book data produced at the center computer or other computers, and supplies the book data to the broadcasting facility sequentially, while the broadcasting facility carries out the broadcasting similar to the multi-channel character broadcasting for example, by adding necessary data and modulating the book data according to the communication protocol suitable for the data delivery by the broadcasting. In the communication protocol of the multi-channel character broadcasting, it is assumed that there is no confirmation signal from the receiver side, and therefore the sufficient redundancy is provided in the synchronization codes for determining the position of the signficant data and the error correction codes for making the data error correction, so that it is suitable for the data delivery by the broadcasting.

The multi-channel character broadcasting is only an example of the communication protocols that can be utilized in this book data service system, and any communication protocol can be utilized as long as it is capable of making the data transmission at the sufficient reliability without using the confirmation signal from the receiver side. However, in a case of using the radio broadcasting, the reception error due to the bursty radio obstruction is unavoidable. There are also possibilities for failing to receive the desired data in a case of forgetting to turn on the power at the receiver side, or in a case of using the computer in which the data reception cannot be handled simultaneously with the other processing such as the book data display for example. Consequently, in operating the system, it is necessary to take these possibilities in consideration and provide the re-broadcasting of the same book data after some time interval, for instance. Here, in the multi-channel character broadcasting, the data are transmitted by utilizing the vertical retrace interval in the TV broadcasting signals, so that when the demand for the broadcasting of the book data increases, the allocation of the dedicated frequency channel may be considered.

On the user terminal side, the received book data are demodulated, and the extraction of the significant data and the data error correction are made according to the prescribed communication protocol, and the obtained book data are stored in the file memory at the computer. Consequently, when the single task OS is used, the data reception and the other processing cannot be carried out simultaneously, but when the multi-task OS is used, the task concerning the data reception in the book data display program can be set in a running state all the times in the background, such that the desired book data can be received without a failure. Here, when a plurality of computers are connected through the LAN, and one of them is made to be a book data receiving server implementing the multi-task OS and the book data receiving function, the book data reception failure can be prevented for the other computers as the other computers can copy the necessary book data from the book data receiving server when they are idle. If the problem related to the performance such as the display speed is ignored, it is also possible to adopt the scheme in which the access is made to the file memory of the book data receiving server whenever the need arises.

At a time of the data storing, the book data storage unit 61 checks the received data automatically, so as not to store the already stored book data again in a case of the re-broadcasting. Also, by using the book data management unit 62 for allowing the user to make a selection by displaying the list in which the books stored in the file memory are appropriately classified, and the book data display unit 63 for realizing the book functions such as the page turning on the selected book data, the desired book can be selected and displayed according to the user's input.

Thus, in this book data service system, any user at any place can obtain the book data quickly and cheaply, and read the desired book data whenever the user wishes. Moreover, the file memory can store a large number of book data, while the unnecessary book data can be deleted to make room for new book data, so that the saving of the resource and space can be achieved effectively.

Next, the second embodiment of the book data service system according to the present invention will be described in detail.

Figure 11:
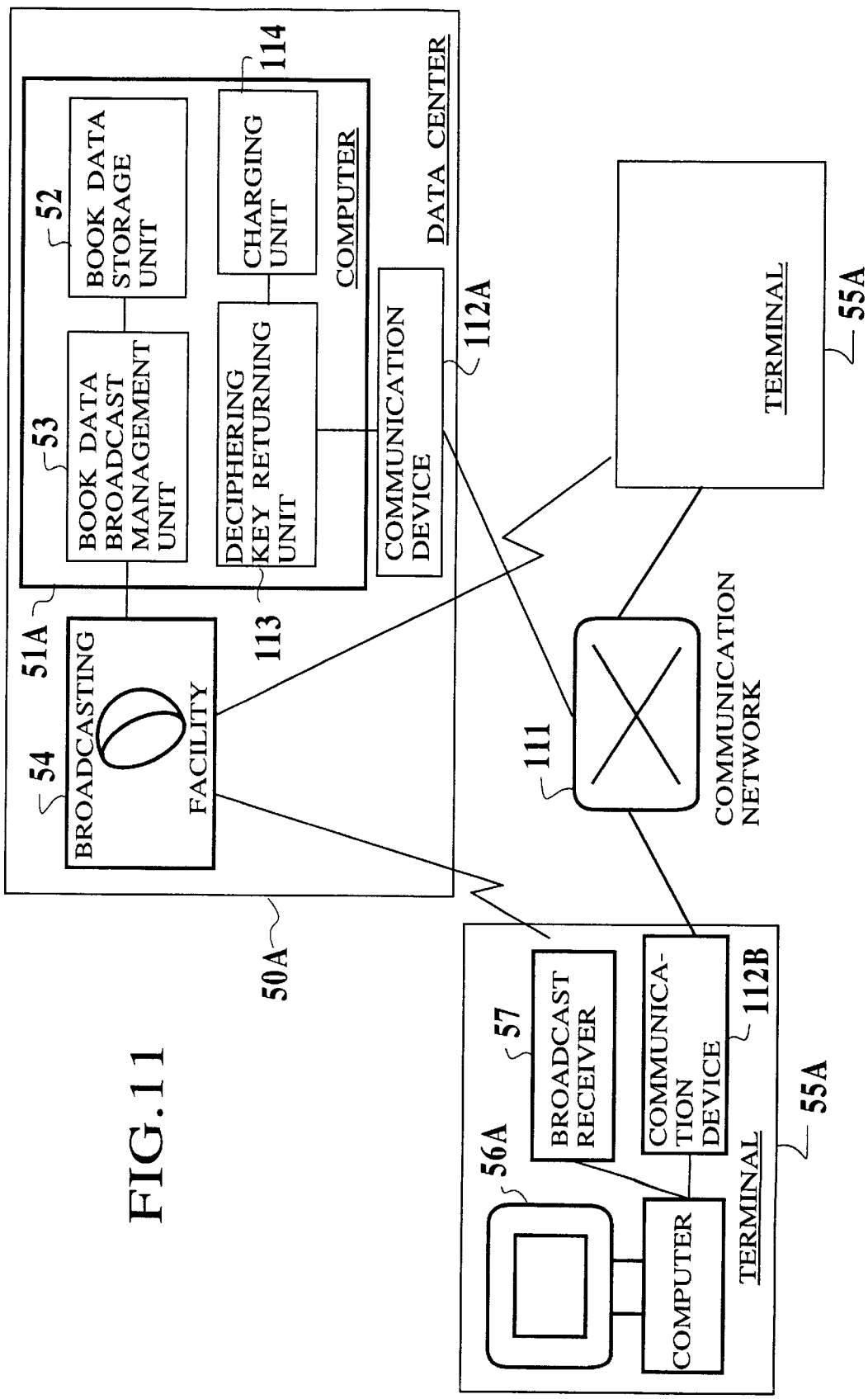
FIG. 11 is a schematic block diagram of a system configuration for the second embodiment of a book data service system according to the present invention.

In this second embodiment, the book data service system has a system configuration as shown in FIG. 11 where, in addition to the system configuration of FIG. 5 described above, the data center 50A and the user terminal 55A are equipped with communication devices 112A and 112B, respectively, which are capable of making one-to-one communication through a communication network 111.

Moreover, the computer 51A of the data center 50A further includes a deciphering key returning unit 113 connected with the communication device 112A which returns the deciphering key corresponding to the requested book data in response to the deciphering key request made from the user terminal 55A, and a charging unit 114 connected with the deciphering key returning unit 113 which calculates the charge for each user.

Figure 12:
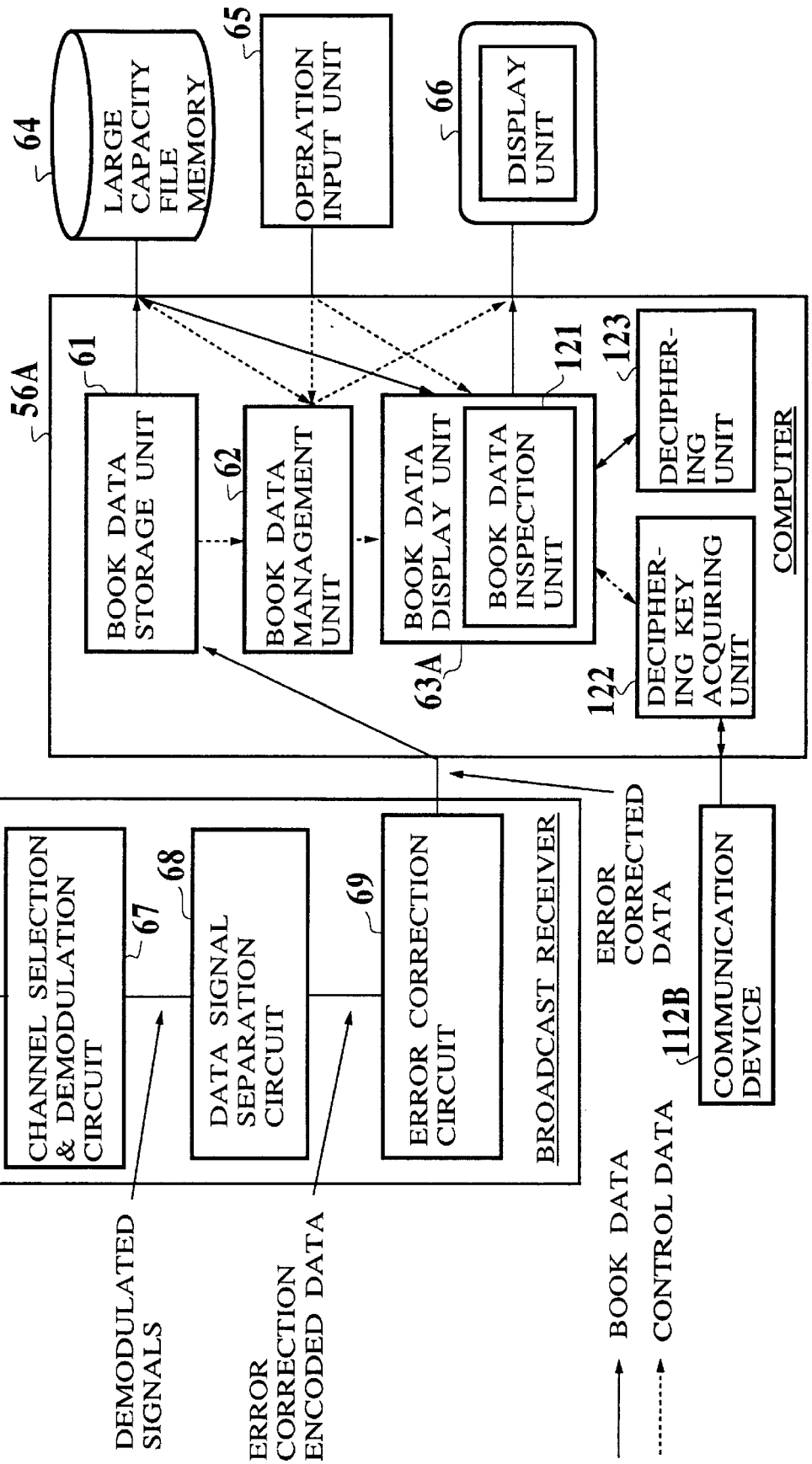
FIG. 12 is a detailed block diagram of a configuration of the user terminal in the book data service system of FIG. 11.

The user terminal 55A has a detailed configuration as shown in FIG. 12 where the configuration of FIG. 6 described above is modified such that the book data display unit 63A includes the book data inspection unit 121 for inspecting whether the book data are enciphered or not, and the computer 56A further including a deciphering key acquiring unit 122 for acquiring the deciphering key via the communication device 112B and a deciphering unit 123 for deciphring the enciphered book data, both of which are connected with the book data display unit 63A. Here, the deciphering unit 123 may be provided as an external dedicated decoder if desired.

This system shown in FIG. 11 and FIG. 12 operates similarly as in the first embodiment described above as far as the delivery, reception, and storing of the book data are concerned. However, the operation at a time of displaying the book data is different as follows.

Namely, at a time of the book data display, first, the desired book is selected at the book data management unit 62 and notified to the book data display unit 63A, which reads out the corresponding book data for the selected book from the large capacity file memory 64. Then, the book data inspection unit 121 of the book data display unit 63A inspects whether the read out book data is enciphered or not. If it is not enciphered, the displaying of the book data on the display unit 66 is straightforwardly carried out by the book data display unit 63A. On the other hand, in a case it is enciphered, the user is inquired as to the need for deciphering this enciphered book data. When the user refuses the deciphering, the message to ask for the selection of the other page, chapter, or book is displayed. When the user requests the deciphering, the deciphring key acquiring unit 122 produces the deciphering key request and transmits the produced deciphering key request to the data center 50A via the communication device 112B.

In response to the deciphering key request received via the communication device 112A, the deciphering key returning unit 113 of the data center 50A returns the appropriate deciphering key via the communication unit 112A, and the deciphering key received via the communication unit 112B is given to the book data display unit 63A through the deciphering key acquiring unit 122. Then, the book data display unit 63A supplies the acquired deciphering key along with the book data to be deciphered to the deciphering unit 123, which deciphers the book data by using the acquired deciphering key and returns the deciphered book data to the book data display unit 63A. The book data display unit 63A then carried out the display of the deciphered book data on the display unit 66.

Here, when the deciphering key is not free and is charged, the fee charged for the deciphering key is also indicated at the time of inquiring the need for the deciphering. In a case of returning the charged deciphering key, the charging unit 114 of the data center 50A charges the fee to the user. The book data is usually not enciphered entirely, and the front cover, the table of contents, or the introduction section, etc. is usually left unenciphered so as to be enable the user to comprehend the outline of the book, and the inquiry of the need for deciphering is not made at a time of displaying these unenciphered pages, but made only when the display of the enciphered pages is requested. Once the deciphering key is acquired, there is no need to re-acquire the deciphering key while displaying the effective range of the acquired deciphering key, but it is not necessary for one book to be able to decipher by only one deciphering key and the different deciphering keys may be required in units of chapters, for example. In such a case, it is necessry to request the deciphering key at every new chapter to be displayed.

Whether or not to allow the user terminal 55A to store the acquired deciphering key and the deciphered book data after the displaying of the deciphered book data depends on the setting of the fees. In order not to allow the storing of the of the deciphering key and the deciphered book data, it is necessary to make the internal design of the user terminal program to be not publicly disclosed, and to supply the user terminal program from the book data service provider's side.

Figure 13:
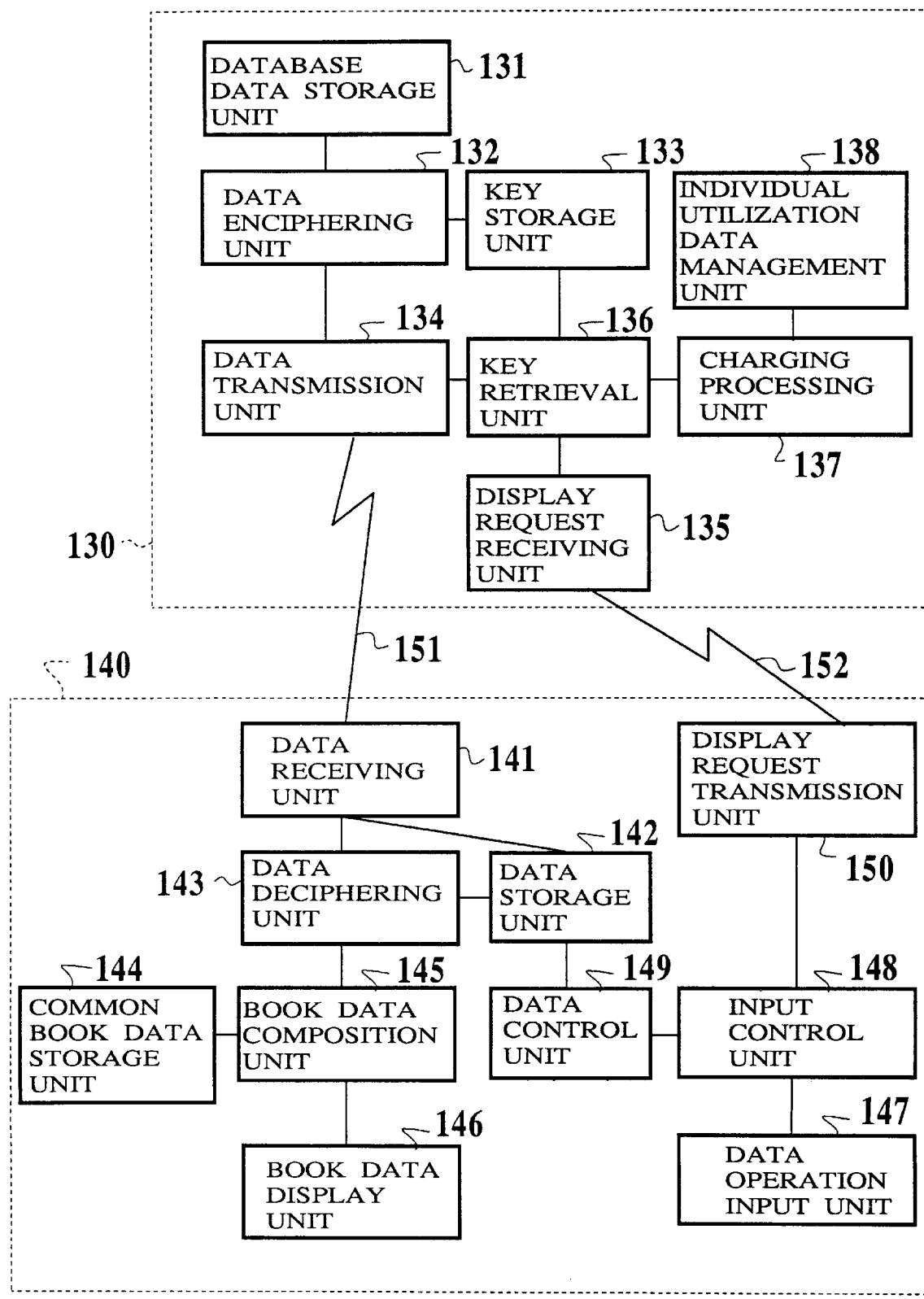
FIG. 13 is a detailed block diagram of one specific configuration for the second embodiment of a book data service system according to the present invention.

In further detail, according to this second embodiment, the book data service system has a detailed configuration as shown in FIG. 13, which realizes the charging processing according to the database utilization and management scheme according to the present invention. In this system, there are more than one user terminals even though only one user terminal is shown in FIG. 13, and each user terminal is identified by a user registration number.

The system of FIG. 13 generally comprises a data center side system 130 and a user terminal side system 140, which are mutually connected through communication lines 151 and 152.

The data center side system 130 comprises: a data base data storage unit 131 for storing database data; a data enciphering unit 132 for enciphering different items of the database data stored in the database data storage unit 131 by different keys; a key storage unit 133 for storing a key for each item of the database data; a data transmission unit 134 for transmitting the enciphered database data and key data to the user terminal side system 140; a display request receiving unit 1for receiving a data content display request from the user terminal side system 140; a key retrieval unit 136 for retrieving the key for an item specified by the data content display request from the key storage unit 133 and transmitting it to the data transmission unit 134, while also generating a processing signal for a charging processing; a charging processing unit 137 for carrying out the charging processing in response to the processing signal from the key retrieval unit 136; and an individual utilization data management unit 138 for storing charging data for each user.

Here, the data transmission unit 134 attaches an item number for each item of the database data at a time of transmitting the enciphered database data, and at a time of transmitting the key data obtained from the key retrieval unit 136, it also transmits a signal indicating that it is the key data along with the key data. The display request receiving unit 1transmits the item number requested to be displayed and the user registration number of the requesting user to the key retrieval unit 136 when the data content display request is received through the transmission line 152. The key retrieval unit 136 reads out the key data corresponding to the item number requested to be displayed from the key storage unit 133, and transmits the user registration number to the charging processing unit 137, while transmitting the read out key data to the data transmission unit 134. The individual utilization data management unit 138 stores the a number of utilized database items in correspondence to each user registration number. Then, the charging processing unit 137 reads out the number of utilized database items for the requesting user from the individual utilization data management unit 138 according to the user registration number received from the key retrieval unit 136, adds one to the read out number, and stores the new number of utilized database items into the individual utilization data management unit 138.

On the other hand, the user terminal side system 140 comprises: a data receiving unit 141 for receiving the database data and the key data transmitted from the data center side system 130; a data storage unit 142 for storing the received database data; a data deciphering unit 143 for deciphering the database data stored in the data storage unit 142 by using the received key data; a common book data storage unit 144 for storing common book data indicating data common to all the book data such as the format data; a book data composition unit 145 for obtaining the book data by composing the deciphered database data and the common book data; a book data display unit 146 for displaying the composed book data on a display; a data operation input unit 147 for entering data retrieval operation or data content display request operation by the user; an input control unit 148 for converting the signals entered at the data operation input unit 147, recognizing the content of the entered operation, and transmitting the converted signals to a data control unit 149 or a display request transmission unit 150 to be described below according to the recognized content; a data control unit 149 for controlling the data storage unit 142 according to the entered operation when the entered operation is the data retrieval operation; and a display request transmission unit 150 for transmitting the data content display request to the data center side system 130 when the entered operation is the data content display request operation.

Here, the data receiving unit 141 transmits the database data by attaching the item number to each item to the data storage unit 142 when the database data is received, or transmits the key data to the data deciphering unit 143 when the received data contains the signal indicating that it is the key data. The data storage unit 142 stores the database data transmitted from the data center side system 130 with the item number as an index, and transmits the database data to the data control unit 149 by restoring the data structure according to the item numbers, while transmitting the database data corresponding to the item number specified from the data control unit 149 to the data deciphering unit 143. Also, the data deciphering unit 143 transmits the deciphered database data to the book data composition unit 145 by deciphering the enciphered database data by using the received key when the key data is supplied from the data receiving unit 141, or transmits the received database data as it is to the book data composition unit 145 when no key data is supplied from the data receiving unit 141. The display request transmission unit 150 memorizes the user registration number, and transmits the received item number along with the user registration number to the data center side system 130 when the item number is received from the input control unit 148.

Now, the data retrieval operation and the data content display request operation in this book data service system of FIG. 13 will be described. The data control input unit 147 is equipped with an input device such as a keyboard containing a cursor key. In this embodiment, the data to be displayed is the book data, so that the operation for specifying the display of the next page or the previous page is carried out as the data retrieval operation. The operation for specifying the display of the next page or the previous page can be made by pressing "→" key or "←" key for example. Also, the data content display request operation is an operation for requesting the display of the data content by deciphering the data, which can be made by entering the item number of the item to be deciphered and displayed from the keyboard for example. Here, at a time of the system activation, the user registration number is to be entered from the keyboard of the data operation input unit 147. In this manner, various input operations are made at the data operation input unit 147, and in response the input control unit 148 transmits the commands for the next page or the previous page to the data control unit 149 when the entered signal is "→" or "←", or transmits the item number to the data control unit 149 and the display request transmission unit 150 when the entered signal is the item number, or transmits the user registration number to the display request transmission unit 150 when the entered signal is the user registration number.

The data control unit 149 memorizes the item number of the currently displaying book data, and the data structure received from the data storage unit 142, and updates the memorized item number to the item number greater by one when the next page command is received, or to the item number smaller by one when the previous page command is received, or to the received item number itself when the item number is received, and transmits the memorized item number to the data storage unit 142. As an item number for the data to be initially displayed, the item number of the table of contents is memorized, and this item number is transmitted from the data control unit 149 to the data storage unit 142.

Figure 14:
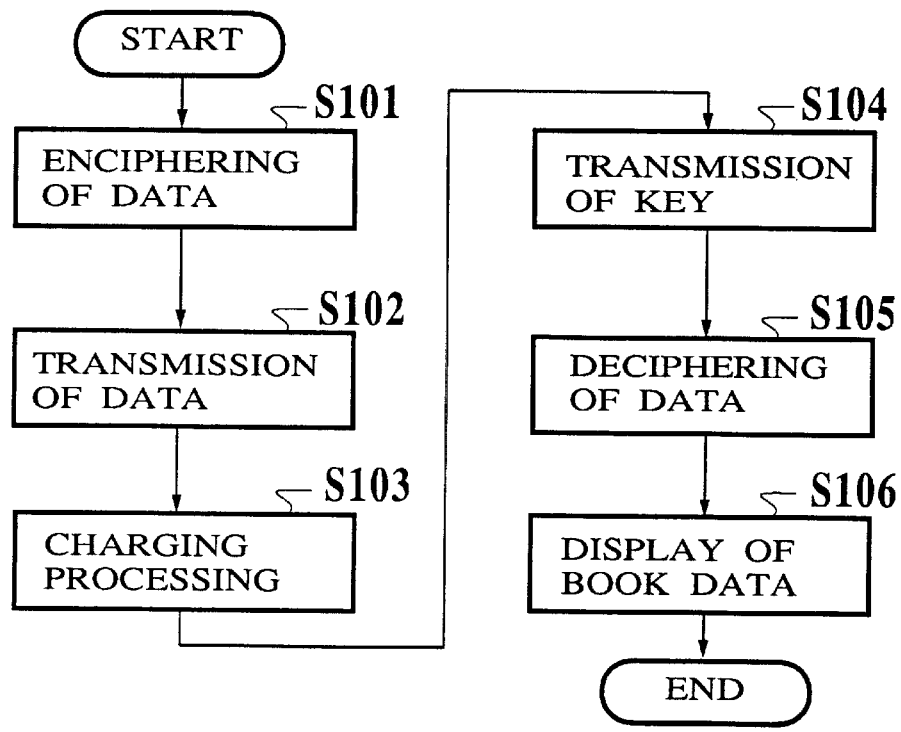
FIG. 14 is a flow chart for the operation in the specific configuration of FIG. 13.

Now, the operation in this embodiment of FIG. 13 is carried out according to the flow chart of FIG. 14 as follows.

First, the database data stored within the database data storage unit 131 of the data center side system 130 is enciphered by using different keys for different items at the data enciphering unit 132, and the key for each item is stored in the key storage unit 133 (step S101). The enciphered database data are then transmitted from the data transmission unit 134 to the data receiving unit 141 of the user terminal side system 140 and stored in the data storage unit 142. (step S102).

At this point, in a case the data content display request operation is made at the data operation input unit 147 of the user terminal side system 140, the data content display request is transmitted to the data request receiving unit 1 of the data center side system 130 through the input control unit 148 and the display request transmission unit 150. As a result, the key retrieval unit 136 retrieves the key corresponding to the requested item from the keys stored in the key storage unit 133, and transmits the processing signal to the charging processing unit 137. The charging processing unit 137 then carries out the charging processing in response to the processing signal (step S103). Then, the data on the number of utilized database item is stored in the individual utilization data management unit 138. After the transmission of the processing signal, the key retrieval unit 136 transmits the retrieved key to the data transmission unit 134, and the data transmission unit 134 transmits this key as the key data to the data receiving unit 141 of the user terminal side system 140 (step S104).

The data receiving unit 141 which received the key data then transmits the received key data to the data deciphering unit 143. On the other hand, the data control unit 149 which received the data retrieval operation command from the input control unit 148 calculates the item number of the data to be displayed and transmits it to the data storage unit 142, and then data storage unit 142 reads out the corresponding database data from the stored database data and transmits it to the data deciphering unit 143. Then, the data deciphering unit 143 deciphers the database data supplied from the data storage unit 142 by using the key data supplied from the data receiving unit 141 (step S105). Then, the book data composition unit 145 composes the book data from the database data deciphered by the data deciphering unit 143 and the common book data stored in the common book data storage unit 144, and the obtained book data is displayed at the book data display unit 146 (step S106).

Next, the further detailed concrete examples concerning the embodiment of FIG. 13 will be described.

Figure 15:
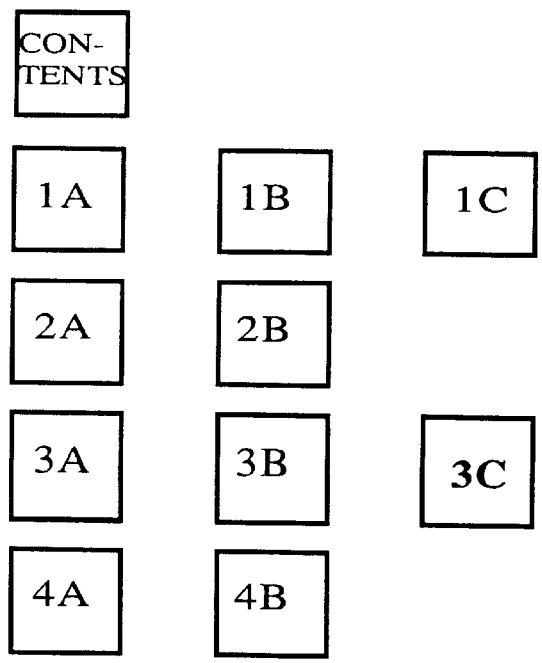
FIG. 15 is an illustration of the data structure of the database data in the specific configuration of FIG. 13.

The database data storage unit 131 on the data center side system 130 stores a plurality of database data, and each database data is going to be transmitted to the data enciphering unit 132 in the data structure shown in FIG. 15, where each rectangle represents an item, and each item corresponds to one spread page of the book data.

First, the database data in the data structure of FIG. 15 is transmitted from the database data storage unit 131 to the data enciphering unit 132. The data enciphering unit 132 then generates different enciphering keys for different items of the database data by using the random number, enciphers the data content of each item except for the item of the table of contents, and transmits the enciphered data to the data transmission unit 134 by attaching the item number to each item, while also transmitting a correspondence table of the enciphering keys used and the item numbers to the key storage unit 133. An example of the correspondence table stored in the key storage unit 133 is shown in FIG. 16. Then, the data transmission unit 134 transmits the enciphered database data to the data receiving unit 141 of the user terminal side system 140 through the transmission line 151.

Figures 18, 19:
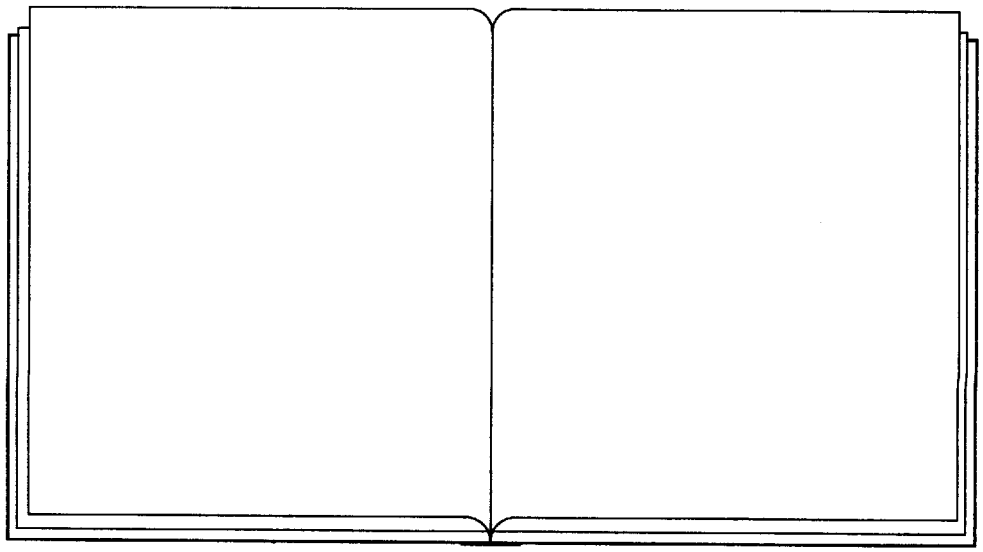
FIG. 18 is an illustration of an exemplary enciphered data for a specific data content used in the specific configuration of FIG. 13.
FIG. 19 is an illustration of a common book data used in the specific configuration of FIG. 13.

The data receiving unit 141 then receives the enciphered database data, and transmits it to the data storage unit 142. The data storage unit 142 stores the database data transmitted from the data receiving unit 141 with the item number of each item as an index, and then produces the data structure of the database data according to the item numbers and transmits it to the data control unit 149. At this point, the data storage unit 142 also stores the data representing the table of contents as shown in FIG. 17, as well as the enciphered data such as that shown in FIG. 18 representing the data content of the item number "2A" for example.

Figure 20:
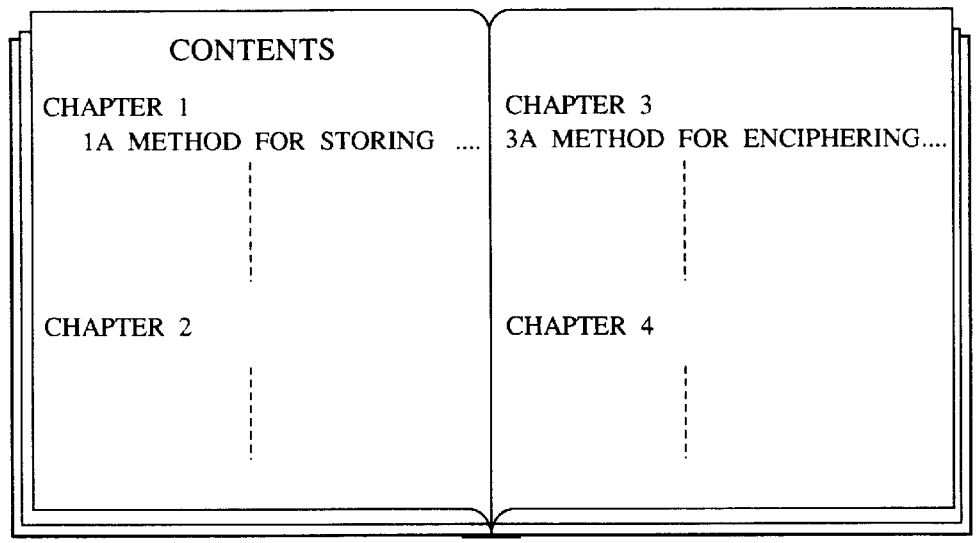
FIG. 20 is an illustration of the composed book data for the table of contents used in the specific configuration of FIG. 13.

The data control unit 149 memorizes the received data structure and transmits the item of the table of contents to the data storage unit 142 as the item number of the data to be initially displayed. Then, the data storage unit 142 reads out the data content of this item as shown in FIG. 17 and transmits it to the data deciphering unit 143. At the data deciphering unit 143, the deciphering is not carried out as there is no key data received, and the data content as shown in FIG. 17 is transmitted as it is to the book data composition unit 145. The book data composition unit 145 then reads out the common book data as shown in FIG. 19 from the common book data storage unit 144, produces the book data by allocating the data content of FIG. 17 received from the data deciphering unit 143 to the data content display portion of the common book data as shown in FIG. 19, and transmits the obtained book data to the book data display unit 146. As a result, the book data display unit 146 displays the book data as shown in FIG. 20 on its display.

Next, the user looks at the displayed table of contents, and decides which item's data content should be displayed. Here, as an example, a case of displaying the data content of the item number "2A" will be described. In this case, the user enters the item number "2A" from the keyboard of the data operation input unit 147 as a request for deciphering and displaying the data content of the enciphered data. In response, the input signal indicating this item number "2A" is transmitted to the input control unit 148, and the input control unit 148 which received the input signal for "2A" transmits it to the data control unit 149, while also transmitting it to the display request transmission unit 150 as an item number to be the deciphered and displayed. The display request transmission unit 150 which received this item number "2A" then transmits this item number "2A" along with the user registration number such as "A1234" memorized in advance to the display request receiving unit 135 of the data center side system 130.

The display request receiving unit 135 receives the item number "2A" and the user registration number "A1234" through the transmission line 152, and transmits them to the key retrieval unit 136. The key retrieval unit 136 then reads out the key "2" corresponding to the item number "2A" according to the stored correspondence table shown in FIG. 16, and transmits the user registration number "A1234" as the processing signal to the charging processing unit 137, and then transmits the key "2" to the data transmission unit 134. The charging processing unit 137 which received the processing signal indicating the user registration number "A1234" then reads out the number of utilized database items for this user registration number "A1234" such as a number "24" for example from the individual utilization data management unit 138, adds on to this number "24" to obtain a new number "25", and stores this new number "25" as the number of utilized database items for the user registration number "A1234" in the individual utilization data management unit 138. Then, the data transmission unit 134 transmits the received key "2" along with a signal indicating that it is the key data to the data receiving unit 141 on the user terminal side system 140.

Figure 21:
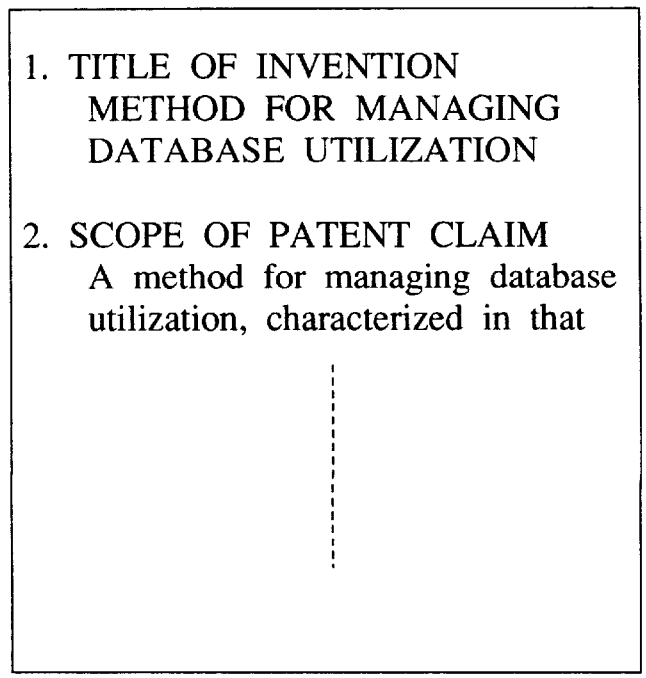
FIG. 21 is an illustration of an exemplary deciphered data for a specific data content used in the specific configuration of FIG. 13.
Figure 22:
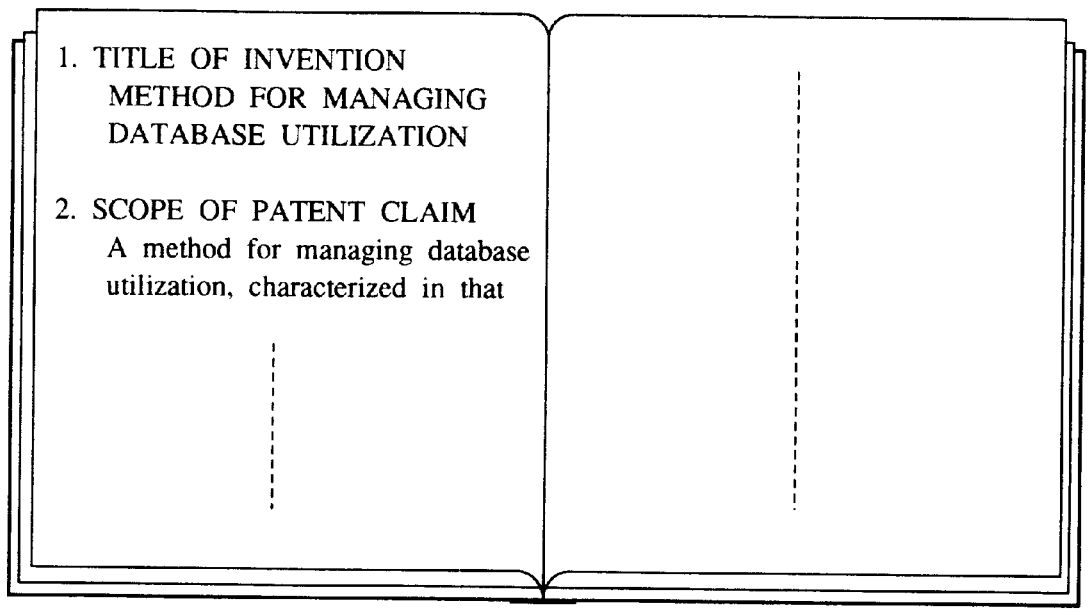
FIG. 22 is an illustration of the composed book data for a specific data content used in the specific configuration of FIG. 13.

The data receiving unit 141 receives the key data for this key "2" through the transmission line 151, and transmits it to the data deciphering unit 143. On the other hand, the data control unit 149 has already received the item number "2A" as the item number to be deciphered and displayed from the input control unit 148, so that it rewrites the index of the currently displaying item from the "table of contents"to "2A", and transmits it to the data storage unit 142. The data storage unit 142 which received this index of the item then reads out the enciphered data content of this item "2A" as shown in FIG. 18 and transmits it to the data deciphering unit 143. The data deciphering unit 143 deciphers the enciphered data content of the item number by using the key "2" transmitted from the data receiving unit 141. The resulting deciphered data appears as shown in FIG. 21 for example. Then, the data deciphering unit 143 transmits the deciphered data content as shown in FIG. 21 to the book data composition unit 145. The book data composition unit 145 then reads out the common book data as shown in FIG. 19 from the common book data storage unit 144, produces the book data by allocating the data content of FIG. 21 received from the data deciphering unit 143 to the data content display portion of the common book data as shown in FIG. 19, and transmits the obtained book data to the book data display unit 146. As a result, the book data display unit 146 displays the book data as shown in FIG. 22 on its display.

In the embodiment of FIG. 13 described above, various modifications are possible as follows.

For example, it is possible for the database to be distributed at a plurality of locations and the accesses to the distributed database can be made through the communication lines. Also, the content, the format, or the data structure of the database data are optional.

The data units by which the enciphering is to be made are also optional and not necessarily the items as described above, such as the units of the paragraphs, or any other specific groups. The enciphering scheme and the enciphering key generation scheme are also optional, and the enciphering may be controlled to make no enciphering in units of the data unit or to change the enciphering schemes in units of the data unit. Also, the key storage unit 133 may store the enciphering scheme instead of the enciphering key.

The connection state of the data center side system 130 and the user terminal side system 140 for the purpose of data communication is also optional, and can be any type of broadcasting such as wire broadcasting, radio broadcasting, or satellite broadcasting. Also, the data transmission unit 134 may attach any optional signal other than the signal for distinguishing the database data and the key data.

The key retrieval unit 136 has been described as reading out the key data corresponding to the received item number from the key storage unit 133 and transmitting the key data to the data transmission unit 134 after the user registration number is transmitted to the charging processing unit 137, but in general, the content to be received and transmitted depends on the content transmitted from the display request receiving unit 1and the content stored in the key storage unit 133. Also, instead of transmitting the key data to the data transmission unit 134, the key data may also be transmitted to the data enciphering unit 132 such that the key data are also enciphered and then transmitted. As for the content to be transmitted to the charging processing unit 137, it is not necessarily limited to the user registration number, and can be the item number to be displayed for example.

The charging processing to be carried out at the charging processing unit 137 may be the calculation of the fee itself rather than the updating of the number of utilized database items as described above, or the number to be added in updating the number of utilized database items can be provided in several levels depending on the amount of data to be displayed or the content of the data to be displayed. This charging processing may also be carried out on the other system terminal connected through the communication network. The individual utilization data management unit 138 may also store the utilization history, the type of the utilized database, the statistical data such as the frequency of utilization of each type, etc. This individual utilization data management unit 138 may also be provided on the other system terminal connected through the communication network.

The data receiving unit 141 has been described as transmitting the database data to the data storage unit 142 by attaching the item number to each item when the database data is received, but the manner of manipulating the data at this data receiving unit 141 is also optional.

The data storage unit 142 has been described as storing the database data from the data receiving unit 141 in correspondence to the item number, but the index to be assigned in units of the data units is also optional, and can be the page number rather than the item number. Also, instead of producing the data structure according to the item numbers and transmitting it to the data control unit 149 at the data data storage unit 142, a separate unit for producing the data structure may be provided independently.

The data deciphering unit 143 has been described as deciphering the data by using the key in a case the key data is supplied from the data receiving unit 141, but the data deciphering unit 143 may receive the enciphering scheme from the data receiving unit 141 instead. Also, it has been described such that the data are outputted as it is when there is no received key data, but the basic deciphering scheme may be specified in advance and the deciphering according to such a basic deciphering scheme may be applied as a preliminary processing to all the data.

The data content of the common book data stored in the common book data storage unit 144 is also optional, and a plurality of common book data of different types may be provided. It is also possible to change the style or the size of the characters, or the layout within each page data at a time of allocating the data content of each item from the data deciphering unit 143 to the data content display portion of the common book data at the book data composition unit 145.

The input device to be provided on the data operation unit 147 is also optional and not necessarily limited to the keyboard as described above, and the mouse can be used for example. Also, the retrieval scheme such as the character string retrieval may also be provided as the data retrieval operation. The manner of specifying the item to the deciphered and displayed is also optional, and the scheme for specifying a desired entry on the list by the mouse may be employed. Here, a plurality of items ,ay be specified at once as the items to be deciphered and displayed. In addition, the manner of recognizing the user is optional and not necessarily limited to the entering of the user registration number from the keyboard at a time of the system activation as described above, and the individual ID card may be utilized for this purpose.

The rules for converting the input signals and the data control commands at the input control unit 148 are also optional, and not necessarily limited to the cases of and "→" and "←" which are converted into the next page and previous page commands as described above.

The data control unit 149 has been described as memorizing the item number of the currently displaying data and the data structure received from the data storage unit 142, but any index capable of distinguishing the data such as the page data may be used instead of the item numbers. It is also possible to memorizes the item numbers displayed in the past. The item number of the data to be initially displayed which is to be memorized is also optional.

The display request transmission unit 150 has been described as memorizing the user registration number in advance, and transmitting the item number and the user registration number to the data center side system 130 whenever the item number is received, but the user identifier such as the user registration number may be transmitted at the beginning.

As described, according to this second embodiment of FIG. 13, the charging processing is carried out at the data center side in response to the request from the user, and the key for deciphering the enciphered data has been transmitted to the user terminal side from the data center side, and the deciphering is made at the user terminal side. Consequently, without transmitting the same data twice, the accurate charging processing can be made at the data center side while making the deciphering processing at the user terminal side.

Figure 23:
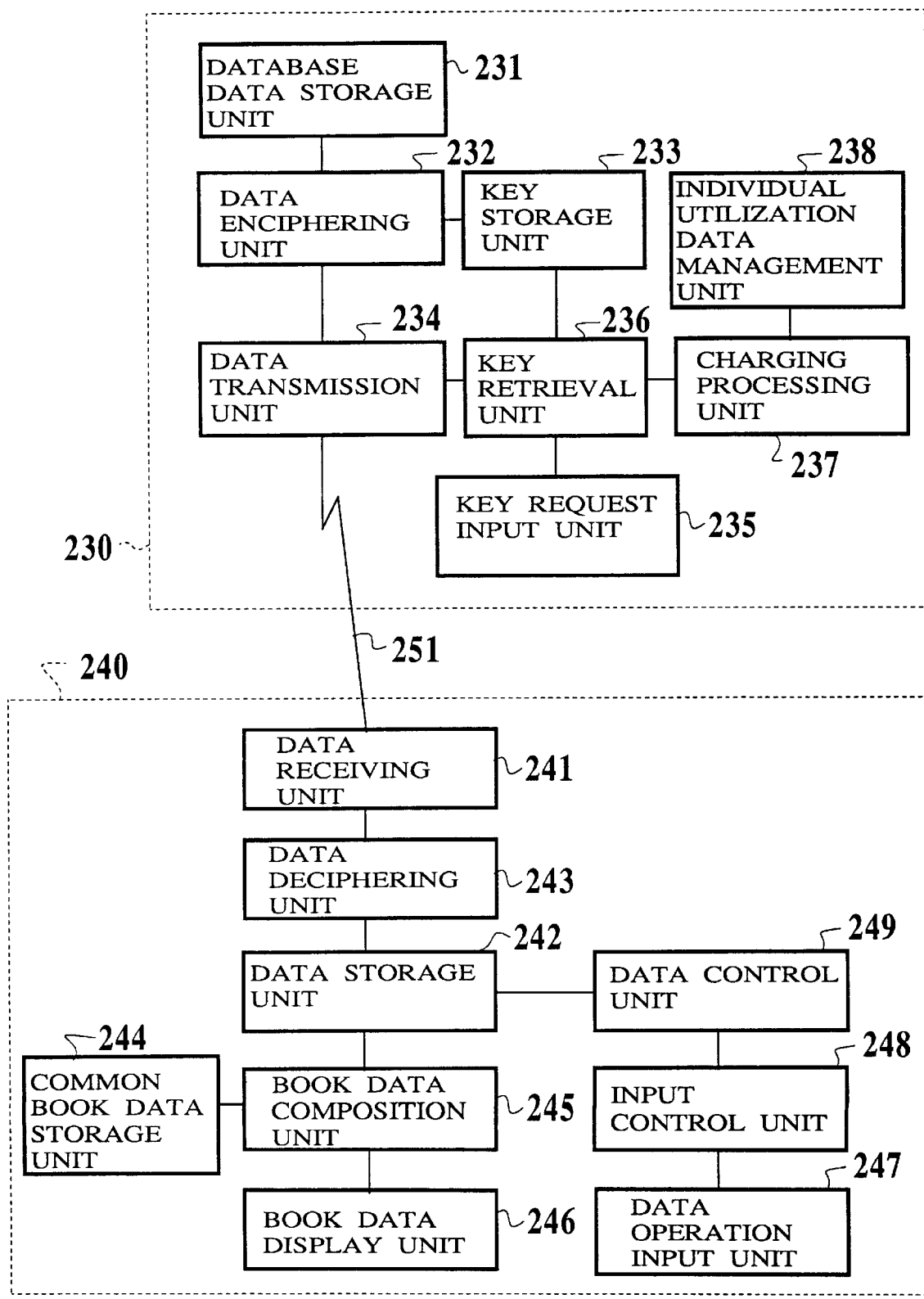
FIG. 23 is a detailed block diagram of a modified configuration for the second embodiment of a book data service system according to the present invention.

Next, a modification of the above described book data service system of FIG. 13 will be described in detail. In this case, the book data service system has a detailed configuration as shown in FIG. 23, which realizes the charging processing according to the database utilization and management scheme according to the present invention. In this system, there are more than one user terminals even though only one user terminal is shown in FIG. 23, and each user terminal side system 240 is identified by a user registration number.

The system of FIG. 23 generally comprises a data center side system 230 and a user terminal side system 240, which are mutually connected through communication line 251.

The data center side system 230 comprises: a data base data storage unit 231 for storing a plurality of database data which are identified by the database numbers; a data enciphering unit 232 for enciphering the database data stored in the database data storage unit 231 by using the keys transmitted from the key storage unit 233 which memorizes the enciphering algorithm in advance; a key storage unit 233 for storing a key corresponding to each database data specified in advance; a data transmission unit 234 for transmitting the enciphered database data and key data to the user terminal side system 240; a key request input unit 235 for entering the user registration number and the database number as the key registration data; a key retrieval unit 236 for retrieving the key data from the key storage unit 233 and transmitting it to the data transmission unit 234, while also generating a processing signal for a charging processing; a charging processing unit 237 for carrying out the charging processing in response to the processing signal from the key retrieval unit 236; and an individual utilization data management unit 238 for storing database utilization charge n correspondence to each user registration number.

Here, the data transmission unit 234 transmits the database data enciphered at the data enciphering unit 232 and the database number and the key data transmitted from the key retrieval unit 236 to the user terminal side system 240 of the specified user registration number through the communication line 251. The key retrieval unit 236 reads out the key data corresponding to the database number received from the key request input unit 2out of the key storage unit 233, and transmits the user registration number and the database number to the charging processing unit 237, while transmitting the read out key data along with the received database number and the user registration number to the data transmission unit 234. The charging processing unit 237 memorizes a table of utilization charge of each database, reads out the utilization data of each user from the individual utilization data management unit 238 when the user registration number and the database number are received from the key retrieval unit 236, carries out the charging processing using the memorized utilization charge table, and, and stores the obtained new utilization data for this user into the individual utilization data management unit 238.

On the other hand, the user terminal side system 240 comprises: a data receiving unit 241 for receiving the database data and the key data transmitted from the data center side system 230; a data storage unit 242 for storing the received database data along with the database number; a data deciphering unit 243 for deciphering the database data stored in the data storage unit 242 by using the received key data; a common book data storage unit 244 for storing common book data indicating data common to all the book data such as the format data; a book data composition unit 245 for obtaining the book data by composing the deciphered database data and the common book data; a book data display unit 246 for displaying the composed book data on a display; a data operation input unit 247 for entering the database number specified by the data retrieval operation by the user; an input control unit 248 for converting the signals entered at the data operation input unit 247 and transmitting the converted signals to a data control unit 249 to be described below; and a data control unit 249 for controlling the data storage unit 242 according to the entered data retrieval operation.

Here, each database data is attached with the page number, and when the database number and the page number are transmitted from the data control unit 249, the data storage unit 242 transmits the database data of the corresponding page number to the book data composition unit 245. The data deciphering unit 243 memorizes the deciphering algorithm and the key data transmitted from the data receiving unit 241, deciphers the database data corresponding to the database number for which the key data is memorized when the database data is received from the data receiving unit 241, and transmits the deciphered database data to the data storage unit 242. The book data composition unit 245 produces the book data by allocating the data content received from the data storage unit 242 to the data content display portion of the common book data stored in the common book data storage unit 244.

The data control input unit 247 is equipped with an input device such as a keyboard for example, and the operation for specifying the display of the next page or the previous page for example is carried out as the data retrieval operation. The operation for specifying the display of the next page or the previous page can be made by pressing "→" key or "←" key for example. The input control unit 248 transmits the commands for the next page or the previous page to the data control unit 249 when the entered signal is "→" or "←". The data control unit 249 memorizes the currently displaying database number and page number, and updates the memorized page number to the page number greater by one when the next page command is received, or to the page number smaller by one when the previous page command is received, and transmits the memorized page number to the data storage unit 242.

Now, the operation in this modified embodiment of FIG. 23 is carried out according to the flow chart of FIG. 24 as follows.

When the request for transmitting the key is entered at the key request input unit 235 of the data center side system 230, the key retrieval unit reads out the corresponding key from the key storage unit 233. Then, the charging processing unit 237 carries out the charging processing by updating the utilization data in the individual utilization data management unit 238 (step S151), and the key data is transmitted from the data transmission unit 234 to the user terminal side system 240 (step S152). The key data received at the data receiving unit 241 of the user terminal side system 240 is then memorized in the data deciphering unit 243.

On the other hand, the database data stored in the database data storage unit 231 is enciphered by the corresponding key read out from the key storage unit 233 at the data enciphering unit 232 (step S153). The enciphered database data is then transmitted from the data transmission unit 243 to the data receiving unit 241 of the user terminal side system 240 (step S154), and deciphered by using the key data memorized in the data deciphering unit 243 (step S155), and then stored in the data storage unit 242.

Here, the user can execute the data retrieval operation from the data operation input unit 247. The data retrieval operation entered at the data operation input unit 247 is then converted at the input control unit 248, and transmitted to the data control unit 249. The data control unit 249 calculates the page number of the data to be displayed, and transmits it to the data storage unit 242, in response to which the data storage unit 242 reads out and transmits the corresponding database data to the book data composition unit 245. Then, the book data composition unit 245 produces the book data by composing the transmitted database data with the common book data stored in the common book data storage unit 244, and the obtained book data is displayed at the book data display unit 246 (step S156).

Next, the further detailed concrete examples concerning the embodiment of FIG. 23 will be described.

The database data storage unit 231 on the data center side system 230 stores ten database data A to J, and a case of making an access to the database data E will be described. Here, it is assumed that the user registration number corresponding to the user terminal side system 240 is "A1234", and the database utilization charge of "3000" is already memorized in the individual utilization data management unit 238 for this user registration number.

Figures 24, 25, 26:
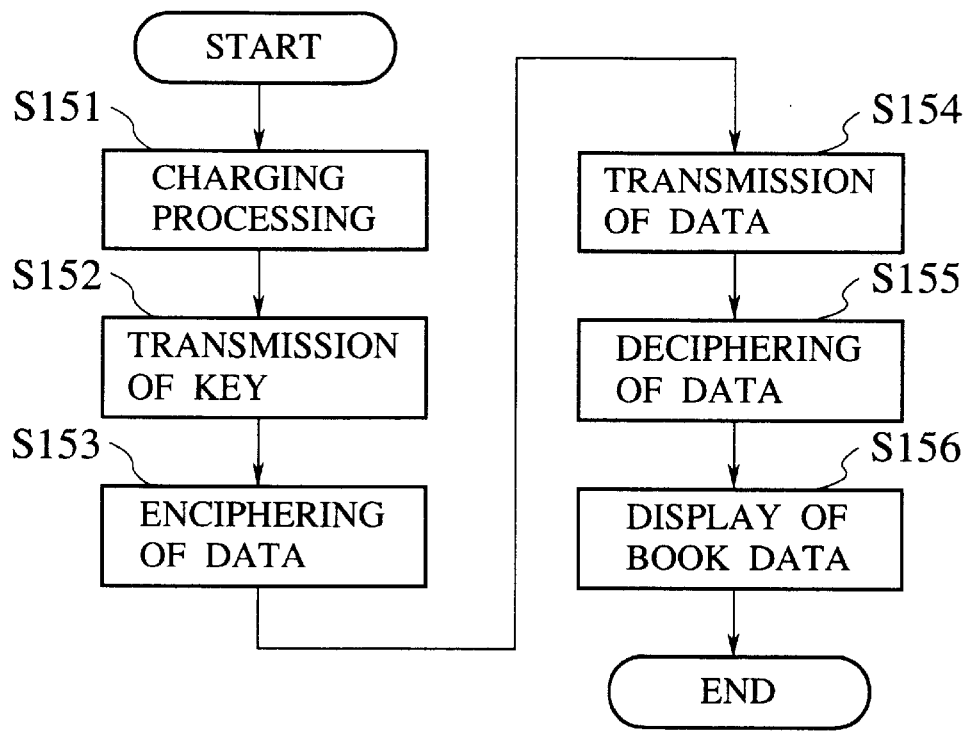
FIG. 24 is a flow chart for the operation in the modified configuration of FIG. 23.
FIG. 25 is an illustration of a correspondence table used in the key storage unit in the modified configuration of FIG. 23.
FIG. 26 is an illustration of a utilization charge table used in the charging processing unit in the modified configuration of FIG. 23.

In this case, the key storage unit 233 stores the correspondence table of the database data and the keys as shown in FIG. 25, in correspondence to the ten database data A to J, while the charging processing unit 237 memorizes the utilization charge table as shown in FIG. 26 for the ten database data A to J.

First, the key request input unit 2enters the user registration number "A1234" and the database number "E" as the key request data, which is transmitted to the key retrieval unit 236. The key retrieval unit 236 then reads out the key "2" corresponding to the database number "E" according to the correspondence table of FIG. 25 stored in the key storage unit 233. Then, the key retrieval unit 236 transmits the user registration number "A1234" to the charging processing unit 237, and then transmits the user registration number "A1234", the database number "E", and the key "2" to the data transmission unit 234. The charging processing unit 237 reads out the database utilization charge of "3000" of this user from the individual utilization data management unit 238 according to the received user registration number "A1234", adds the utilization charge of "2500" for the database "E" to this database utilization charge, and stores the new value of "5500" as the database utilization charge of the user "A1234" in the individual utilization data management unit 238. Then, when the user registration number "A1234", the database number "E", and the key "2" are received, the data transmission unit 234 transmits the received database number and the key to the data receiving unit 241 of the user terminal side system 240 for the user with the user registration number "A1234".

The data receiving unit 241 of the user terminal side system 240 then receives the transmitted database number "E" and the key "2" through the communication line 251, and transmits them to the data deciphering unit 243, which then memorizes these database number "E" and key "2".

On the other hand, the database data storage unit 231 of the data center side system 230 transmits the stored ten database data A to J to the data enciphering unit 232. The data enciphering unit 232 then reads out the keys corresponding to these database numbers stored in the key storage unit 233 according to the correspondence table shown in FIG. 25, enciphers each database data A to J by the enciphering algorithm memorized in advance by using the corresponding key, and transmits the enciphered database data to the data transmission unit 234. The data transmission unit 234 then transmits the enciphered database data to the data receiving unit 241 of the user terminal side system 240 through the communication line 251.

The receiving unit 241 which received the enciphered database data from the data center side system 230 then transmits the received database data to the data deciphering unit 243, which deciphers those received database data whose corresponding keys are memorized, such as the database data "E" for which the key "2" has been memorized, according to the deciphering algorithm memorized in advance, and transmits all the database data to the data storage unit 242. The data storage unit 242 then stores the transmitted ten database data.

Then, the data control unit 249 transmits the database number "E" and the page number "1" to the data storage unit 242 as the data to be initially displayed. In response, the data storage unit 242 reads out and transmits the data content of the first page of the database data "E" to the book data composition unit 245, which produces the book data accordingly. At this point, the data content of the first page of the database data "E" is given in a form of the above described FIG. 17, while the data content of the second page is also given in a form of the above described FIG. 21. Then, the book data composition unit 245 produces the book data by allocating the data content as in FIG. 17 received from the data storage unit 242 to the data content display portion of the common book data as in FIG. 19 stored in the common book data storage unit 244, and transmits the obtained book data to the book data display unit 246, which then displays the received book data as in the above described FIG. 20 on its display.

Here, when the key "→" is pressed as the data retrieval operation at the data operation input unit 247, the input signal is transmitted to the input control unit 248, which converts this input signal into the next page command and transmits the converted command to the data control unit 249. The data control unit 249 which received this next page command then rewrites the currently displaying page number from "1" to "2", and transmits the database number "E" and the page number "2" to the data storage unit 242. In response, the data storage unit 242 transmits the data content of the second page of the database data "E" as shown in the above described FIG. 21 to the book data composition unit 245. Then, the book data composition unit 245 produces the book data by allocating the data content as in FIG. 21 received from the data storage unit 242 to the data content display portion of the common book data as in FIG. 19 stored in the common book data storage unit 244, and transmits the obtained book data to the book data display unit 246, which then displays the received book data as in the above described FIG. 22 on its display.

In the modified embodiment of FIG. 23 described above, various modifications are possible as follows.

In the above, a case of storing ten database data has been described, but the number of database data to be stored is optional. It is also possible to control the transmission of the database data such that only the database data of the database number for which the key request is made is going to be transmitted. It is also possible for the database to be distributed at a plurality of locations and the accesses to the distributed database can be made through the communication lines. Also, the content, the format, or the data structure of the database data are optional. Also, the enciphering algorithm is optional, and may be changed depending on the database data.

The key storage unit 233 has been described as storing the key in correspondence to the database data, but the correspondence of the key may not necessarily be made in units of database data, and the same key may be shared by a plurality of database data. It is also possible to store the enciphering scheme instead of the key.

The data transmission scheme and the communication medium from the data center side system 230 to the user terminal side system 240 are also optional, and can be the satellite communication, or the simultaneous broadcasting to a plurality of the user terminal side system 240.

The key request input unit 235 has been described as entering the database number as the key request data, but there may be a plurality of key request data.

The input device to be provided on the data operation unit 235 is also optional and can be the mouse, or the remote input device using the communication line. In addition, the manner of recognizing the user is optional and not necessarily limited to the entering of the user registration number as described above, and the individual ID card may be utilized for this purpose.

The content to be received and transmitted at the key retrieval unit 236 depends on the content entered from the key request input unit 235 and the content stored in the key storage unit 233. Also, instead of transmitting the key data to the data transmission unit 234, the key data may also be transmitted to the data enciphering unit 232 such that the key data are also enciphered and then transmitted.

The utilization charge of the database data may be set optionally, and can be different for different database data as in the above, or can be uniform for all the database data. This charging processing may also be carried out on the other system terminal connected through the communication network, and the individual utilization data management unit 138 may also be provided on the other system terminal connected through the communication network.

The data storage unit 242 has been described as storing the database number along with the database data and each database data has been described as attached with the page number, but the data units based on the data structure may be used instead of the page numbers.

The data content of the common book data stored in the common book data storage unit 244 is also optional, and a plurality of common book data of different types may be provided. It is also possible to change the style or the size of the characters, or the layout within each page data at a time of allocating the data content of each item from the data deciphering unit 243 to the data content display portion of the common book data at the book data composition unit 245.

The input device and the procedure of the data retrieval operation in the data operation unit unit 247 are also optional and not necessarily limited to the pressing of the keys on the keyboard as described above, and the mouse can be used for example. Also, the retrieval scheme such as the character string retrieval may also be provided as the data retrieval operation. The conversion rules for converting the input signals into the commands at the input control unit 248 are also optional.

The data control unit 249 has been described as memorizing the currently displaying database number and page number, but it is not necessarily limited to the page number, and the other index capable of distinguishing the data such as the item number may be used instead. It is also possible to memorizes the page numbers displayed in the past. The page number of the data to be initially displayed which is to be memorized is also optional.

As described, according to this modified embodiment of FIG. 23, the charging processing is carried out as the key for deciphering the specified database data is transmitted from the data center side system 230 to the user terminal side system 240, and the corresponding database data transmitted to the user terminal side system 240 is deciphered at the user terminal side system 240. Consequently, without transmitting the same data twice, the accurate charging processing can be made at the data center side while making the deciphering processing at the user terminal side.

As described, according to this second embodiment, the charging processing is carried out at the data center side and the key for deciphering the requested data content is transmitted to the user terminal side from the data center side, and the deciphering is made at the user terminal side, so that the accurate charging processing can be made without transmitting the same data twice. As a result, the safe communication of the data can be achieved without increasing the amount of communication, while the accurate management of the database utilization state can be realized. In addition, as the spread one page in the book data is used as the data unit, the operation scheme and the data structure are easily comprehensible, and the retrieval by turning pages one by one is also possible, so that the easy handling of the system can be improved.

Next, the third embodiment of the book data service system according to the present invention will be described in detail.

Figure 27:
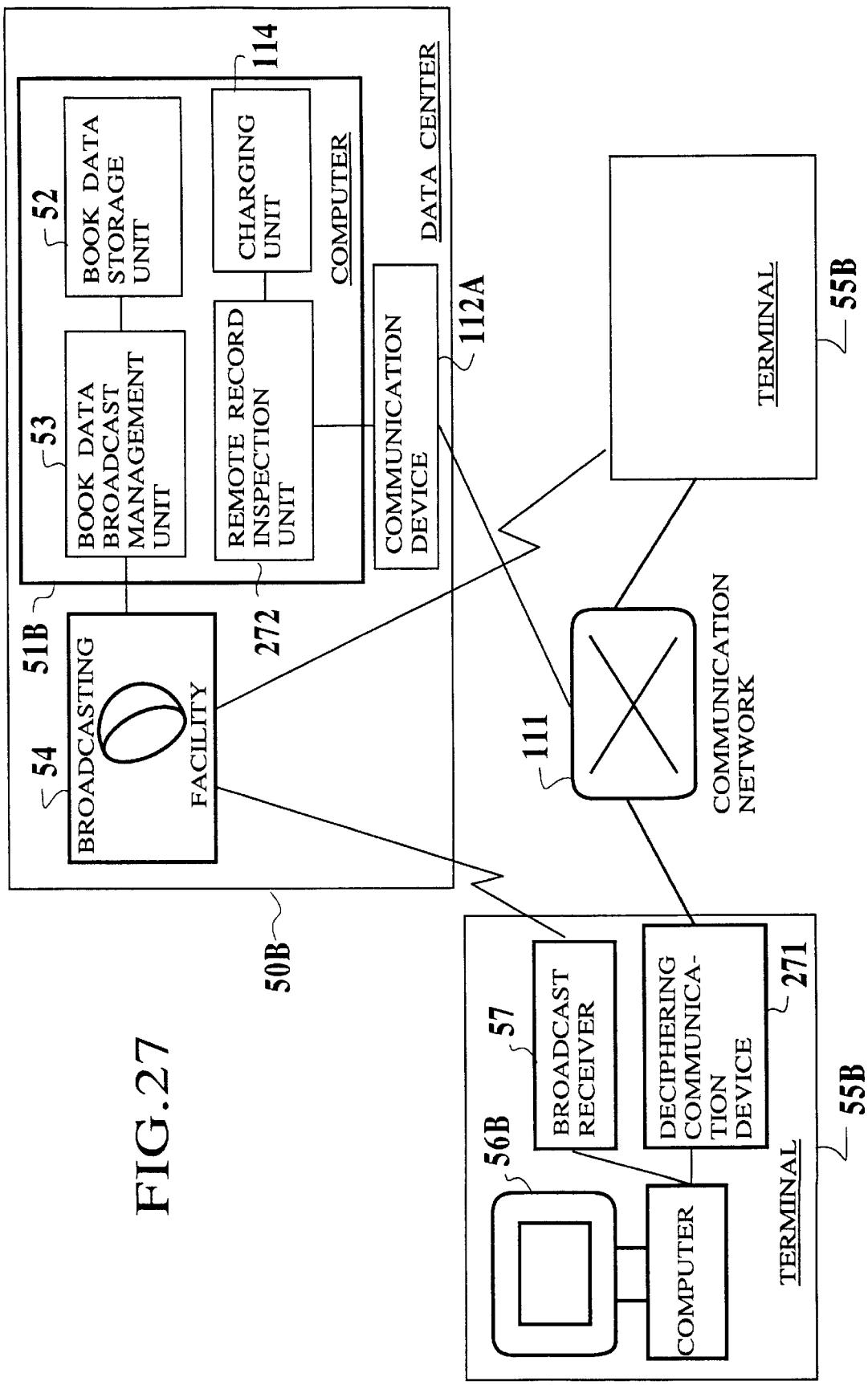
FIG. 27 is a schematic block diagram of a system configuration for the third embodiment of a book data service system according to the present invention.

In this third embodiment, the book data service system has a system configuration as shown in FIG. 27 where, the system configuration of FIG. 11 for the second embodiment described above is modified in that the computer 51B of the data center 50B has a remote record inspection unit 272 which replaces the deciphering key returning unit 113 in FIG. 11, while the user terminal 55B has a deciphering communication device 271 which replaces the communication device 112B in FIG. 11.

Figure 28:
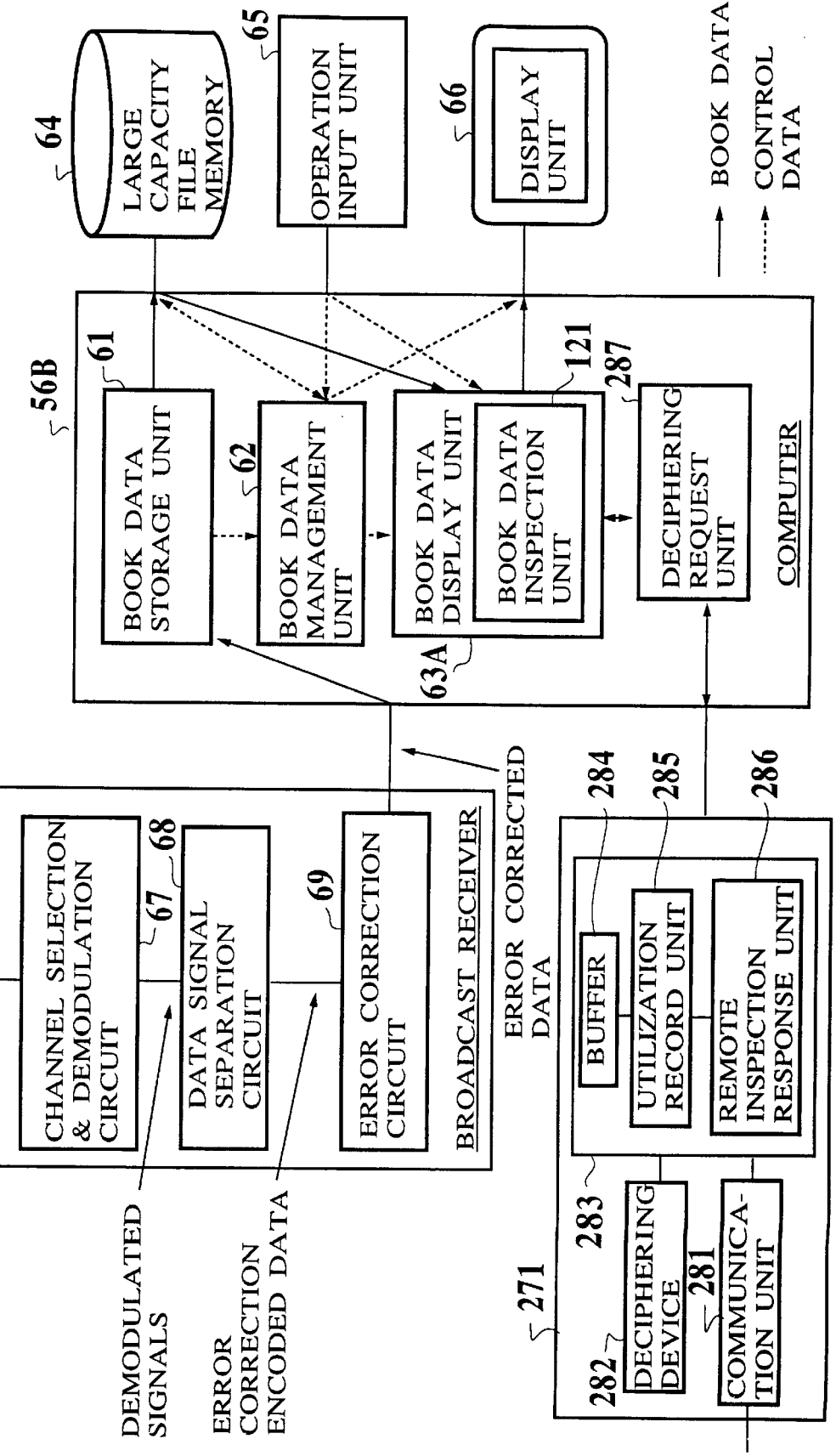
FIG. 28 is a detailed block diagram of a configuration of the user terminal in the book data service system of FIG. 27.

The user terminal 55B has a detailed configuration as shown in FIG. 28 where the configuration of FIG. 12 for the second embodiment described is modified in that the computer 56B includes a deciphering request unit 287 connected between the book data display unit 63A and the deciphering communication device 271, while the deciphering communication device 271 includes a communication unit 281, a deciphering unit 282, and a control unit 283, where the control unit 283 further comprises a buffer 284 for temporarily storing data to be deciphered or the deciphered data, a utilization record unit 285 for recording the utilization record of the book data service, and a remote inspection response unit 286 for returning the utilization record recorded by the utilization record unit 285 in response to the remote record inspection from the data center 50B.

This system shown in FIG. 27 and FIG. 28 operates similarly as in the second embodiment described above up until the request from the user is received by the book data display unit 63A, but the scheme for deciphering the book data and the scheme for charging the user are different as follows.

In this third embodiment, when the deciphering of the book data is requested by the user, the request is given to the deciphering request unit 287 from the book data display unit 63A, and the deciphering request unit 287 transmits the enciphered book data to the deciphering communication unit 271 by dividing the entire book data in appropriate units such as units of pages. The deciphering communication unit 271 receives the enciphered book data transmitted from the deciphering request unit 287 at the control unit 283, stores the received book data temporarily in the buffer 284, and transmits the temporarily stored book data sequentially to the deciphering unit 282. Then, the deciphered book data obtained by the deciphering unit 282 is returned to the control unit 283, stored temporarily in the buffer 284, and returned to the deciphering request unit 287.

At a time of returning the deciphered book data to the deciphering request unit 287, the book code, page number, and chapter number of the deciphered book data as well as the date and time of deciphering are reported to the utilization record unit 285 and recorded therein. Here, the detailed record described above is recorded in order to present the detailed account at a time of the claiming the payment, but it is possible to adopt the simpler scheme of adding up the predetermined utilization charges sequentially at every occasion of utilizing the book data service. When the deciphered book data is returned to the deciphering request unit 287, the buffer 284 of the control unit 283 is released. Whether or not to store the deciphered book data is similarly handled as in the second embodiment described above.

The remote record inspection unit 272 of the data center 50B calls up the deciphering communication unit 271 of each user terminal 55B at an appropriate interval, such as one month, and requests the transfer of the utilization record. Then, in the deciphering communication unit 271, the request from the data center 50B is transmitted through the communication unit 281 to the control unit 283, and the utilization record is read out from the utilization record unit 285 and the transfer data is constructed at the remote inspection response unit 286, and returned to the remote record inspection unit 272 through the communication unit 281. When the returning of the transfer data is completed, the utilization record in the utilization record unit 285 is cleared. The remote record inspection unit 272 then transmits the received transfer data to the charging unit 114 which applies the charging processing to the transfer data.

In this third embodiment, the high level security of the utilization record content is required, so that the deciphering communication device 271 should be provided by the data center side service provider or by the third party approved by the data center side service provider, and when the user terminal side does not respond to the utilization record remote inspection from the data center, the measure to remove the deciphering communication device 271 can be taken. In addition, it is also possible to encipher the utilization record in order to prevent the response using the fake communication device.

Figures 29, 30:
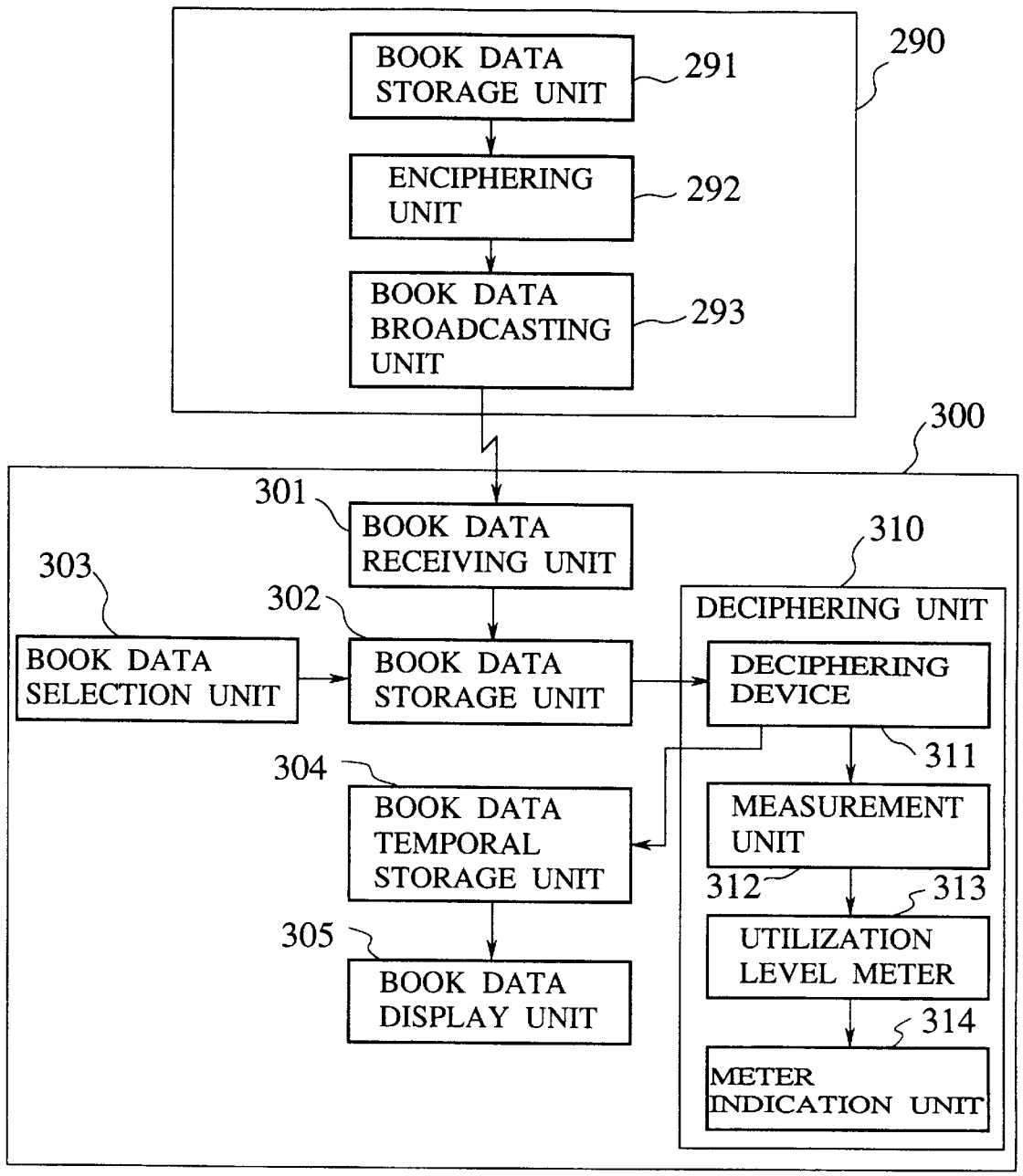
FIG. 29 is a detailed block diagram of one specific configuration for the third embodiment of a book data service system according to the present invention.
FIG. 30 is a diagram of the utilization level data used in the specific configuration of FIG. 29.

In further detail, according to this third embodiment, the book data service system has a detailed configuration as shown in FIG. 29, which generally comprises a data center 290 and a user terminal 300. The data center 290 includes a book data storage unit 291, an enciphering unit 292, and a book data broadcasting unit 293. Here, the book data storage unit 291 stores the book data as well as the book frame data, while the enciphering unit 292 enciphers the book data received from the book data storage unit 291 and the book data broadcasting unit 293 broadcasts the enciphered book data to the user terminal 300 connected with this data center 290.

The user terminal 300 includes a book data receiving unit 301, a book data storage unit 302, a book data selection unit 303, a book data temporal storage unit 304, a book data display unit 305, and a deciphering unit 310. The book data receiving unit 301 receives the enciphered book data from the data center 290, while the book data storage unit 302 stores the received book data. The book data selection unit 303 allows the user to select the desired book data to be deciphered, while the book data temporal storage unit 304 temporarily stores the deciphered book data. The book data display unit 305 displays the deciphered book data, while the deciphering unit 310 deciphers the enciphered book data selected at the book data selection unit 303.

Here, the deciphering unit 310 includes a deciphering device 311, a measurement unit 312, a utilization level meter 313, and a meter indication unit 314. The deciphering device 311 deciphers the enciphered book data, while the measurement unit 312 measures the utilization level by adding up such quantities as a time in use for the deciphering device 311, or an amount of deciphered data, or a number of deciphered cases whenever the deciphering device 311 is used. The utilization level meter 313 records the utilization level measured by the measurement unit 312, while the meter indication unit 314 indicates the utilization level recorded by the utilization level meter 313.

FIG. 30 shows an exemplary data recorded by the utilization level meter 313 including the time in use, the amount of deciphered data, and the number of deciphered cases.

Figure 31:
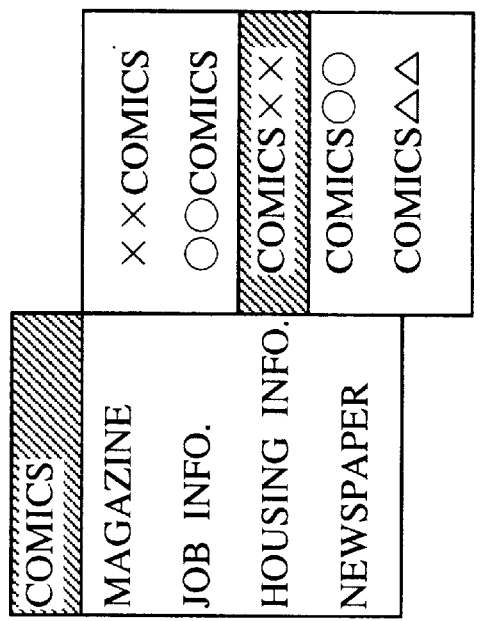
FIG. 31 is an illustration of an exemplary display for the book data selection unit in the specific configuration of FIG. 29.

FIG. 31 shows an exemplary display for the book data selection unit 303 in which the user has selected the desired book data to be deciphered, which is the comic book called "comics XX" in an exemplary case shown in FIG. 31 as indicated by the shading.

Figure 32:
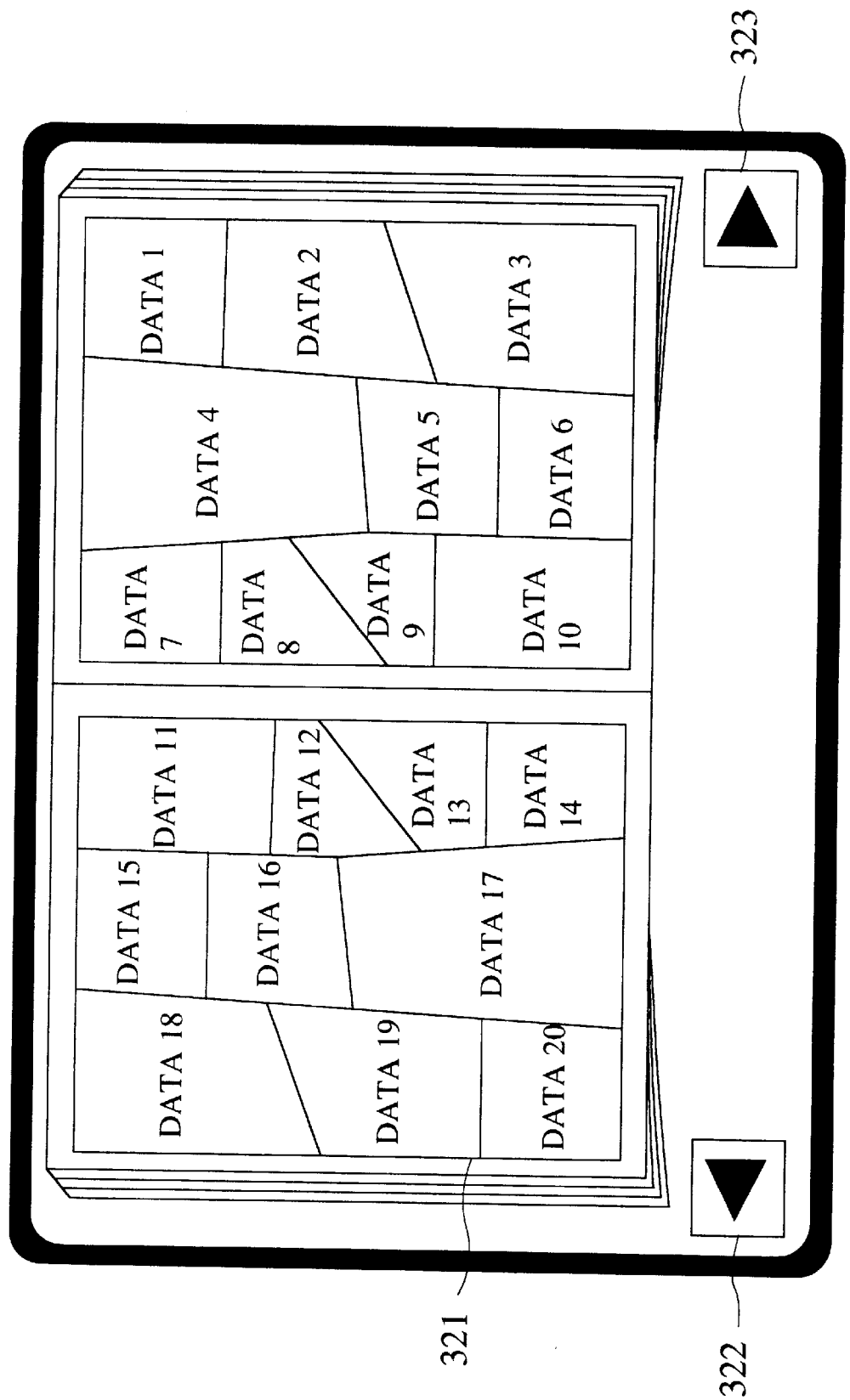
FIG. 32 is an illustration of an exemplary display at the book data display unit in the specific configuration of FIG. 29.

FIG. 32 shows an exemplary display of the book data at the book data display unit 305 for the book data selected in FIG. 31, which comprises a number of comic frames 321, while the display also incorporates a previous page button 322 and a next page button 323.

Now, for an exemplary case of using the display for the book data selection unit 303 as shown in FIG. 31, the display of the book data display unit 305 as shown in FIG. 32, and the indication of the meter indication unit 314 as shown in FIG. 30, this third embodiment operates as follows.

First, the book data stored in the book data storage unit 291 of the data center 290 is supplied to the enciphering unit 292 which enciphers the supplied book data. The enciphered book data is then supplied to the book data broadcasting unit 293 which broadcasts the supplied book data.

Then, the broadcasted book data is received by the book data receiving unit 301 of the user terminal 300, and stores in the book data storage unit 302. At this point, the user selects the desired book data to be deciphered by using the book data selection unit 303. The selected book data is then supplied to the deciphering device 311 of the deciphering unit 310 which deciphers the selected book data. Then, the deciphered book data is temporarily stored in the book data temporal storage unit 304, and displayed at the book data display unit 305.

Next, the deciphered book data is given to the measurement unit 312, and the time in use of the enciphering device 311, or the amount of deciphered data, or the number of deciphered cases is measured by the measurement unit 312, and the measured value is recorded as the utilization level by the utilization level meter 313, while the meter indication unit 314 indicates the utilization level recorded by the utilization level meter 313.

It is to be noted that the third embodiment described above can be modified variously as follows. For example, the meter indication unit 314 may be made to indicate the utilization level only when the user requests. Also, a number of the user terminals to be included in the system is optional. Also, the content of the book data to be stored in the book data storage unit 291 of the data center 290 are not necessarily limited to those shown in FIG. 31 such as the comics, magazines, job information, the housing information, and newspaper, and optional. Also, the number of types of the book data stored in the book data storage unit 291 of the data center 290 is not limited to five as in the example described above, and optional so that it may be one or one hundred. Also, in a case of classifying the data content of the book data stored in the book data storage unit 291 of the data center 290, a number of classes or the hierarchical structures used in the classification are optional. Also, a number of books registered in the data center 290 is optional, while the color, shape, layout, ornamentation, thickness, and size of each book data are also optional.

FIG. 33 shows a modified configuration for the third embodiment described above, which differs from the configuration of FIG. 29 in that the deciphering unit 310 further includes a utilized book code memory unit 315 connected with the deciphering unit 311 and the measurement unit 312, which stores the book codes of the book data deciphered and utilized by the user. The rest of this configuration of FIG. 33 is substantially equivalent to that of FIG. 29.

FIG. 34 shows an exemplary data recorded by the utilization level meter 313 in this modified configuration, including the utilized book codes along with the time in use, the amount of deciphered data, and the number of deciphered cases.

Now, for an exemplary case of using the display for the book data selection unit 303 as shown in FIG. 31, the display of the book data display unit 305 as shown in FIG. 32, and the indication of the meter indication unit 314 as shown in FIG. 34, this modified configuration of FIG. 33 operates as follows.

First, the enciphered book data broadcasted from the data center 290 as in the configuration of FIG. 29 is received at the book data receiving unit 301 of the user terminal 300, and deciphered by the deciphering device 311, while the deciphered book data is temporarily stored in the book data temporal storage unit 304 and displayed by the book data display unit 305 as in the configuration of FIG. 29.

Then, the deciphered book data are given to the utilized book code memory unit 3and the book codes of the deciphered book data are memorized by the utilized book code memory unit 315. The memorized book codes are then supplied to the measurement unit 312 along with the deciphered book data supplied from the deciphering device 311. Here, the measurement unit 312 does not measure the utilization level when the book code of the deciphered book data supplied from the deciphering device 311 coincides with any of the book codes memorized in the utilized book code memory unit 315. Thereafter the operation similar to that in the configuration of FIG. 29 is carried out.

Thus, in this modified configuration of FIG. 33, the book codes memorized in the utilized book code memory unit 315 are used to indicate those book data which had been deciphered before, such that the re-deciphering of such once deciphered book data by the deciphering device 310 is not going to be charged, as the utilization level is left unchanged.

Figure 35:
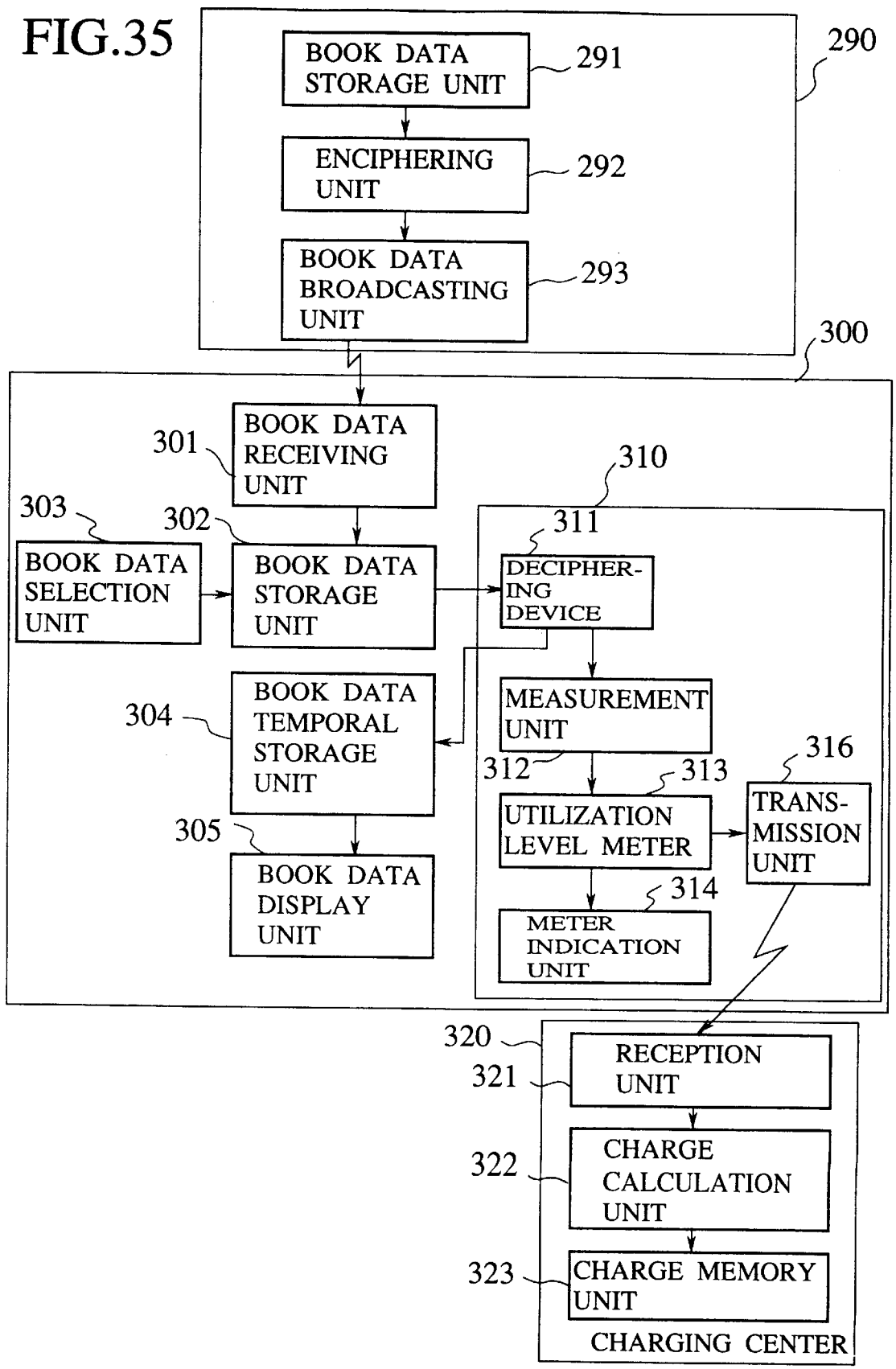
FIG. 35 is a detailed block diagram of another modified configuration for the third embodiment of a book data service system according to the present invention.

FIG. 35 shows another modified configuration for the third embodiment described above, which differs from the configuration of FIG. 29 in that the deciphering unit 310 further includes a transmission unit 316 connected with the utilization level meter 313, which transmits the utilization level data such as the time in use of the deciphering device 311, the amount of deciphered data, or the number of deciphered cases to a charging center 320 connected to the user terminal 300.

Here, the charging center 320 includes a reception unit 321, a charge calculation unit 322, and a charge memory unit 323. The reception unit 321 receives the utilization level data transmitted from the transmission unit 316 of the user terminal 300 connected to the charging center 320. The charge calculation unit 322 receives the utilization level data received by the reception unit 321 and calculates the charges according to the utilization level data. The charge memory unit 323 memorizes the charges calculated by the charge calculation unit 322. The rest of this configuration of FIG. 35 is substantially equivalent to that of FIG. 29.

Now, this modified configuration of FIG. 35 operates as follows.

In this case, the operation up until the book data is displayed by the book data display unit 305 and the operation up until the utilization level recorded by the utilization level meter 313 is indicated by the meter indication unit 314 are substantially similar to those in FIG. 29. The utilization level meter 313 transmits the recorded utilization level data to the transmission unit 316 at appropriate timing such as at the constant interval or when the utilization level exceeds a predetermined level. Then, the transmission unit 316 calls up the charging center 320 to set up the communication path, and transmits the utilization level data to the charging center 320.

At the charging center 320, the utilization level data transmitted from the transmission unit 316 of the user terminal 310 is received by the reception unit 321, and the charges are calculated by the charge calculation unit 322 according to the received utilization level data, and memorized by the charge memory unit 323.

It is to be noted that the modified configuration of FIG. 35 described above can be further modified variously as follows. For example, the transmission and reception of the utilization level data has been described as called up from the user terminal side, but this can be modified such that the charging center 320 calls up the user terminal 300 at appropriate timing to request the transmission of the utilization level data, and in response, the transmission unit 316 transmits the utilization level data recorded by the utilization level meter 313. Also, the transmission unit 316 has been described as included in the deciphering unit 310, but it may be contained in the main body of the computer constituting the user terminal 300. Also, the number of user terminals connected to the charging center is not limited to one as described above, and optional. Also, the charging center 320 has been described as being provided outside of the data center 290, but the charging center 320 may be incorporated within the data center 290. Also, the charging center 320 having the utilization level data management function as described above may be utilized for a purpose other than the charging.

Figure 36:
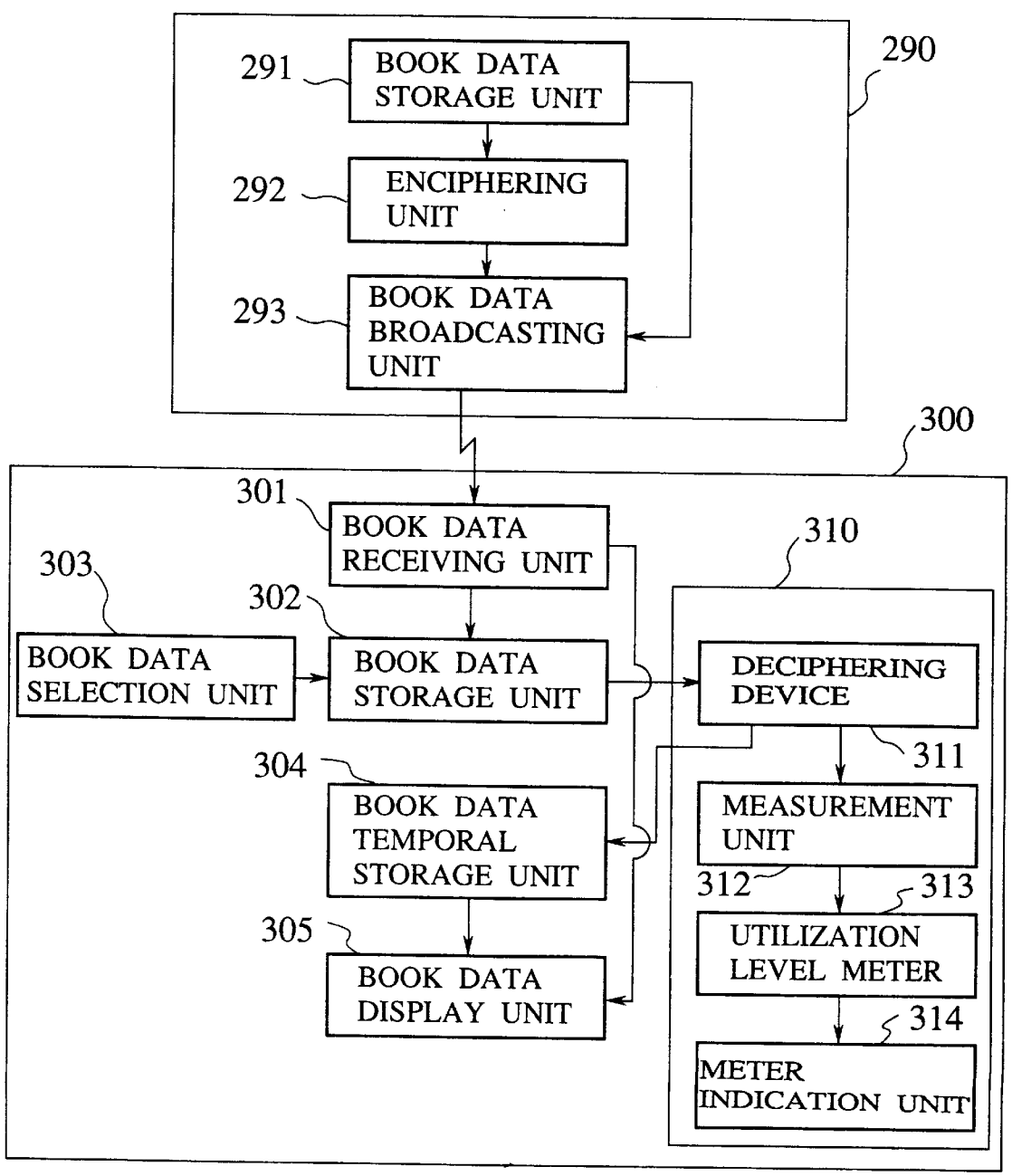
FIG. 36 is a detailed block diagram of still another modified configuration for the third embodiment of a book data service system according to the present invention.

FIG. 36 shows still another modified configuration for the third embodiment described above, which differs from the configuration of FIG. 29 in that a part of the book data stored in the book data storage unit 291 is directly given to the book data broadcasting unit 293 in the unenciphered state by bypassing the enciphering unit 292 in the data center 290 side, while the unenciphered book data received by the book data receiving unit 301 is directly given to the book data display unit 305 by bypassing the book data storage unit 302, the deciphering unit 310, and the book data temporal storage unit 304 in the user terminal 300 side. The rest of this configuration of FIG. 36 is substantially equivalent to that of FIG. 29.

Now, this modified configuration of FIG. 36 operates as follows.

First, a part of the book data stored in the book data storage unit 291 is directly given to the book data broadcasting unit 293 in the unenciphered state while the remaining part of the book data stored in the book data storage unit 291 is given to the enciphering unit 292 and enciphered therein, such that the enciphered book data is given to the book data broadcasting unit 293. Then, the book data in the unenciphered state as well as the enciphered book data are broadcasted from the book data broadcasting unit 293 and received by the book data receiving unit 301 of the user terminal 300.

Then, the unenciphered book data received by the book data receiving unit 301 is directly given to the book data display unit 305 and displayed thereon, while the enciphered book data are handled similarly as in the configuration of FIG. 29 up until the book data is displayed on the book data display unit 305 and the utilization level data recorded by the utilization level meter 313 is indicated by the meter indication unit 314.

As described according to this third embodiment, the enciphered book data are received and stored at the user terminal, and the book data selected from the stored book data are deciphered and displayed, while the utilization level data such as the time in use of the deciphering device, the amount of deciphered data, or the number of deciphered cases are measured, recorded, and indicated, so that the data utilization time and the data utilization amount of all the users can be measured accurately. Consequently, by utilizing this utilization level data for the charging, the accurate utilization charges can be charged to all the users. It is also possible to utilize this utilization level data for another purpose such as, the check of the access frequency of a given book, for instance.

Next, the fourth embodiment of the book data service system according to the present invention will be described in detail.

Figure 37:
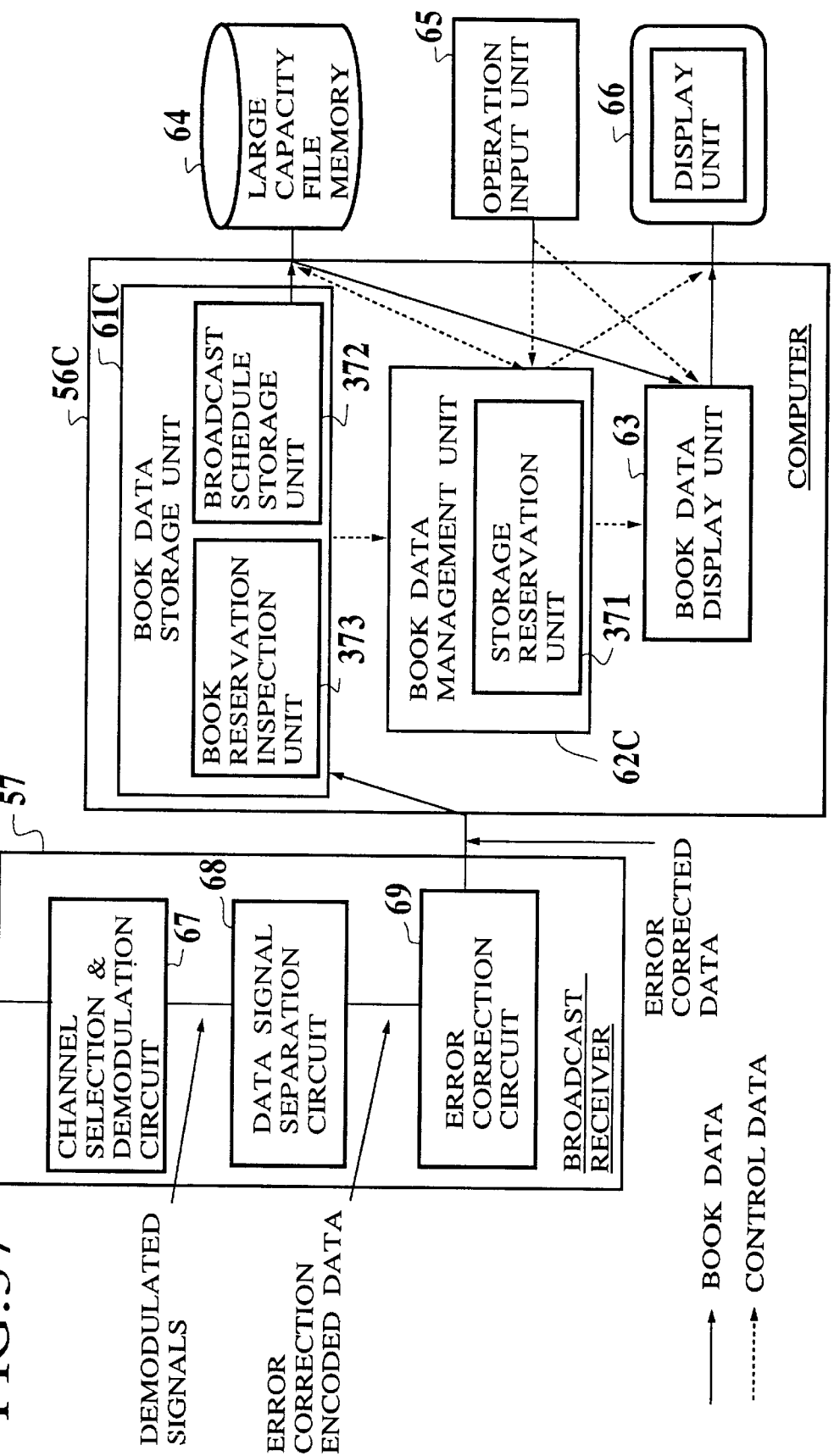
FIG. 37 is a detailed block diagram of a configuration of the user terminal in a book data service system according to the fourth embodiment of the present invention.

In this fourth embodiment, the book data service system has a system configuration similar to that shown in FIG. 5 for the first embodiment described above. In this case, however, as shown in FIG. 37, the computer 56C of the user terminal includes the book data management unit 62C having a storage reservation unit 371 for reserving the storage of the book data, and the book data storage unit 61C having a broadcast schedule storage unit 372 for taking out the broadcast schedule table from the received book data, and a book reservation inspection unit 373 for checking whether the book data other than the broadcast schedule has been reserved or not. The rest of the user terminal in this fourth embodiment is substantially equivalent to that of FIG. 6 for the first embodiment described above.

It is to be noted that the above features of this fourth embodiment are totally unrelated to the characteristic features of the second and third embodiments concerning the deciphering function and the charging function, so that this fourth embodiment can be combined with either one or both of the second and third embodiments described above.

In this fourth embodiment, the basic feature is that the book codes of the book data to be stored are memorized, and the book data received from the broadcasting is stored only when the book code of the broadcasted book data coincides with any one of the memorized book codes.

Here, the reservation of the book code can be made by activating the book data management unit 62C to display a book menu, from which the broadcast schedule table can be selected to display the broadcast schedule table by the book data display unit 63, where this broadcast schedule table is to be regularly distributed and updated. The display of the broadcast schedule table is made in a form of a list as shown in FIG. 38, in which the data concerning the book title, the publisher's name, the author, the field of the subject matter, etc. are enlisted over a plurality of pages, from which the desired books can be selected by specifying the lines of the desired books by the mouse, or setting a cursor on the lines of the desired books and pressing the return key on the keyboard, for example. The book codes of the selected books are then stored in the reservation table provided in a memory of the computer 56C. Here, the selection can be made easier by broadcasting the books of the same field consecutively and providing appropriate headers in the broadcast schedule table.

In case the main power of the user terminal is to be normally turned off in view of the power saving, the time zone at which the book data are scheduled to be broadcasted is registered into a timer management function for operating the user terminal with the minimum possible power while providing ample margins before and after the book data at the same time the book code is registered. This timer management function turns on the main power of the broadcast receiver 57 and the computer 56C automatically when the reserved time arrives, and controls the computer 56C to activate the book data storing function automatically. This timer management unit can be realized by the extension of the timer function of the computer 56C, or may be provided as a separate hardware in a case of using the general purpose computer. Also, the reservation codes are stored in the hard disk device, and read out after the activation of the book data storing function. The broadcast schedule table is to be delivered at the predetermined time so that it can be received without requiring the user to make a reservation for the broadcast schedule table itself.

Figure 39:
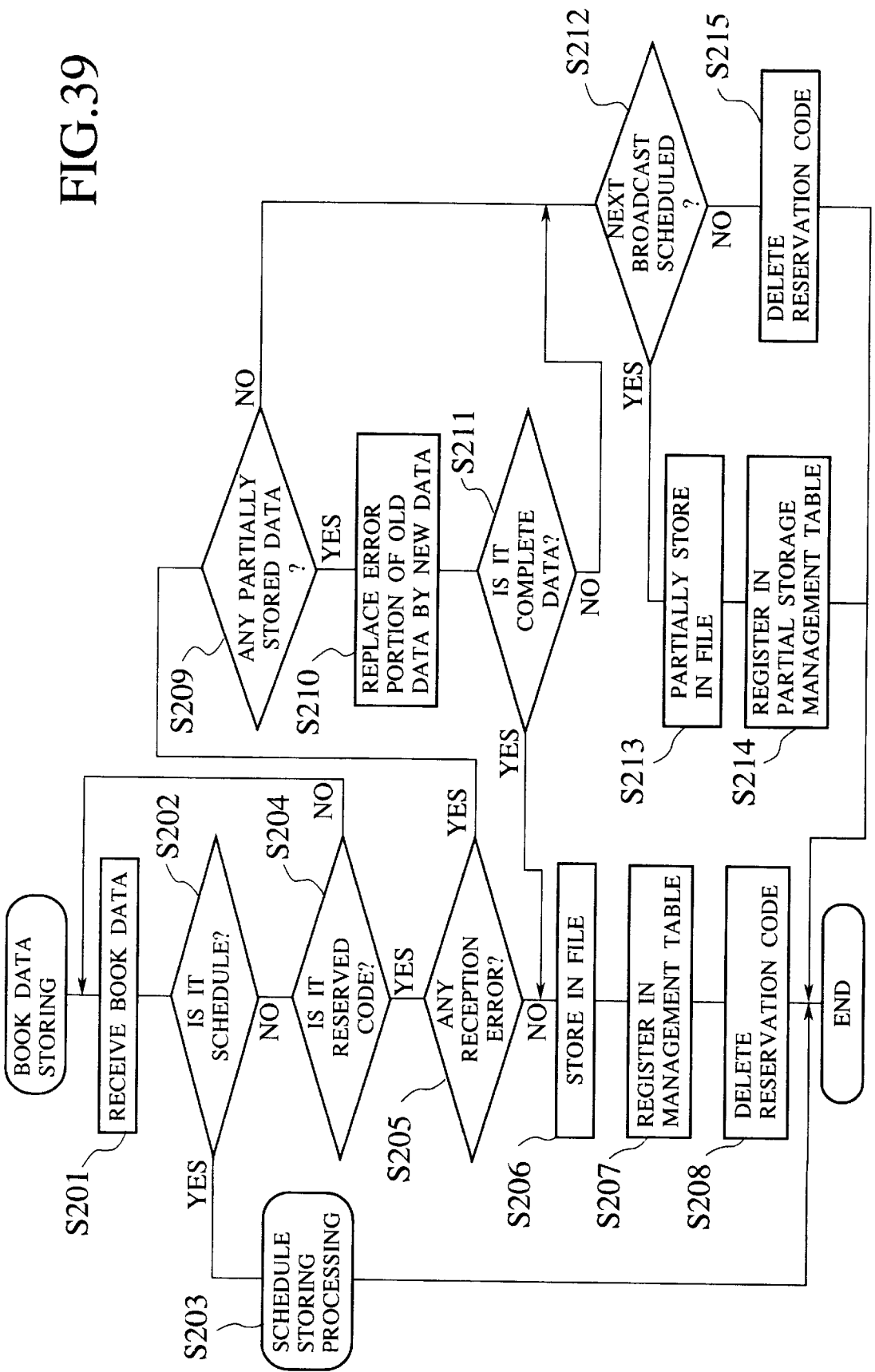
FIG. 39 is a flow chart for the storing of the book data at the user terminal of the book data service of FIG. 37.

In this fourth embodiment, the storing of the book data is carried out according to the flow chart of FIG. 39 as follows.

When the broadcast receiver 57 receives the book data, the error corrected data are transmitted to the computer 56C (step S201). Then, the computer 56C searches the book code of the received data at the book data storage unit 61C, and in a case the book code cannot be found, the broadcast schedule storage unit 372 of the book data storage unit 61C checks if it is the broadcast schedule table or not (step S202). If so, the broadcast schedule storing processing is carried out by the broadcast schedule storage unit 372 (step S203). Otherwise, the book reservation inspection unit 373 of the book data storage unit 61C checks whether the book code of the received data is the reserved book code or not (step S204). If not, the received data is ignored and the next received data is awaited, whereas otherwise, whether there is any reception error or not is checked (step S205). When there is no reception error, the received data is stored in the file memory (step S206), and registered in the management table provided in the book data management unit 62C as the already stored book (step S207), while the reservation code is deleted from the reservation table (step S208).

When there is a reception error at the step S205, next whether any partially stored data for this book data exists or not is inquired to the book data management unit 62C (step S209), and if there is some partially stored data, the error portion of the old data is replaced by the correct portion of the new data (step S210), To this end, the book data is divided into appropriate blocks, and stored such that the replacement of the error portion can be made in units of the blocks. For example, the block can be formed in units of pages. Then, whether the data obtained by the replacement at the step S210 is the complete data or not is judged (step S211). If so, the steps S206 to S208 described above are carried out for this complete data.

When there is no partially stored data at the step S209, or when the data obtained by the step S210 is not the complete data, whether the next broadcast of this book data is scheduled or not is judged (step S212). If the next broadcast scheduled, the received data with the errors is partially stored in the file memory with indications of the errors (step S213) and registered in the partially storage management table provided in the book data management unit 62C (step S214), whereas otherwise the received data is discarded and the reservation code is deleted from the reservation table (step S215). Here, the deletion of the reservation code is necessary in order to avoid the redundant storage at a time of the re-broadcasting.

Figure 40:
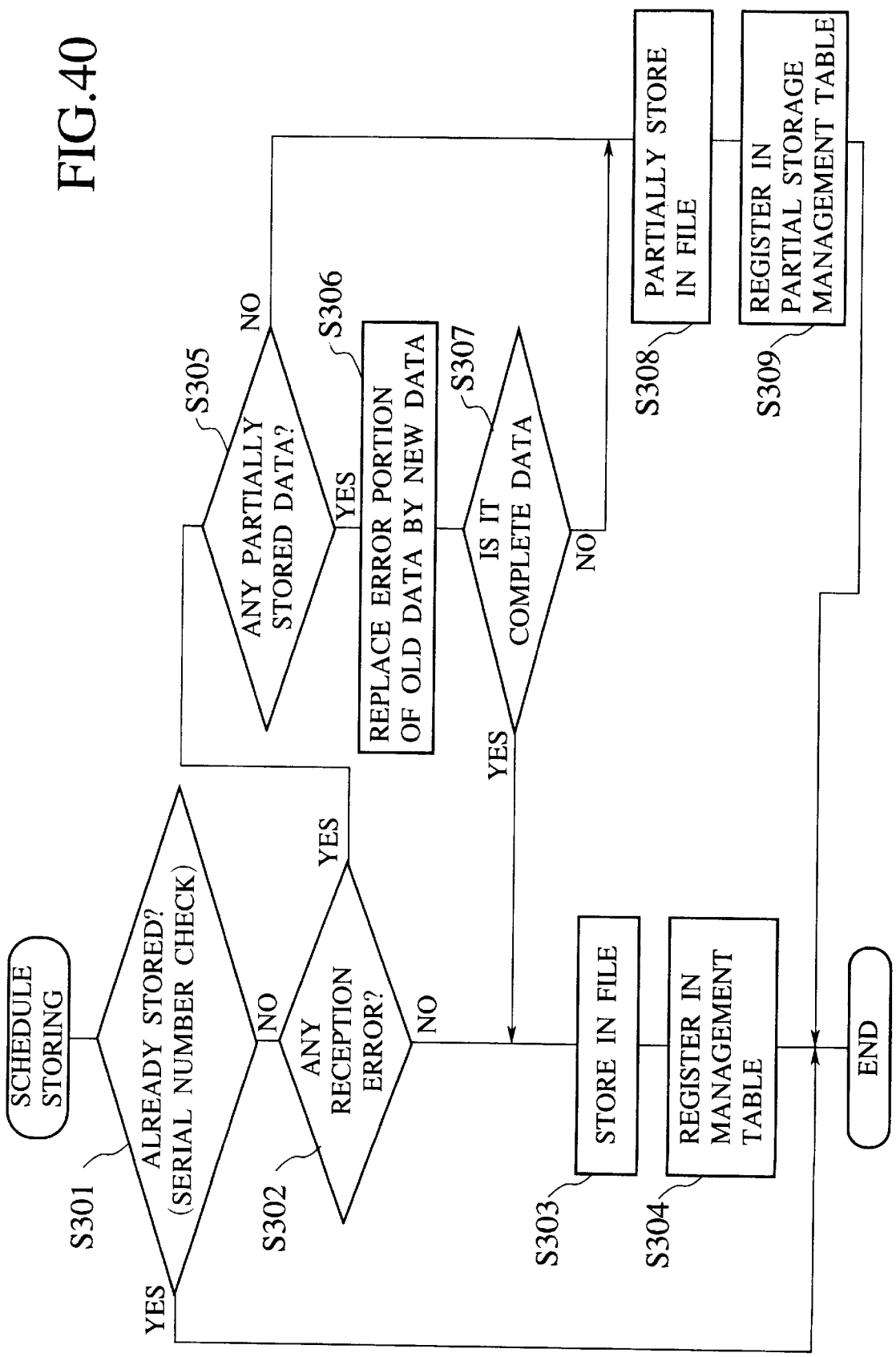
FIG. 40 is a flow chart for the storing of the broadcast schedule table at the user terminal of the book data service of FIG. 37.

Also, in this fourth embodiment, the storing of the broadcast schedule table is carried out according to the flow chart of FIG. 40 as follows.

The broadcast schedule table is assigned with a serial number, and whether the received broadcast schedule table is the re-broadcasting of the already stored broadcast schedule table or not is judged by checking the serial number of the received broadcast schedule table to the book data management unit 62C (step S301). If it is the already stored broadcast schedule table, the operation is terminated without storing the received broadcast schedule table. Otherwise, whether there is any reception error or not is checked (step S302). If not, the received broadcast schedule table is stored in the file memory (step S303) and registered in the management table provided in the book data management unit 62C (step S304).

When there is a reception error at the step S302, next whether any partially stored data for this broadcast schedule table exists or not is inquired to the book data management unit 62C (step S305), and if there is some partially stored data, the error portion of the old data is replaced by the correct portion of the new data (step S306), Then, whether the data obtained by the replacement at the step S306 is the complete data or not is judged (step S307). If so, the steps S303 and S304 described above are carried out for this complete data.

When there is no partially stored data at the step S305, or when the data obtained by the step S306 is not the complete data, the received broadcast schedule table with the errors is partially stored in the file memory with indications of the errors (step S308) and registered in the partially storage management table provided in the book data management unit 62C (step S309).

Here, the serial number of the broadcast schedule table is to be sufficiently many cyclic numbers such that there is only sufficiently little possibility for the serial number to come once around as the reception errors of the broadcast schedule table occurs recurrently.

In a case of normally turning off the main power and limiting the time zone for the broadcast reception, the main power is turned on automatically and the book data storage unit 61C is activated by the operation of the timer management function when the reserved starting time arrives, and the system is de-activated and the main power is turned off automatically when the ending time arrives, but other than that, the operation at a time of receiving the book data broadcasting is similar to the case of not using the time zone limitation. Here, however, it is necessary to make the reservation of the time zone again in a case of expecting the re-broadcasting as the received broadcast schedule table was incomplete.

Figure 41:
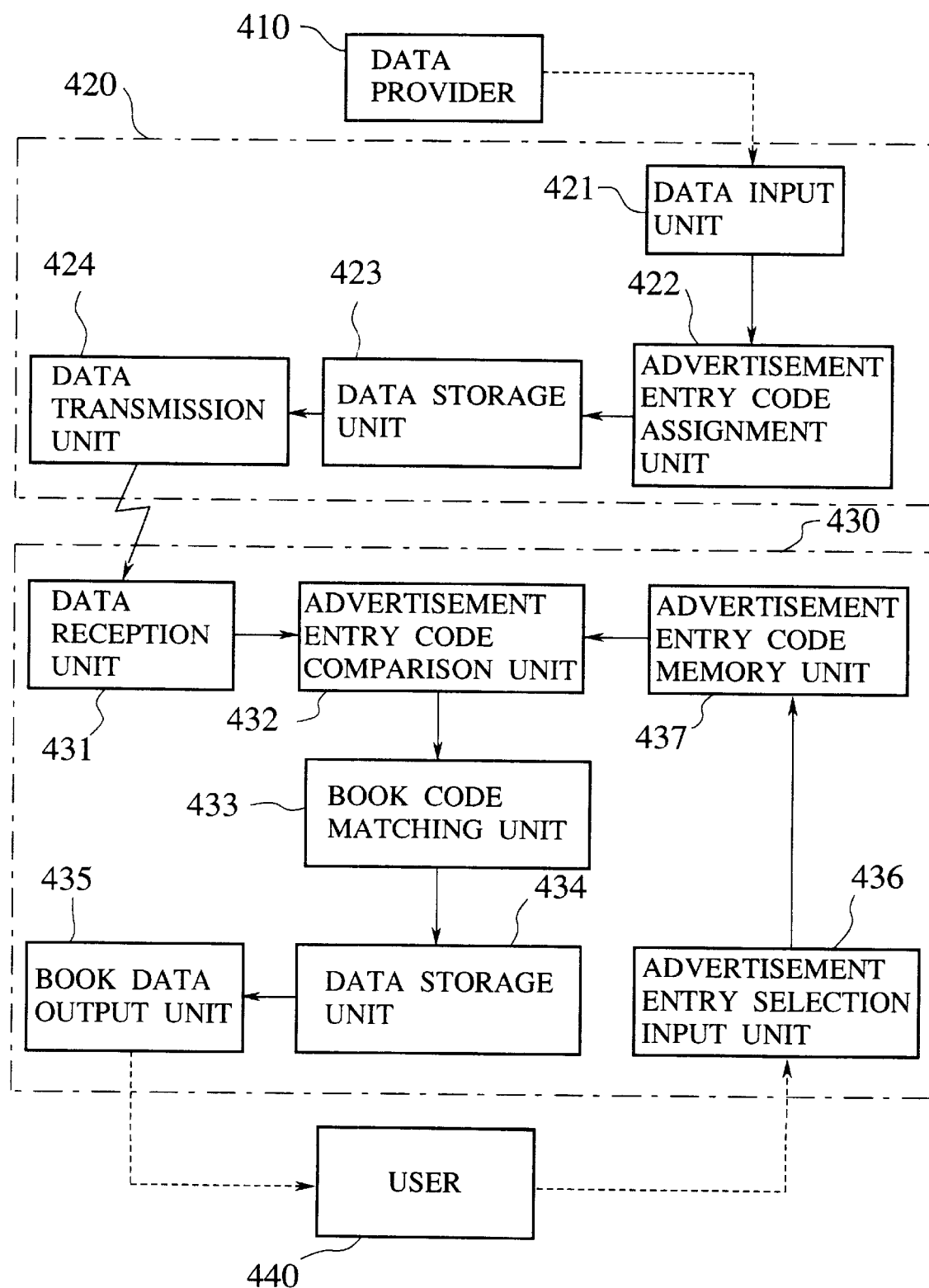
FIG. 41 is a detailed block diagram of one specific configuration of the book data service system according to the fourth embodiment of the present invention.

Alternatively, according to this fourth embodiment, the book data service system can have a detailed configuration as shown in FIG. 41, which generally comprises a data center 420 on a data provider 410 side and a user terminal 430 on a user 440 side. The data center 420 includes a data input unit 421, an advertisement entry code assignment unit 422, a data storage unit 423, and a data transmission unit 424. Here, the data provider 410 enters the book data and the advertisement entry data which briefly describes the content of the book through the data input unit 421.

The book data and the advertisement entry data are automatically assigned with the book code and the advertisement entry code, while the advertisement entry data is also assigned with the broadcast station code to be described below. The book data with the book code assigned is given in a format shown in FIG. 44.

The advertisement entry code assignment unit 422 assign the advertisement entry code assigned to the advertisement entry data to the corresponding book data. The book data with the advertisement entry code is given in a format shown in FIG. 45.

The book data with the advertisement entry code assigned and the advertisement entry data are then stored in the data storage unit 423, and the stored book data and the advertisement entry data are broadcasted from the data transmission unit 424 according to the broadcast schedule as shown in FIG. 46. Here, the exemplary broadcast schedule of FIG. 46 shows a case of providing a plurality of broadcast stations (broadcast channels). In other words, either a plurality of the data centers 420 are provided, or the data transmission unit 424 has multi-channel broadcasting function.

On the other hand, the user terminal 430 includes a data reception unit 431, an advertisement entry code comparison unit 432, a book code matching unit 433, a data storage unit 434, a book data output unit 435, an advertisement entry selection input unit 436, and an advertisement entry code memory unit 437.

The data reception unit 431 receives the broadcast of each broadcast station selectively, according to the broadcast station from which the broadcast should be received which is reserved by the broadcast station code assigned to the advertisement entry data when the advertisement entry code is entered at the advertisement entry selection input unit 436 as described below.

Figure 42:
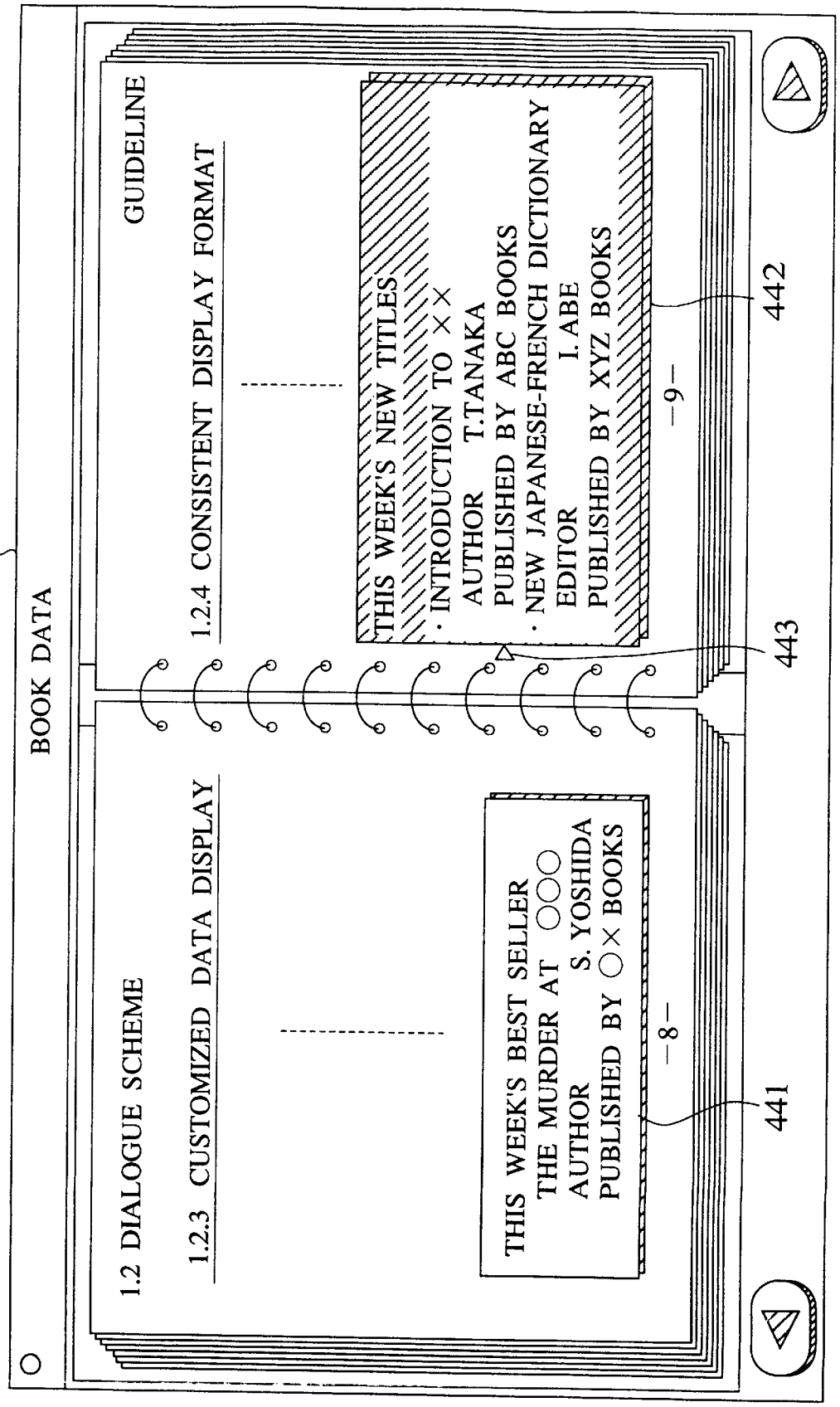
FIG. 42 is an illustration of an exemplary display of the advertisement entry in the specific configuration of FIG. 41.

Namely, the user 440 can make a reservation for the desired book to be stored by switching to the selection input mode in a state of displaying the advertise entry at the book data output unit 435. An exemplary display of the advertisement entry is made as shown in FIG. 42, which shows an exemplary case in a format in which the advertisement entry data are superposed over the book data within the advertisement entries 441 and 442. When a cursor 443 is set to the desired advertisement entry by the advertisement entry selection input unit 436 such as the mouse, and the execution key such as the click button of the mouse is operated at this position, the storing of the book described by the selected advertisement entry can be reserved. In FIG. 42, the cursor 443 is set on the advertisement entry 442 (as indicated by the shading in FIG. 42), and the execution key is operated.

When the advertisement entry 442 is selected, the advertisement entry code memory unit 437 stores the advertisement entry code such as "12345A" for example. Also, according to the broadcast station code assigned to the advertisement entry data, the reservation of the broadcast station from which the broadcast should be received by the data reception unit 431 is made.

When the advertisement entry code is stored in the advertisement entry code memory unit 437, the corresponding book data is broadcasted from the data center 420. Then, when the broadcasted book data is received by the data reception unit 431, the advertisement entry code assigned to the received book data is compared with the advertisement entry code stored in the advertisement entry code memory unit 437 at the advertisement entry code comparison unit 432.

As a result of the comparison, when the advertisement entry codes coincide, the book code of the received book data is transmitted to the book code matching unit 433, and the matching with the book code of the book data already stored in the data storage unit 434 is made. As a result of the matching, when no identical book code is present in the data storage unit 434, the received book data is stored in the data storage unit 434, whereas otherwise the storing is interrupted.

Figures 43, 44, 45:
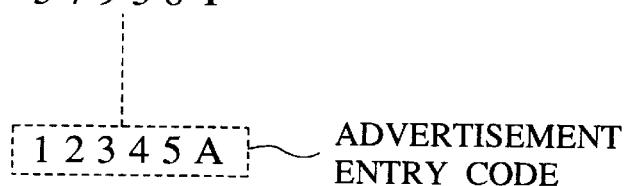
FIG. 43 is a diagrammatic illustration of the advertisement entry codes stored in the advertisement entry code memory unit in the specific configuration of FIG. 41.
FIG. 44 is a diagrammatic illustration of the book data with the book code which is used in the specific configuration of FIG. 41.
FIG. 45 is a diagrammatic configuration of the book data with the advertisement entry code which is used in the specific configuration of FIG. 41.

An exemplary advertisement entry code stored in the advertisement entry code memory unit 437 is shown in FIG. 43. As shown in FIG. 43, the advertisement entry code memory unit 437 is capable of storing a plurality of the advertisement entry codes. In case the book data is stored in the data storage unit 434, the corresponding advertisement entry code is deleted from the advertisement entry code memory unit 437, so as to utilize the memory capacity of the advertisement entry code memory unit 437 efficiently.

Figure 47:
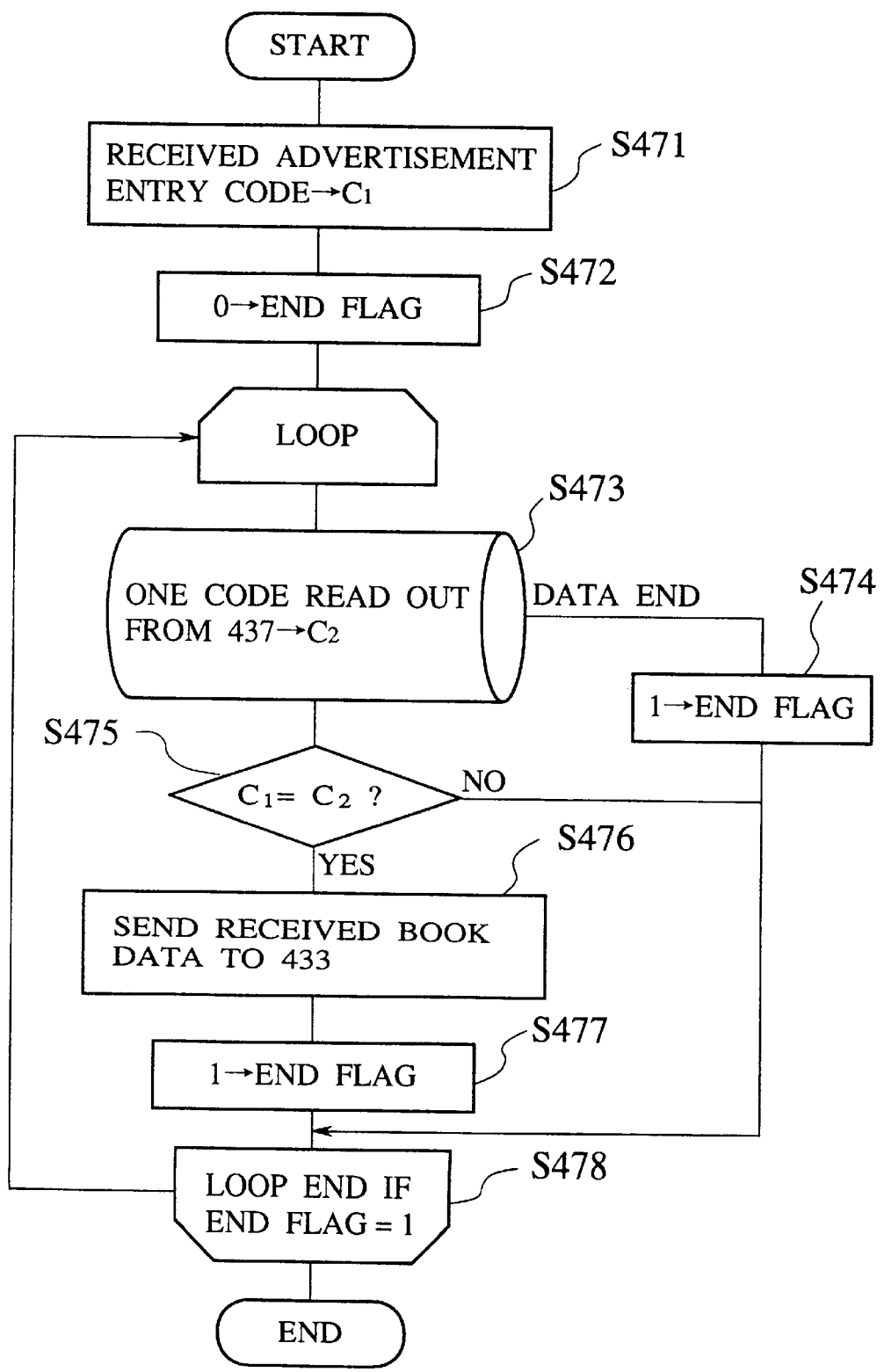
FIG. 47 is a flow chart for the operation of the advertisement entry code comparison unit in the specific configuration of FIG. 41.

The outline of the program implemented in the advertisement entry code comparison unit 432 is shown in FIG. 47, in which the received advertisement entry code is set to be C1 (step S471), while the end flag is set initially to zero (step S472). Then, one stored advertisement entry code in the advertisement entry code memory unit 437 is set to be C2 (step S473), and unless it is the data end, whether C1 is equal to C2 or not is checked (step S475). If they are equal, the received book data is transmitted to the book code matching unit 433 (step S476), and then the end flag is set to 1 (step S477), whereas otherwise the steps S476 and S477 are skipped. On the other hand, when it is the data end at the step S473, the end flag is set to 1 (step S474) and the steps S475 to S477 are skipped. Then, as long as the end flag is not equal to 1, the loop of the steps S473 to S477 is repeated (step S478). When the end flag is equal to 1 at the step S478, the operation of the advertisement entry code comparison unit 432 is terminated.

Figure 48:
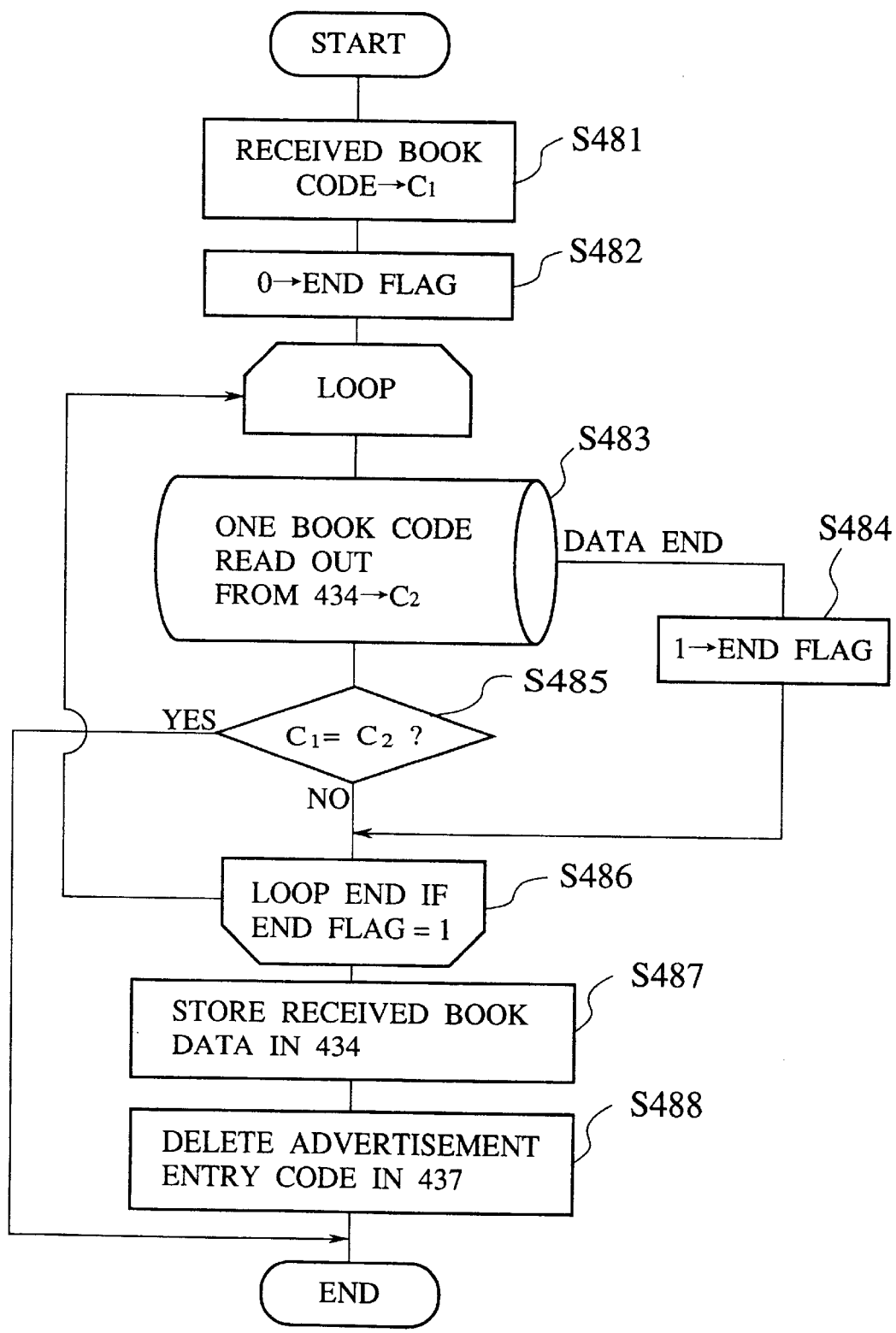
FIG. 48 is a flow chart for the operation of the book code matching unit in the specific configuration of FIG. 41.

The outline of the program implemented in the book code matching unit 433 is shown in FIG. 48, in which the book code of the received book data is set to be C1 (step S481), while the end flag is set initially to zero (step S482). Then, one book code read out from the data storage unit 434 is set to be C2 (step S483), and unless it is the data end, whether C1 is equal to C2 or not is checked (step S485). If they are not equal, as long as the end flag is not equal to 1, the loop of the steps S483 to S485 is repeated (step S486). On the other hand, when it is the data end at the step S483, the end flag is set to 1 (step S484) and the step S485 is skipped. When the end flag is equal to 1 at the step S486, the received book data is stored in the data storage unit 434 (step S487), and the corresponding advertisement entry code in the advertisement entry code memory unit 437 is deleted (step S488). When C1 is equal to C2 at the step S485, the steps S486 to S488 are skipped, and the operation of the book code matching unit 433 is terminated.

It is to be noted that the advertisement entries 441 and 442 have been described as being treated as a part of the book data, but it is also possible to handle the book data and the advertisement entry data as separate data. In a case of handling the advertisement entry data, the dedicated memory region for storing the advertisement entry data is provided in the data storage unit 434, such that the advertisement entry data is added to this memory region whenever the advertisement entry data is received, and the book entirely consisting of the advertisement data is produced. This book can be looked up by turning pages consecutively and it becomes possible to search the book while watching the advertisement entry.

Here, the format of the book data with the book code is not necessarily limited to that shown in FIG. 44 and can be changed optionally. Also, the format of the book data with the advertisement entry code is also not necessarily limited to that shown in FIG. 45 and can be changed optionally. The manner for assigning the advertisement entry code and the book code is also optional. Also, the broadcast schedule table as shown in FIG. 46 which includes the items such as the broadcast date, the broadcast station, the start time, the end time, the book code, the book title, the publisher's name, and the author's name is not absolutely necessary, and there is no limit to the number of items. The manner of entering the selection of the advertisement entry is also optional and can be the pointing using the mouse, or the keyboard. The number of user terminals or the data centers are free as they relates to the broadcast. The number of book data to be broadcasted is also optional. The form of the broadcasting is also optional, and can be the wire broadcasting such as those using the optical fiber or the coaxial cable, etc., or can be the radio broadcasting using the UHF, VHF, or the satellite.

As described, according to this fourth embodiment, by attaching the advertisement entry of the other books related to a certain book, so that the reservation of the book can be made in a state in which the advertisement entry is displayed during the reading. Also, in a case of storing only the advertisement entry in the user terminal 430, the book can be searched while looking at the advertisement entry, and the desired book to be stored can be reserved by specifying the corresponding advertisement entry. As a result, it becomes possible for the user to select and enter the book data which is absolutely needed for the user. In other words, the storing operation of the broadcasted book data can be carried out more smoothly, and as a result, the easiness of the handling of the book data service system for displaying the book data can be improved.

Next, the fifth embodiment of the book data service system according to the present invention will be described in detail.

Figure 49:
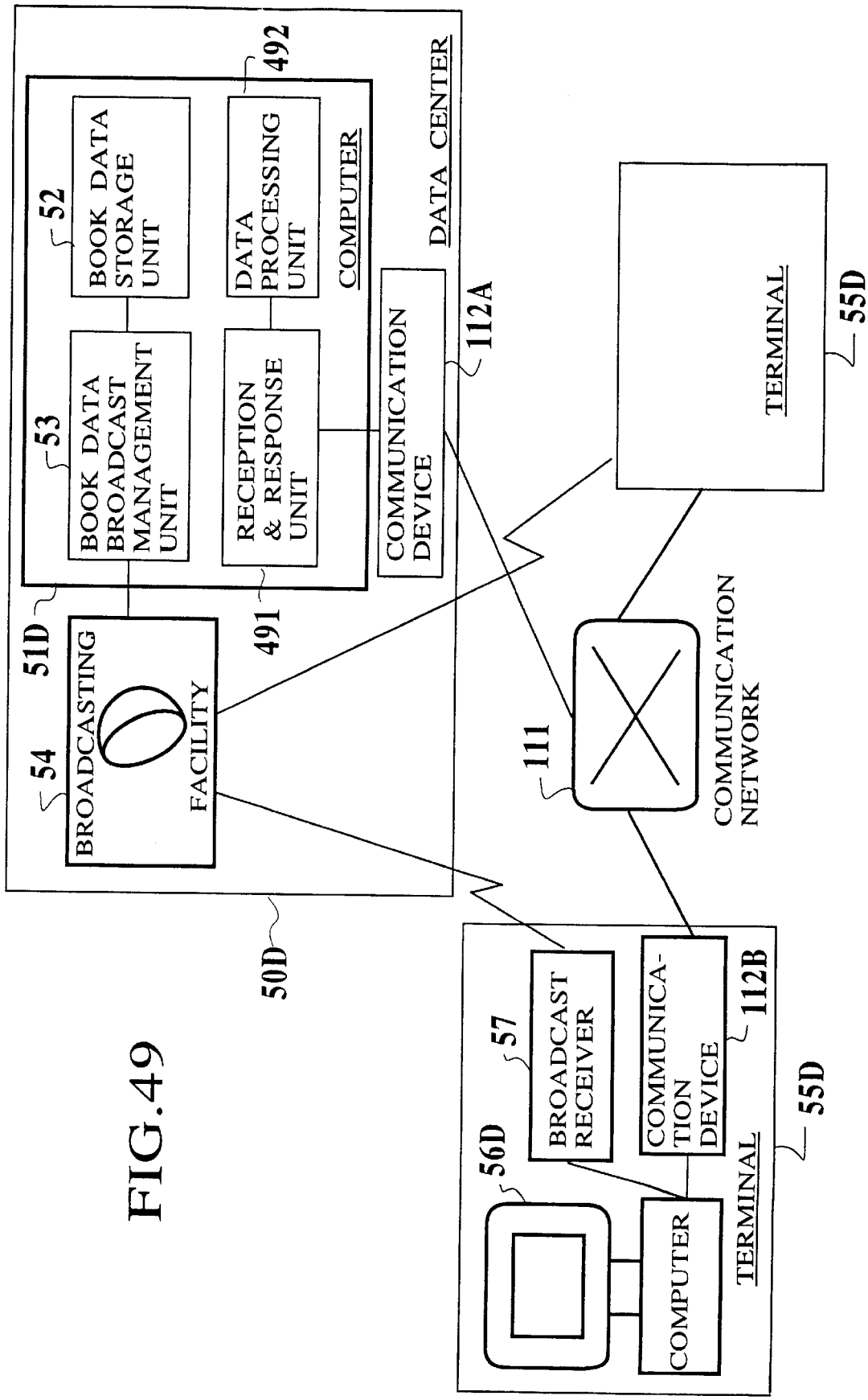
FIG. 49 is a schematic block diagram of a system configuration for the fifth embodiment of a book data service system according to the present invention.
Figure 50:
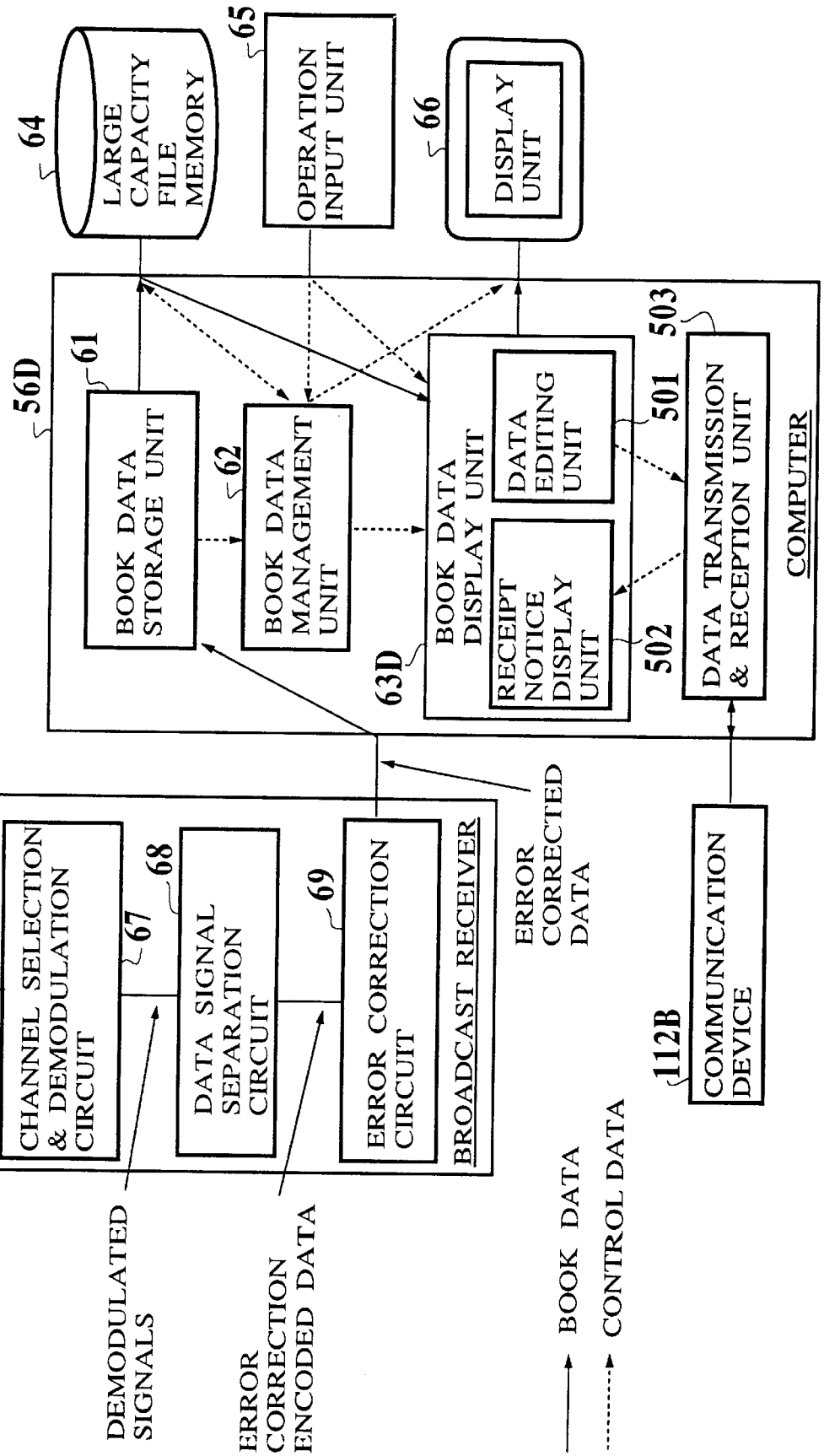
FIG. 50 is a detailed block diagram of a configuration of the user terminal in the book data service system of FIG. 49.

In this fifth embodiment, the book data service system has a system configuration as shown in FIG. 49 where, the system configuration of FIG. 11 for the second embodiment described above is modified in that the computer 51D of the data center 50D has a reception and response unit 491 which replaces the deciphering key returning unit 113 in FIG. 11 and a data processing unit 492 which replaces the charging unit 114 in FIG. 11. In addition, the user terminal 55B has a detailed configuration as shown in FIG. 50 where the configuration of FIG. 12 for the second embodiment described is modified in that the computer 56D has the book data display unit 63D including a data editing unit 501 and a receipt notice display unit 502 instead of the book data inspection unit 121 in FIG. 12, and a data transmission and reception unit 503 which replaces the deciphering key acquiring unit 122 and the deciphering unit 123 in FIG. 12.

This fifth embodiment concerns a scheme for communicating the data written into the book data by the user at the user terminal 55D to the data center 50D.

It is to be noted that the above features of this fifth embodiment are totally unrelated with the characteristic features of the second, third and fourth embodiments concerning the deciphering function and the charging function, and the communication devices 112A and 112B can be also used for the requesting and returning of the deciphering key as well, so that it can easily be combined with the second embodiment. Also, by using the deciphering communication device 271 of the third embodiment for transmitting the data other than the book data without applying any processing, this fifth embodiment can be combined with the third embodiment as well. It is also obviously possible to combine this fifth embodiment with the fourth embodiment concerning the storage reservation as well.

Figure 52:
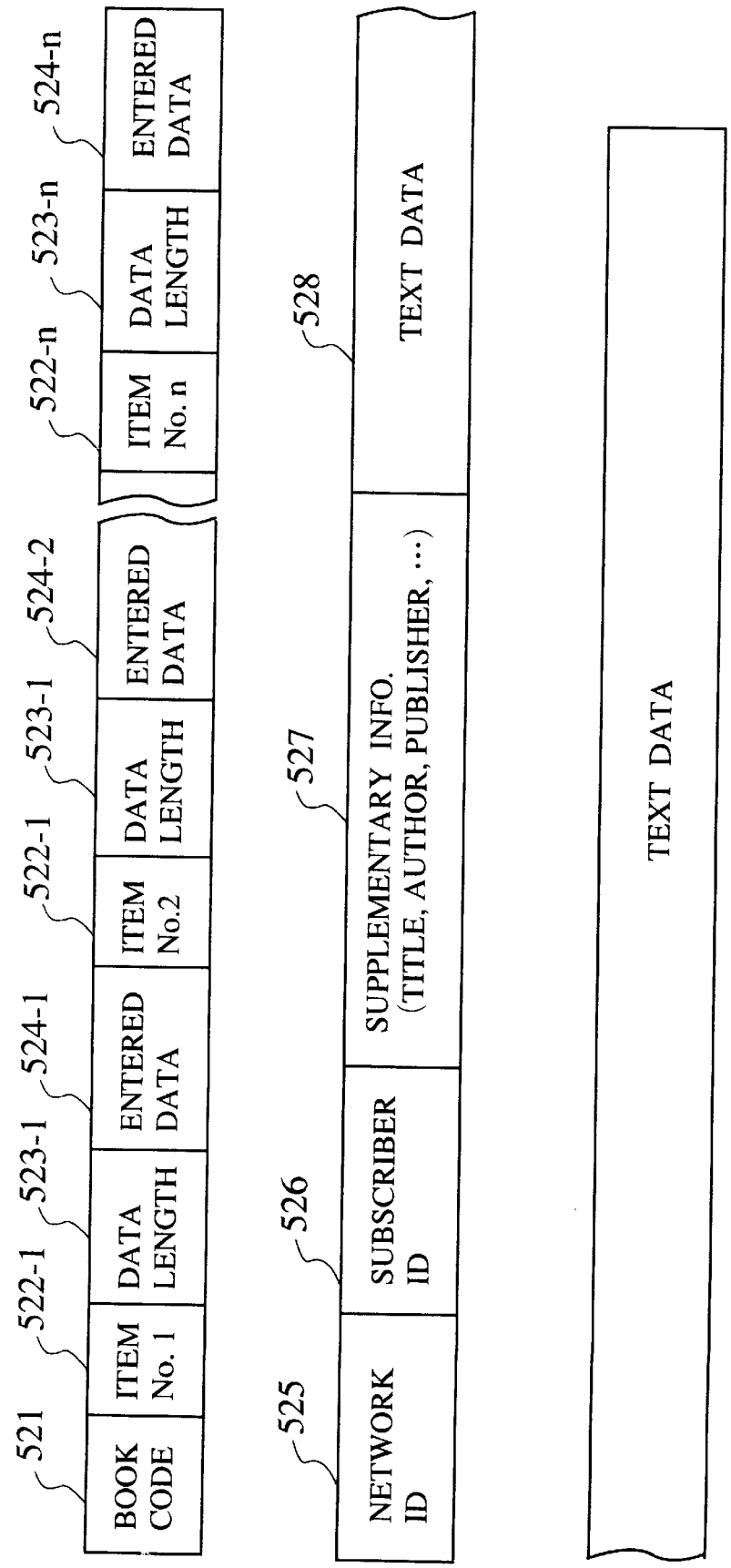
FIG. 52 is a diagrammatic illustration of the book data format used in the book data service system of FIG. 49.
Figure 53:
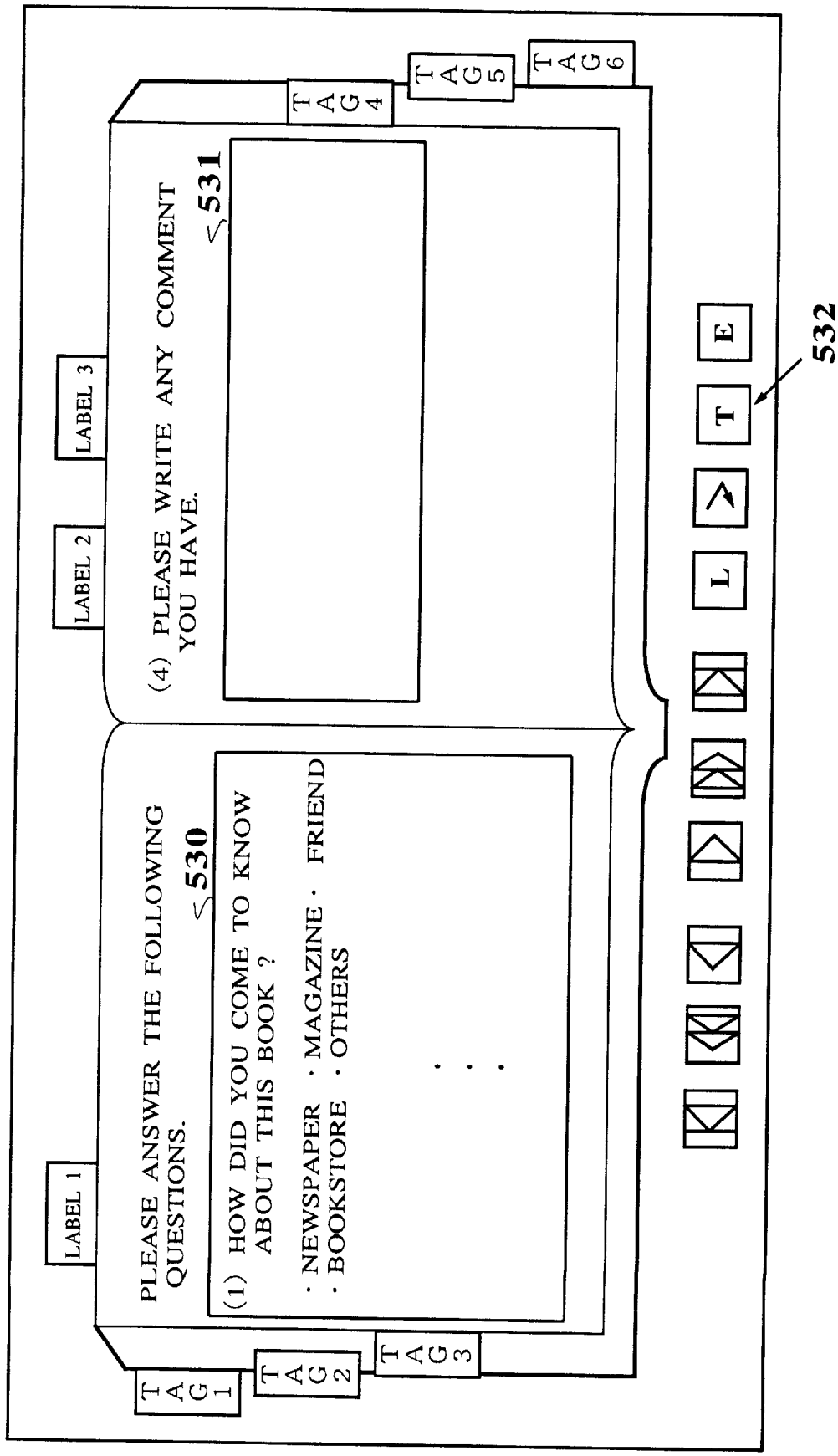
FIG. 53 is an illustration of an exemplary display at the user terminal in the book data service system of FIG. 49.

In this fifth embodiment, as shown in FIG. 53, it is assumed that the book data has spaces 531 for the user entry or the columns 530 for indicating choices. Also, when a plurality of data centers 50D are provided, the communication network type (network ID) or the subscriber number (subscriber ID) of the data center 50D to which the data are to be transmitted should be given in the book data. Thus, in this fifth embodiment, the book data is given in a format shown in FIG. 52 which includes the book code 521, followed by a number of groups of the item number 522, the data length 523, and the entered data 524, followed by the communication network ID 525, the subscriber ID 526, and the supplementary information 527 such as the title, author, publisher, etc. of the book, and finally the text data 528 of the book. Here, when there is only one data center 50D for the user terminal 55D, there is no need to provide the communication network ID 525 and the subscriber ID 526 in the book data. Also, the book data is to be displayed in a manner of FIG. 1, but the transmission button 532 is added to the navigation buttons as shown in FIG. 53.

Now, this fifth embodiment operates according to the data transmission sequence between the user terminal 55D and the data center 50D shown in FIG. 51 as follows. First, the book data management unit 62 of the user terminal 55D is activated (a), and when the user selects the book data on the book menu (b), the book data display unit 63D of the user terminal 55D reads out and displays the selected book data (c). Next, in the book data display as shown in FIG. 53, when the user enters the user entry into the user entry space 531 or specifies the choice in the choice indication column 530(d), the book data display unit 63D of the user terminal 55D enters the text data entered by the user or the symbol or number selected by the user at appropriate positions in the book data display as shown in FIG. 53. In the book data format of FIG. 52, the item number 522 of the entered data 524 corresponds to the entered position on the book data display.

Next, when the user commands the transmission button 532 on the book data display as shown in FIG. 53(e), the user terminal 55D activates the data editing unit 501 which takes out the entered data from the book data and edits the transmission data (f). Here, in case the book data is in the format of FIG. 52, it suffices to take out the top of the book data in a state having the data entry to the end of the entered data.

When the editing of the transmission data is completed, the data transmission and reception unit 503 is activated (g), and the data transmission and reception unit 503 activates the communication device 112 to set up the communication path with the data center 50D (h), and transmits the edited transmission data to the data center 50D (i). Here, when a plurality of data centers 50D are present from the viewpoint of the user terminal 55D, the network ID 525 and the subscriber ID 526 in the book data in the format of FIG. 52 are utilized at a time of the communication path set up. When the entered data is received at the reception and response unit 491 through the communication device 112A in the data center 50D (j), the data center 50D produces the receipt notice (k) and returns it to the user terminal 55D (l).

Then, the entered data are further processed at the data processing unit 492, but the detail of this further processing is not essential to the present invention. Here, in a case the actual data processing can also be made in a short time in addition to the receipt, instead of producing the receipt notice at the reception and response unit 491, the data processing unit 492 produces the report of the processing result and returns it through the reception and response unit 491, and then the data transmission and reception unit 503 of the user terminal 55D receives this report through the communication device 112.

When the returning of the receipt notice or the report is completed as it is received at the user terminal 55D side (m), the communication path is released (n) on both sides, and the receipt notice is transmitted to the receipt notice display unit 502 from the data transmission and reception unit 503 in the user terminal 55D, while deactivating the data transmission and reception unit 503 and the receipt notice display unit 502 carries out the display of the receipt notice (p). When the user confirms the displayed the receipt notice (q), the user terminal 55D resumes the usual book data display mode (r).

Figure 51:
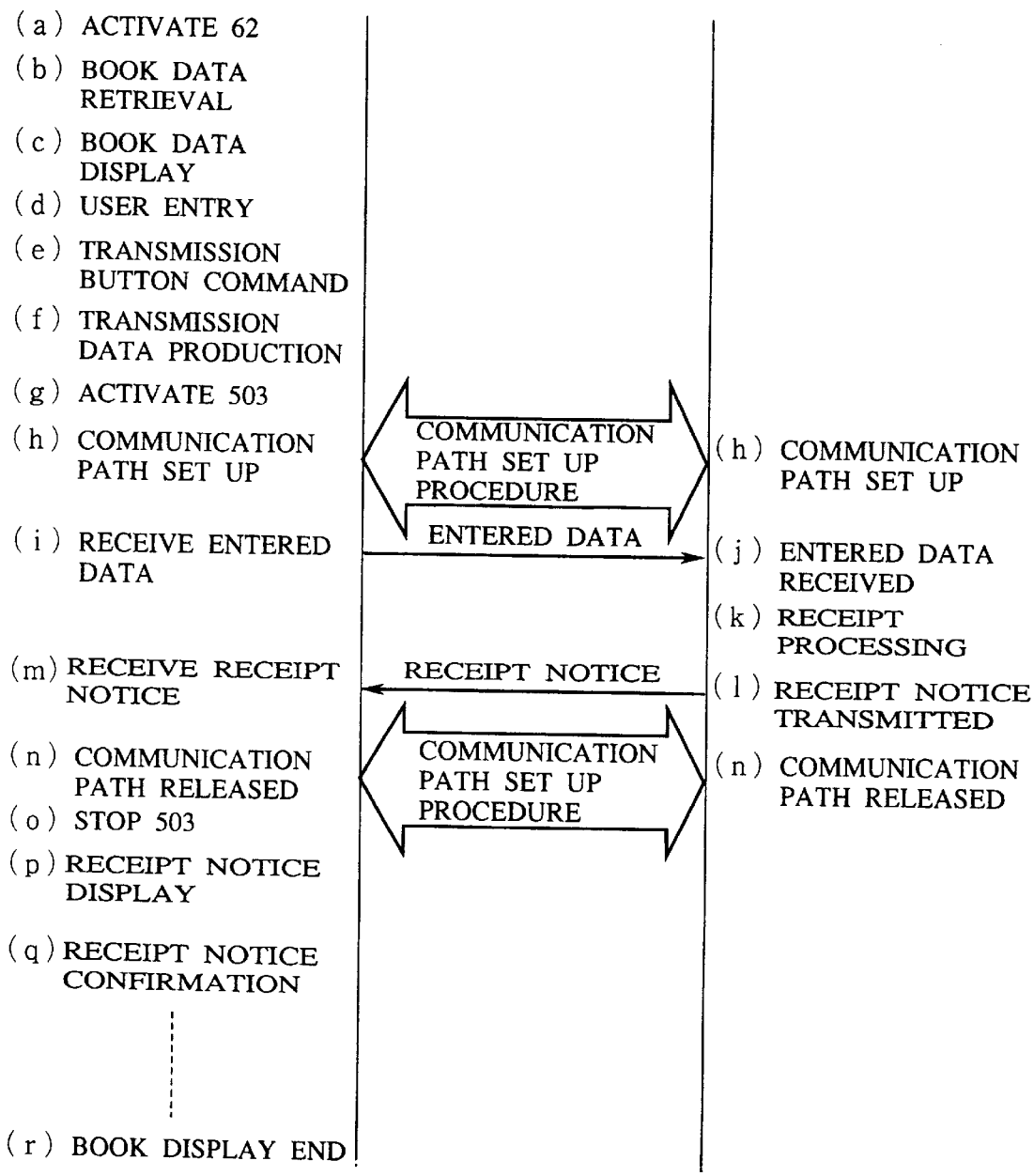
FIG. 51 is a diagram of an operation sequence in the book data service system of FIG. 49.

In this operation sequence of FIG. 51, when the amount of data is small and the size of the entry frame is set up in advance at each page, it is possible to omit the data length 523 from the book data of FIG. 52 by adopting the rule that the margins are to be sent in blanks. However, there may be a data center 50D which carries out the processing corresponding to the book later on, so that it is preferable to incorporate the data length 523 in the book data.

Also, the editing of the transmission data is required in a case such as that which involves numerous entry spaces and not necessarily all of them are filled, as in a case of marking the answers to the problems and relatively grading the user's aptitude, for instance. In a case involving only a few entry spaces, it suffices to send the entered data as it is, with the unentered entry space as blank.

The received data at the data center 50D side is attached with the book code or the item number in the prescribed format, so that it is possible to judge which data content corresponds to which part of the book, and the effective data can be extracted for use in the processing corresponding to the book.

In this fifth embodiment, the entered data is given by the character data indicating the choice or the key input, but it is also possible to enter the file name of the image file produced by the graphics tool, and the file content can be transmitted in succession to the file name transmission as an application of this fifth embodiment.

Also, the data transmission and the receipt notification are described as being carried out in real time, but it is also possible to utilize the value added communication network having a long time storage function, in which case the communication network can receive the data transmitted from the user terminal on behalf of the data center even when all the data center side transmission lines are busy, and transmit the received data to the data center when the data center side transmission line is released.

In this case, however, it is impossible to return the receipt notice immediately, so that when the receipt notice from the data center is received by the communication network, it is necessary for the communication network side to call up the user terminal and notify the receipt notice, while on the user terminal side, it is regarded as not admitted when there is no receipt notice within a prescribed period of time. Else, the receipt notice waiting state can be monitored from the communication network, and the non-receipt notice can be notified from the communication network to the user terminal when the receipt notice from the data center is not received within a prescribed period of time.

As described, according to this fifth embodiment, the system for providing the feedbacks from the user can be constructed such that the user can enter the feedbacks, such as the answers to the questionnaire in the flow of the operation to read the book data, and can be relieved from the tediousness of using the mail or facsimile transmission of the feedbacks. The effect of this system is not limited to making it easier for the user to make the feedbacks, and the significant effect can be expected in the development of the user participating type publication culture.

Also, by utilizing this system in the ordering system using the catalogue or the reservation system, as it suffices to provide only one display program regardless of the content of the book data to be displayed, so that the user can be relieved of the tediousness to acquire and handle a number of programs suitable for a number of different order taking centers. In addition, the order taking side can be relieved from the task of updating the user program even when the offered items increase, and the communication requires as short time as the dedicated system for order taking.

Also, in this fifth embodiment, it is possible to separate the data display software in the computer into the book data display program and the book data, and the book data display program can be provided with the function for allowing the user to enter the user entry into the user entry spaces specified by the book data and the function for communicating with the data center, such that the data entered by the user can be automatically transmitted to the data center by the transmission command at the same level as the book data display command. Consequently, the user can enter the feedbacks without interrupting the flow of the book data reading operation, while the data center can enter the received feedback data automatically into the host computer.

Also, the book data is produced according to prescribed rules, displayed according to prescribed rules and assigned with the book code or the user entry space code, such that the same book data display program can be used at the user terminal side regardless of the content of the book data or the conditions of the data center side, and the communication with the data center can be established by simply transmitting the entered data.

As illustrated by the above embodiments, according to the book data service system of the present invention, the book data are distributed by the broadcasting so that the data in the book form which is easy to handle and suitable for the comprehension of the large data can be distributed at low cost, and the regional differences concerning the availability of the books can be resolved. Here, when one channel of the television broadcasting is exclusively used for the broadcasting of the book data, the broadcasting time of the book data is of an order of several seconds to several minutes except for cases involving the dynamic images, and the book data distribution cost can be expected to be lower than the transportation cost required for the distribution of the conventional books as the number of subscribers increases to some extent.

Also, all kinds of book data are going to be available even at the remote region which has no large bookstore or specialized bookstore, without any time difference. In addition, by providing the key for deciphering the book data by the communication, or by renting the deciphering device and making the remote inspection of the utilization level record, it is possible to resolve the problem related to the charging of the broadcasted book data.

Also, by providing the user entry spaces in the book data, it is possible to provide the feedbacks to the data center almost automatically without bothering the user to utilize the other media, such as mail or facsimile, so that the book data service system of the present invention can be utilized quite usefully in variety of purposes such as the questionnaire, the order taking, the grading in an education system using correspondences, etc.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A book data service system, comprising:
   at least one data center including:
   a data center computer for storing and managing book data available in the book data service system; and a broadcasting facility for broadcasting all the book data stored and managed by the data center computer according to a prescribed communication protocol, without requiring any requests from users, the prescribed communication protocol being based on a prescribed synchronization control and error correction scheme for realizing data delivery by broadcasting the book data without a confirmation signal; and a plurality of user terminals, each user terminal including:

a broadcast receiver for receiving the book data broadcasted from the broadcasting facility of the data center;

a user terminal computer for selectively storing and managing the book data received by the broadcast receiver; and a display device for displaying the book data selectively stored and managed by the user terminal computer;

wherein the book data broadcasted from the data center contains broadcast schedule table, and each user terminal further includes a storage unit for storing the broadcast schedule table, a reservation unit for making a storing reservation of desired book data on the stored broadcast schedule table, a reservation inspection unit for inspecting whether the book data received by the broadcast receiver is the desired book data for which the storing reservation has been made, where the user terminal computer stores only the desired book data for which the storing reservation has been made among all the book data received by the broadcast receiver.

2. A book data service system, comprising:

at least one data center including:

a data center computer for storing and managing book data available in the book data service system; and a broadcasting facility for broadcasting all the book data stored and managed by the data center computer according to a prescribed communication protocol, without requiring any requests from users, the prescribed communication protocol being based on a prescribed synchronization control and error correction scheme for realizing data delivery by broadcasting the book data without a confirmation signal; and a plurality of user terminals, each user terminal including:

a broadcast receiver for receiving the book data broadcasted from the broadcasting facility of the data center;

a user terminal computer for selectively storing and managing the book data received by the broadcast receiver; and a display device for displaying the book data selectively stored and managed by the user terminal computer;

wherein each book data broadcasted from the data center contains an advertisement entry code assigned to an advertisement entry describing a content of said each book data briefly, and each user terminal further includes a selection unit for selecting the advertisement entry of a desired book data, a memory unit for memorizing the advertisement entry code of the selected advertisement entry, and a comparison unit for comparing the advertisement entry code assigned to each book data received by the broadcast receiver with the memorized advertisement entry code, where the user terminal computer stores only the desired book data whose advertisement entry code coincides with the memorized advertisement entry code.

\* \* \* \* \*